(12) United States Patent
Tabuchi et al.

(10) Patent No.: US 10,038,186 B2
(45) Date of Patent: Jul. 31, 2018

(54) NON-AQUEOUS ELECTROLYTE SECONDARY BATTERY

(71) Applicants: Toru Tabuchi, Kyoto (JP); Toshiyuki Aoki, Kyoto (JP); Minoru Teshima, Kyoto (JP); Katsushi Nishie, Kyoto (JP)

(72) Inventors: Toru Tabuchi, Kyoto (JP); Toshiyuki Aoki, Kyoto (JP); Minoru Teshima, Kyoto (JP); Katsushi Nishie, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 14/878,624

(22) Filed: Oct. 8, 2015

(65) Prior Publication Data

US 2016/0036052 A1 Feb. 4, 2016

Related U.S. Application Data

(60) Continuation of application No. 14/096,268, filed on Dec. 4, 2013, which is a division of application No.
(Continued)

(30) Foreign Application Priority Data

May 8, 2002 (JP) .................... 2002-132786
Jun. 17, 2002 (JP) .................... 2002-176350
(Continued)

(51) Int. Cl.
*H01M 4/48* (2010.01)
*H01M 10/0525* (2010.01)
(Continued)

(52) U.S. Cl.
CPC ............ *H01M 4/48* (2013.01); *H01M 4/134* (2013.01); *H01M 4/364* (2013.01); *H01M 4/366* (2013.01);
(Continued)

(58) Field of Classification Search
CPC combination set(s) only.
See application file for complete search history.

(56) References Cited

U.S. PATENT DOCUMENTS 5,395,711 A * 3/1995 Tahara .................. H01M 4/485
429/231.3
5,503,932 A 4/1996 Sakai et al.
(Continued)

FOREIGN PATENT DOCUMENTS

EP 0903797 A1 3/1999
EP 1024544 A2 8/2000
(Continued)

OTHER PUBLICATIONS

Advanced Materials Science and Engineering of Carbon, Michio Inagaki, Feiyu Kang, Masahiro Toyoda, Iidetaka Konno, 2014, Section 1.1.*
(Continued)

*Primary Examiner* — Ula C Ruddock
*Assistant Examiner* — Amanda Barrow
(74) *Attorney, Agent, or Firm* — Rankin, Hill & Clark LLP

(57) ABSTRACT

The present invention provides a non-aqueous electrolyte secondary battery including a positive electrode, a negative electrode having a negative active material, and a non-aqueous electrolyte, characterized in that the negative active material contains composite particle (C), which has silicon-containing particle (A) and electronic conductive additive (B), the silicon-containing particle (A) has a content of
(Continued)

carbon, and when measured at a temperature rising rate of 10±2° C./min by thermogravimetry, said composite particle (C) exhibits two stages of weight loss in the range of 30 to 1000° C.

16 Claims, 8 Drawing Sheets

Related U.S. Application Data

13/187,550, filed on Jul. 21, 2011, now abandoned, which is a division of application No. 10/513,664, filed as application No. PCT/JP03/05654 on May 6, 2003, now Pat. No. 8,092,940.

(30) Foreign Application Priority Data

Oct. 18, 2002 (JP) .................................. 2002-304654
Oct. 28, 2002 (JP) .................................. 2002-312340

(51) Int. Cl.

| | |
|---|---|
| H01M 4/62 | (2006.01) |
| H01M 4/134 | (2010.01) |
| H01M 4/36 | (2006.01) |
| H01M 4/587 | (2010.01) |
| H01M 4/38 | (2006.01) |
| H01M 4/131 | (2010.01) |
| H01M 4/133 | (2010.01) |
| H01M 4/02 | (2006.01) |

(52) U.S. Cl.

CPC ........... *H01M 4/386* (2013.01); *H01M 4/483* (2013.01); *H01M 4/587* (2013.01); *H01M 4/62* (2013.01); *H01M 4/625* (2013.01); *H01M 10/0525* (2013.01); *H01M 4/131* (2013.01); *H01M 4/133* (2013.01); *H01M 2004/021* (2013.01); *H01M 2004/027* (2013.01)

(56) References Cited

U.S. PATENT DOCUMENTS

| | | | | |
|---|---|---|---|---|
| 5,556,721 | A | 9/1996 | Sasaki et al. | |
| 6,017,654 | A * | 1/2000 | Kumta | H01M 4/485 |
| | | | | 429/223 |
| 6,090,505 | A | 7/2000 | Shimamura et al. | |
| 6,171,725 | B1 * | 1/2001 | Suzuki | H01M 4/136 |
| | | | | 429/218.1 |
| 6,235,427 | B1 * | 5/2001 | Idota | H01M 4/134 |
| | | | | 29/623.1 |
| 6,291,101 | B1 * | 9/2001 | Kita | H01M 4/133 |
| | | | | 429/218.1 |
| 6,355,377 | B1 | 3/2002 | Sheem et al. | |
| 6,383,686 | B1 | 5/2002 | Umeno et al. | |
| 6,541,156 | B1 * | 4/2003 | Fuse | H01M 4/13 |
| | | | | 252/182.1 |
| 6,589,696 | B2 | 7/2003 | Matsubara et al. | |
| 6,733,922 | B2 | 5/2004 | Matsubara et al. | |
| 8,092,940 | B2 | 1/2012 | Tabuchi et al. | |
| 2001/0016281 | A1 | 8/2001 | Ito | |
| 2001/0046468 | A1 | 11/2001 | Reitz et al. | |
| 2002/0018940 | A1 * | 2/2002 | Nirasawa | H01M 10/0567 |
| | | | | 429/340 |
| 2002/0086211 | A1 | 7/2002 | Umeno et al. | |
| 2002/0164479 | A1 * | 11/2002 | Matsubara | H01M 4/362 |
| | | | | 428/367 |
| 2003/0129494 | A1 * | 7/2003 | Kaneda | H01M 4/133 |
| | | | | 429/231.1 |
| 2003/0157407 | A1 | 8/2003 | Kosuzu et al. | |

FOREIGN PATENT DOCUMENTS

| | | | |
|---|---|---|---|
| EP | 1 205 989 | A2 | 5/2002 |
| JP | 05-307957 | | 11/1993 |
| JP | 09-249407 | A | 9/1997 |
| JP | 10-003920 | A | 1/1998 |
| JP | 10-308207 | A | 11/1998 |
| JP | 11-40152 | A | 2/1999 |
| JP | 11-312518 | A | 11/1999 |
| JP | 11-329433 | A | 11/1999 |
| JP | 11-343109 | A | 12/1999 |
| JP | 2000-3730 | A | 1/2000 |
| JP | 2000-021392 | A | 1/2000 |
| JP | 2000-90924 | A | 3/2000 |
| JP | 2000-149927 | A | 5/2000 |
| JP | 2000-173612 | | 6/2000 |
| JP | 2000-203818 | A | 7/2000 |
| JP | 2000-215887 | A | 8/2000 |
| JP | 2000-243396 | A | 9/2000 |
| JP | 2000-268824 | A | 9/2000 |
| JP | 2000-357514 | A | 12/2000 |
| JP | 2001-160392 | A | 6/2001 |
| JP | 2001-196053 | A | 7/2001 |
| JP | 2001-283848 | A | 10/2001 |
| JP | 2001-345100 | A | 12/2001 |
| JP | 2002-42806 | A | 2/2002 |
| JP | 2002-093415 | A | 3/2002 |
| JP | 2002-170561 | | 6/2002 |
| JP | 2002-198036 | A | 7/2002 |
| JP | 2002-216751 | A | 8/2002 |
| JP | 2002-231225 | | 8/2002 |
| JP | 2002-260658 | A | 9/2002 |
| JP | 2004-047404 | A | 2/2004 |
| JP | 2004-095306 | A | 3/2004 |
| JP | 2004-119176 | A | 4/2004 |
| JP | 08-315820 | | 11/2013 |
| KR | 2000-0053488 | A | 8/2000 |
| WO | 98/24135 | A1 | 6/1998 |

OTHER PUBLICATIONS

Silca, amorphous, The MAK Collection for Occupational Health and Safety, Published Online Jan. 31, 2012.*
Colloidal Silica: Fundamentals and Applications, Horacio E. Bergna, William O. Roberts, pp. 13 and 14, Published Dec. 19, 2005.*
"Basics of X-Ray Powder Diffraction," Scott A Speakman, http://prsim.met.edu/xrray, MIT, accessed Feb. 9, 2017 (date unknown)—evidential reference.*
"Semiconductor Fundamentals Lecture," Berkeley, accessed Feb. 9, 2017 at http://www-inst.eecs.berkeley.edu/~ee130/sp07/lectures/lecture 1.ppt. (date unknown)—evidential reference.*
Japanese Office Action for JP 2002-132786 dated Jan. 29, 2009.
Japanese Office Action for JP 2002-176350 dated Jan. 30, 2009.
Japanese Office Action for JP 2002-304654 dated Feb. 5, 2009.
Japanese Office Action for JP 2002-312340 dated Jan. 29, 2009.
Japanese Office Action dated Feb. 7, 2012 by the Japanese Patent Office in corresponding Japanese Application No. 2002-312340.
Japanese Office Action issued in Application No. 2002-304654, dated Jun. 8, 2010.
Japanese Office Action issued in Application No. 2002-31240, dated Jun. 8, 2010.
Japanese Office Action dated Jul. 7, 2011 in the corresponding Japanese Patent Application No. 2002-304654.
Korean Office Action dated Jan. 31, 2011 in the corresponding Korean Patent Application No. 10-2004-7016728.
Federal Register, vol. 76, No. 27 issued Feb. 9, 2011 which details Supplementary Examination Guidelines for Determining Compliance with 35 U.S.C. 112 and for Treatment of Related Issues in Patent Applications.

* cited by examiner

NON-AQUEOUS ELECTROLYTE SECONDARY BATTERY

CROSS REFERENCE TO RELATED APPLICATIONS

This is a continuation of Ser. No. 14/096,268 filed Dec. 4, 2013, which is a divisional of Ser. No. 13/187,550 filed Jul. 21, 2011, now abandoned, which is a divisional of application Ser. No. 10/513,664 filed Nov. 8, 2004, now U.S. Pat. No. 8,092,940, which is the National Stage of PCT/JP03/05654 filed May 6, 2003; the above noted prior applications are all hereby incorporated by reference.

TECHNICAL FIELD

The present invention relates to a non-aqueous electrolyte secondary battery.

BACKGROUND ART

In the past, carbon material has been used mainly as a negative active material for lithium-ion secondary batteries.

These days, however, in the batteries which utilize carbon material as a negative active material, the discharge capacity is so enhanced as to be close to the theoretical capacity of carbon material. Such a present situation makes it difficult to further improve the discharge capacity of those batteries.

In recent years, therefore, high-capacity negative active materials which can be alternatives to carbon material have been studied thoroughly. As one example of such high-capacity negative active materials, silicon material can be included (refer to Provisional Publication No. 29602 of 1995, for example.)

With silicon being used as a negative active material, however, a battery significantly deteriorates in cycle performance compared to a case of carbon material being used as a negative active material. The reasons for this can be explained as follows: having a large volume expansion associated with absorption of lithium ion, silicon is pulverized easily due to the repetition of charge/discharge; such pulverization creates a portion where a conductive pathway is broken and causes a decrease in current collection efficiency; and, consequently, as the number of charge/discharge cycles grows, the capacity decreases rapidly and the cycle life becomes short.

As described in USP200210086211 and EP1205989A2, Provisional Publication No. 3920 of 1998, and Provisional Publication No. 215887 of 2000, it is proposed that a non-aqueous electrolyte secondary battery utilize the silicon which is coated with carbon material, as a negative active material, in that the carbon material-coated silicon shows better cycle performance than the one without coating.

However, as compared to a conventional lithium ion battery where carbon material is used as a negative active material, the cycle performance of the above proposed battery is still unsatisfactory.

The present invention has been conducted in view of such circumstances. It is an object of the invention to provide a non-aqueous electrolyte battery having a large capacity and a satisfactory cycle life.

DISCLOSURE OF THE INVENTION

The present invention provides a non-aqueous electrolyte secondary battery comprising a positive electrode, a negative electrode having a negative active material, and a non-aqueous electrolyte; characterized in that the negative active material contains the composite particle (C), which has silicon-containing particle (A) and electronic conductive additive (B), and carbon material (D), and that the weight of the electronic conductive additives (B) falls within the range of 0.5 wt. % to 60 wt. % to the weight of the composite particle (C).

According to the present invention, the said negative active material contains the composite particle (C), in which the silicon-containing particle (A) and the electronic conductive additive (B) are contained, and the carbon material (D), and hence the cycle life improves. The reasons for this have not been determined yet clearly; however, it is very likely that the presence of the electronic conductive additive (B) and the carbon material (D) causes the enhancement of the contact conductivity between the silicon-containing particle (A) and between the composite particle (C), respectively.

In addition, the weight of the electronic conductive additive (B) falls within the range of 0.5 wt. % to 60 wt. % to the weight of the composite particle (C), and hence the discharge capacity and the cycle performance improve. If the weight of the electronic conductive additive (B) is less than 0.5 wt. % to the weight of the composite particle (C), the amount of the electronic conductive additive (B) becomes insufficient to the amount of the silicon-containing particle (A), so that inadequate electronic conductivity causes the deterioration of the cycle performance. Meanwhile, if the weight of the electronic conductive additive (B) is greater than 60 wt. %, the discharge capacity per active material weight is reduced and, consequently, the battery discharge capacity becomes small.

The present invention is characterized in that, in the non-aqueous electrolyte secondary battery of the present invention, the silicon-containing particle (A) has a content of carbon, and that the composite particle (C) is configured by coating the silicon-containing particle (A) with the electronic conductive additive (B).

According to the invention, the silicon-containing particle (A) has a content of carbon, and hence the contact conductivity of silicon becomes better and this results in improvement in the cycle life. In addition, the composite particle (C) is configured by coating the silicon-containing particle (A) with the electronic conductive additive (B), and hence the cycle life improves. It is believed that the reason for this may be that since the particle (A) is coated with the electronic conductive additive (B), even when the active material is pulverized due to the active material expansion/contraction that occurs during charge/discharge, the deterioration of the contact conductivity is prevented.

The present invention is characterized in that, in the non-aqueous electrolyte secondary battery of the present invention, the proportion of the weight of the composite particle (C) to the total weight of the composite particle (C) and the carbon material (D) falls within the range of 60 wt. % to 99.5 wt. %.

According to the invention, the proportion of the weight of the composite particle (C) to the total weight of the composite particle (C) and the carbon material (D) falls within the range of 60 wt. % to 99.5 wt. %, and hence the discharge capacity and the cycle life improve. If the proportion of the weight of the composite particle (C) to the total weight of the composite particle (C) and the carbon material (D) is less than 60 wt. %, the negative active material becomes insufficient, so that the discharge capacity decreases. If the proportion of the weight of the composite particle (C) is greater than 99.5 wt. %, the contact conductivity between the active material deteriorates, so that the cycle life is reduced.

The present invention is characterized in that, in the non-aqueous electrolyte secondary battery of the present invention, silicon oxide $SiO_x$ (where $0<X\leq2$) is contained in the composite particle (C).

According to the invention, silicon oxide $SiO_x$ (where $0<X\leq2$) is contained in the composite particle (C), and hence the cycle life improves. It is believed that the reason for this may be that changes in volume during charge/discharge are smaller in silicon oxide $SiO_x$ (where $0<X\leq2$) as compared to those in silicon.

The present invention is characterized in that, in the non-aqueous electrolyte secondary battery of the present invention, the proportion of the weight of the composite particle (C) to the total weight of the composite particle (C) and the carbon material (D) falls within the range of 1 wt. % to 30 wt. %.

Since the discharge capacity decreases, it is not preferable that the proportion of the weight of the composite particle (C) to the total weight of the composite particle (C) and the carbon material (D) be less than 1 wt. %. In addition, it is not preferable either that the proportion of the weight of the composite particle (C) to the total weight of the composite particle (C) and the carbon material (D) be greater than 30 wt. %, since the negative active material significantly expands and contracts during charge/discharge and, as a result, the cycle performance deteriorates. It is more preferable that the proportion of the weight of the composite particle (C) to the total weight of the composite particle (C) and the carbon material (D) fall within the range of 5 wt. % to 10 wt. %.

The present invention provides a non-aqueous electrolyte secondary battery comprising a positive electrode, a negative electrode having a negative active material, and a non-aqueous electrolyte; characterized in that said negative active material has silicon-containing particle (A), and that said silicon-containing particle (A) contains silicon oxide $SiO_x$ (where $0<X\leq2$) and carbon.

According to the invention, silicon oxide $SiO_x$ (where $0<X\leq2$) is contained in the composite particle (C), and hence the cycle life improves. It is believed that the reason for this may be that changes in volume during charge/discharge are smaller in silicon oxide $SiO_x$ (where $0<X\leq2$) as compared to those in silicon.

In addition, carbon is contained in the composite particle (C), and hence the cycle life improves. The reason for this is that even when silicon or $SiO_x$ is pulverized during charge/discharge, a conductive pathway is kept by carbon, so that a decrease in the current collection efficiency can be inhibited.

The present invention provides a non-aqueous electrolyte secondary battery comprising a positive electrode, a negative electrode having a negative active material, and a non-aqueous electrolyte; characterized in that the negative active material contains the composite particle (C), which has silicon-containing particle (A) and electronic conductive additive (B), that the composite particle (C) has a content of carbon, and that when measured at a temperature rising rate of 10±2° C./min by thermogravimetry, the composite particle (C) exhibits two stages of weight loss in the range of 30 to 1000° C.

According to the invention, the composite particle (C) has a content of carbon and when measured at a temperature rising rate of 10±2° C./min by thermogravimetry, it exhibits two stages of weight loss in the range of 30 to 1000° C., and hence the cycle performance is improved. The reasons for this can be explained as follows. Weight loss hardly occurs to silicon at a temperature range of 30 to 1000° C.; therefore, it is carbon that causes weight loss in such a temperature range. Carbon, depending on the different properties, will differ in the temperature at which weight loss starts. In the present invention, therefore, at least two different kinds of carbon should be contained in the composite particle (C). And containing different kinds of carbon in the negative active material allows the silicon expansion/contraction that occurs during charge/discharge to be reduced and, consequently, the contact conductivity in the particle of the negative active material can be retained.

PREFERRED EMBODIMENTS OF THE INVENTION

Figure 1:
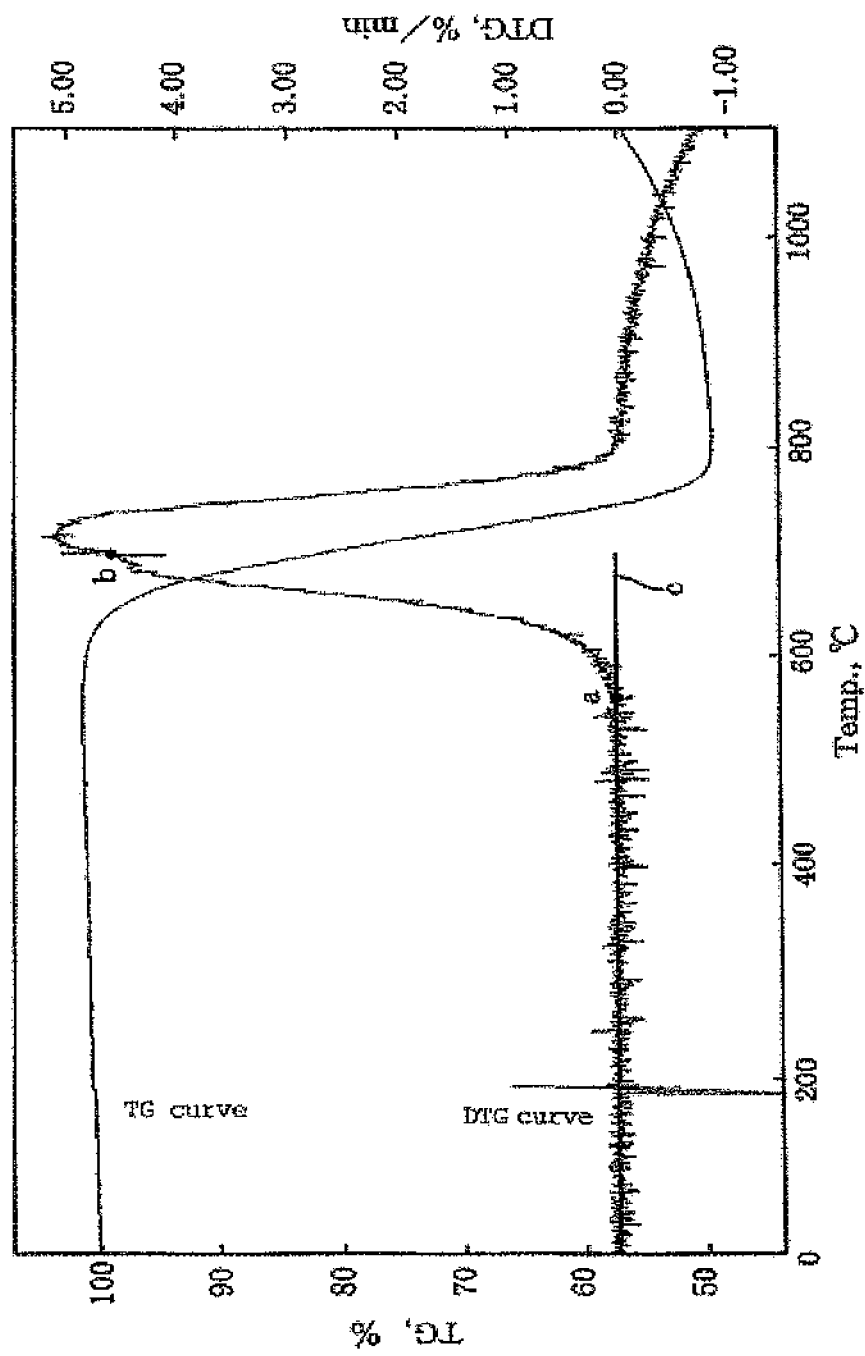
FIG. 1 is a view showing TG measurement results.

Hereinafter, an embodiment of the present invention will be described with reference to the accompanying drawings.

As a negative active material in the present invention, it is possible to use a material which contains the composite particle (C), in which silicon-containing particle (A) and electronic conductive additive (B) are contained, and carbon material (D).

As the silicon-containing particle (A) in the present invention, it is possible to use, for example, the following particles: silicon particle, silicon oxide particle, or the silicon particle or silicon oxide particle which has at least one element selected from the group consisting of the typical nonmetallic elements such as B, N, P, F, Cl, Br, and I; the typical metallic elements such as Li, Na, Mg, Al, K, Ca, Zn, Ga, and Ge; and the transition metallic elements such as Sc, Ti, V, Cr, Mn, Fe, Co, Ni, Cu, Mo, Zr, Ta, Hf, Nb, and W. These may be used alone or in combination with two or more.

As the electronic conductive additive (B) in the present invention, it is possible to use, for example, Cu, Ni, Ti, Sn, Al, Co, Fe, Zn, Ag or alloy of two or more of these elements, or carbon material. Among these, it is more preferable to use carbon material.

Regarding the methods of coating the particle (A) with carbon material as the electronic conductive additive (B) in the present invention, the following techniques can be used. In CVD method, benzene, toluene, xylene, methane, ethane, propane, butane, ethylene, or acetylene, as a carbon source, is decomposed in gaseous phase and chemically deposited on the surface of the particle (A). In another method, the particle (A) is mixed with pitch, tar, or thermoplastic resin (for example, furfuryl alcohol) and then calcinated. And in another method, a mechanochemical reaction is used, where mechanical energy is applied between the particle (A) and the carbon material with which the particle (A) is coated so that a composite can be formed. Among these methods, because of the uniformity in the carbon material coating, it is preferable to use CVD method.

When Cu, Ni, Ti, Sn, Al, Co, Fe, Zn, or Ag is used as the electronic conductive additive (B) in the present invention, it is possible to use, for example, CVD method, spatter evaporation method, or plating method.

In the present invention, it is preferable that the proportion of the weight of the electronic conductive additive (B) to the weight of the composite particle (C) fall within the range of 0.5 wt. % to 60 wt. %, more preferably in the range of 1 wt. % to 60 wt. %, and even more preferably in the range of 5 wt. % to 40 wt. %. If the proportion exceeds 60 wt. %, a large discharge capacity cannot be attained. And if it is less than 0.5 wt. %, the contact conductivity of the silicon-containing particle (A) deteriorates and, as a result, the cycle life is reduced.

In addition, as the electronic conductive additive (B), carbon material in a variety of crystal forms can be used. Especially, it is preferable to utilize the carbon material that has 0.3354 to 0.35 nm in the average interplanar spacing d (002), which is obtained by conducting X-ray diffraction on the carbon on the particle (A). Within such a range, it is possible to attain a large initial discharge capacity and a high capacity retention ratio according to cycle. The measurement of d (002) can be carried out using, for example, a X-ray diffractometer RINT2000 (Rigaku) with the use of Cuk α radiation.

The average interplanar spacing d (002) of the carbon material which is used as the electronic conductive additive (B) in the present invention can be adjusted in the following manner. For example, when the particle (A) is mixed with thermoplastic resin and then calcinated, the distance can be adjusted by means of a calcination temperature. In addition, when the particle (A) is coated with carbon using CVD technique, it can be adjusted by means of a CVD temperature. It is preferable that the average interplanar spacing d (002) lie in the range of 0.3354 to 0.35 nm: for example, when a large value of approximately 0.35 nm is desirable, a calcination temperature or CVD temperature can be set at approximately 1000° C., and when a small value of approximately 0.3354 nm is desirable, a calcination temperature or CVD temperature can be set higher than approximately 1000° C. and not higher than approximately 3000° C. With a processing temperature being set lower, the average interplanar spacing d (002) tends to be larger. In order to keep the average interplanar spacing d (002) as small as possible, with a processing temperature remaining low, the carbon can be made to grow on the surface of the particle (A) as slow as possible using an organic matter having a benzene ring such as benzene, as a carbon source for CVD.

When a mechanochemical reaction is employed as the compounding technique, the average interplanar spacing d (002) of 0.3354 nm can be obtained by using natural graphite microparticle. Furthermore, it is possible to attain the average interplanar spacing d (002) of approximately 0.346 nm by using the carbon particle which is prepared by calcinating coke at approximately 1000° C.

Moreover, when silicon particle is used as the particle (A), the preferable BET specific surface area lies in the range of 1.0 to 10.0 m$^2$/g. In addition, if the BET specific surface area of the composite particle (C) exceeds 10.0 m$^2$/g when silicon particle is used as the particle (A), undesirable results are generated as follows: binding effect between the active material by the use of a binder becomes less strong, the negative active material expansion/contraction during charge/discharge causes gaps to occur between the negative active material, the electrical connection between the negative active material is broken, and as a result, the cycle performance decreases. Therefore, it is preferable that the BET specific surface area of the composite particle (C) be not greater than 10.0 m$^2$/g. The BET specific surface area can be measured by using, for example, GEMINI2375 (SHIMADZU).

The BET specific surface area of the composite particle (C) in the present invention can be adjusted in the following manner. For example, when the particle (A) is coated with the electronic conductive additive (B) by means of CVD, by applying a large amount of coating, the BET specific surface area can be reduced. Moreover, by controlling the particle size distribution with the use of a sieve, the BET specific surface area can be adjusted, too. More specifically, with an increase in the amount of the particle whose particle size is small, the BET specific surface area becomes large, and with an increase in the amount of the particle whose particle size is large, it becomes small.

As the carbon material (D) in the present invention, it is possible to use one or more materials selected from the group consisting of natural graphite, artificial graphite, acetylene black, ketjen black, or vapor grown carbon fiber. Concerning the shape of the carbon material (D), a variety of shapes can be used including spherical, filamentous, and scale-like shapes. Among them, because of its capability of fully securing the electronic conductivity, it is preferable to use the graphite of a scale-like shape, the number average particle size of which ranges from 1 to 15 μm. In addition, from the perspective of improving the cycle performance, meso carbon micro beads or meso carbon fibers, or the material prepared by adding boron to either of such carbon materials can be used.

Moreover, when the silicon-containing particle (A) has a content of carbon and the composite particle (C) is configured by coating the particle (A) with the electronic conductive additive (B), the cycle performance can further improve. Allowing for satisfactory cycle performance, the preferable proportion of the weight of the component other than carbon to the weight of the particle (A) falls within the range of 10 wt. % to 70 wt. %, more preferably in the range of 20 wt. % to 70 wt. %.

Furthermore, when $SiO_x$ (where $0<X\leq2$) is not contained in the composite particle (C), the preferable proportion of the weight of the composite particle (C) to the total weight of the composite particle (C) and the carbon material (D) falls within the range of 60 wt. % to 99.5 wt. %, in order for the cycle performance to improve and for the capacity to be secured.

By using the composite particle (C) in which silicon oxide $SiO_x$ (where $0<X\leq2$) is contained, more satisfactory cycle performance can be achieved. It is believed that the reason for this is that volume expansion can be inhibited because of the inclusion of $SiO_x$. It is possible to use Si particle and $SiO_x$ particle by mixture, or the particle which contains both Si and $SiO_x$ (where $0<X\leq2$) phases may also be used.

It is preferable that the silicon oxide which is contained in the composite particle (C) have both Si and $SiO_x$ (where $0<X\leq2$) phases. This is possibly due to the following reasons. In the material which contains both Si and $SiO_x$ (where $0<X\leq2$) phases, lithium is absorbed/desorbed in Si which disperses in $SiO_2$ matrix and, as a result, the volume expansion of Si is inhibited, so that the cycle performance becomes excellent. Therefore, by mixing both phases at an optimal proportion, it is possible to obtain a negative active material having a large discharge capacity and excellent cycle performance.

The material which contains both Si and $SiO_x$ (where $0<X\leq2$) phases can be obtained as follows. For example, when SiO is calcinated in $N_2$ or Ar at a range of temperature from 900° C. to 1400° C., SiO starts separating into Si and $SiO_2$ at approximately 900° C. and the separation is almost complete at 1400° C. In this case, when a larger amount of Si is desirable, the temperature can be set higher, and when a smaller amount of Si is desirable, the temperature can be set lower.

In addition, the material which contains both Si and $SiO_x$ (where $0<X\leq2$) phases can be identified in the following manner. First, Si powder and $SiO_2$ powder are mixed at different ratios to prepare standard samples. For these standard samples, NMR measurement is performed to examine changes in the Si and $SiO_2$ peaks at different mixture ratios. Next, for the material which contains both Si and $SiO_x$ (where $0<X\leq2$) phases, NMR measurement is performed. By making a comparison between the measurement result obtained and those of standard samples, the peaks of Si and $SiO_2$ are identified, and furthermore the value of X for $SiO_x$ can be obtained by determining the ratios of Si and $SiO_2$.

In the X-ray diffraction measurement conducted by the use of the CuK α radiation on the material which contains both Si and $SiO_x$ (where $0<X\leq2$) phases, it is preferable that at least one of the half widths of the Si (111)-plane and Si (220)-plane diffraction peaks be less than 3° (2 θ). The reason for this is that when the material the half width of which is not smaller than 3° (2 θ) is used, the cycle performance decreases. In addition, when silicon oxide is contained, in order to further improve the cycle performance, it is preferable that the proportion of the weight of the composite particle (C) to the total weight of the composite particle (C) and the carbon material (D) fall within the range of 1 wt. % to 30 wt. %, or more preferably, within the range of 5 wt. % to 10 wt. %.

Moreover, the preferable proportion of the weight of Si to the total weight of Si and $SiO_x$ falls within the range of 20 wt. % to 80 wt. %. The reason for this is that since Si exhibits a larger discharge capacity than $SiO_x$, if the proportion of the weight of Si is less than 20 wt. %, the discharge capacity decreases; and that, on the other hand, since $SiO_x$ exhibits smaller volume expansion during charge/discharge and more excellent cycle performance than Si, if the proportion of the weight of Si is greater than 80 wt. %, the cycle performance deteriorates.

Furthermore, when the particle (A) comprising silicon oxide $SiO_x$ is used and carbon material is used as the electronic conductive additive (B), if the proportion of the carbon material contained in the composite particle to the negative active material is less than 3 wt. %, the following undesirable result is generated: the particles consisting of Si, the particles consisting of $SiO_x$, or the particles containing Si and $SiO_x$ are pulverized due to the repetition of charge/discharge, the breakage of conductive pathway caused by such pulverization cannot be prevented, and as a result, the cycle performance deteriorates. In addition, the proportion being greater than 60 wt. % is not preferred either because the discharge capacity is caused to decrease. Therefore, it is preferable that the proportion of the carbon material on the surface of the composite particle to the entire negative active material fall within the range of 3 wt. % to 60 wt. %.

In addition, among those composing the silicon-containing particle (A), the particle consisting of Si, the particle consisting of $SiO_x$ (where $0<X\leq2$), or the particle containing Si and $SiO_x$ (where $0<X\leq2$) can be used in either highly crystalline or amorphous state: however, amorphous state is preferable. The reason for this is that if the particle changes from a highly crystalline structure into an amorphous structure due to charge/discharge, there is a possibility that electric potential of the negative active material may vary. Therefore, in order to prevent electric potential variation from occurring during charge/discharge, it is preferable to use an amorphous structure in advance.

In addition, regarding the particle consisting of Si, the particle consisting of $SiO_x$ (where $0<X\leq2$), or the particle containing Si and $SiO_x$ (where $0<X\leq2$), the following can also be used: the particles which have been washed with acid such as fluorinated acid or sulfuric acid, or the particles which have been reduced with hydrogen.

Moreover, from the standpoint of improvement in the cycle performance, when the silicon-containing particle (A) has a content of carbon, the preferable proportion of the weight of silicon to the weight of the silicon-containing particle (A) falls within the range of 10 wt. % to 70 wt. %, or more preferably within the range of 20 wt. % to 70 wt. %.

In addition, when carbon material is used as the electronic conductive additive (B) for coating, the usable crystalline material ranges from highly crystalline graphite to low crystalline carbon. Especially, because of its low electrolyte-solution reactivity, it is preferable to use low crystalline carbon.

Furthermore, it is preferable that the number average particle size of the composite particle (C), which is configured by coating the silicon-containing particle (A) with the electronic conductive additive (B), range from 0.1 to 20 μm. When the composite particle (C) is configured by coating the silicon-containing particle (A), which is made of silicon material and carbon material, with the electronic conductive additive (B), the preferable number average particle size ranges from 0.1 to 30 μm. The particle having the number average particle size of smaller than 0.1 μm is difficult to be produced and hard to be handled. And, the particle having the number average particle size of greater than 30 μm is inferior in the conductivity in the active material and suffers a deterioration in the cycle performance. The number average particle size of particles means the number average particle size obtained by means of a laser diffraction method. The number average particle size can be measured using, for example, SALD2000J (SHIMADZU.)

The particle size of the composite particle (C) in the present invention can be controlled by arranging the particle (A) so as to exhibit a predetermined particle size by means of grinding or screening with a sieve, and by adjusting the amount of the electronic conductive additive (B) used for coating. The adjustment of coating amount can be made by adjusting, for example, the time required for CVD process.

The composite particle (C) described in the invention of claim 7 is as follows: the composite particle (C) has a content of carbon, and when the composite particle (C) is measured at a temperature rising rate of 10±2° C./min by thermogravimetry, weight loss appears at two stages in a range of temperature from 30 to 1000° C. The reason for this is that using such composite particle (C) makes it possible to obtain a non-aqueous electrolyte secondary battery which is excellent in charge/discharge cycle performance and has a high energy density.

In the above-described weight loss, the preferable temperature at which weight loss starts in thermogravimetry of the composite particle (C) is not higher than 600° C. at the first stage and is higher than 600° C. at the second stage.

In addition, in the above-described weight loss, the preferable proportion of weight loss to the weight prior to the temperature rise in thermogravimetry of the composite particle (C) falls within the range of 3 to 30 wt. % at the first stage and 5 to 65 wt. % at the second stage.

Carbon will differ in the temperature at which weight loss starts in thermogravimetry, depending on the different properties, so that the nature of carbon can be characterized according to the temperature at which weight loss starts. In addition, silicon hardly decreases in weight at a temperature range of 30 to 1000° C.

FIG. 1 shows, the results of thermogravimetry of the composite particle (C) satisfying the above requirements. In the present invention, the temperature at which weight loss starts at the first stage in thermogravimetry of the negative active material refers to the temperature at point "a" in FIG. 1: at this point, the DTG curve, obtained by taking the first derivative of the region in a temperature range of 100° C. to 350° C. on the TG line, starts to deviate from the line "c" in FIG. 1, obtained by linearly approximating the DTG curve. In addition, the temperature at which weight loss at the first stage ends refers to the temperature at point "b" in FIG. 1: the local minimum point on the DTG curve, or the point at the intersection of the first-stage weight loss with the second-stage weight loss on the DTG curve, more specifically, the point at which, after the DTG curve started to exhibit the first-stage weight loss, it again changes the slope of the curve and starts to exhibit another weight loss. In addition, the temperature at which weight loss starts at the second stage refers to the temperature at which weight loss newly starts, exceeding the temperature at which the first-stage weight loss ends.

In order to achieve excellent charge/discharge cycle performance in the negative electrode, the preferable temperature at which weight loss starts in thermogravimetry of the negative active material is not lower than 350° C. at the first stage and not higher than 800° C. at the second stage.

The first-stage weight loss means the amount of weight loss in the temperature rising period from the temperature at which weight loss starts, to the temperature at which weight loss ends at the first stage. Likewise, the second-stage weight loss means the amount of weight loss in the temperature rising period from the temperature at which weight loss starts to the temperature at which weight loss ends at the second stage. In addition, weight loss in the present invention refers to the amount of weight loss to the weight of the negative active material prior to the temperature rise.

In the silicon-carbon composite used as an active material in the present invention, the temperature at which weight loss starts and the amount of weight loss in thermogravimetry can be controlled in the following manner.

Carbon powder is added to silicon powder, these powders are mixed and ground in a ball mill, and then granulated bodies of silicon and carbon are prepared. The granulated particle thus prepared is put into a stainless steel container, a nitrogen atmosphere is created entirely in the stainless steel container while the container is agitated, the internal temperature is then raised up to nearly 1000° C., subsequently benzene vapor is introduced in said stainless steel container, and CVD process is executed to coat the granulated body with carbon material. After that, the temperature is lowered down to the room temperature under nitrogen atmosphere, and a negative active material can be obtained. As silicon material other than silicon powder, it is also possible to use silicon oxides or their mixtures. In this case, with CVD temperature being maintained lower than 1100° C., the temperature at which weight loss starts at the first stage can be kept not higher than 600° C.

Various negative active materials, different in the temperature at which weight loss starts and the amount of weight loss in thermogravimetry, can be prepared by changing the following factors: the average particle size of silicon material; the average particle size, specific surface area, and average interplanar spacing d (002) of carbon powder; the mixture ratio of silicon powder to carbon powder; the mixed grinding time in a ball mill; and the type of organic constituent vapor to be introduced in a container, temperature, and time for CVD process.

As a binder to be used in the negative electrode, a variety of materials are usable accordingly without special limitation. For example, the following materials or derivatives thereof can be used alone or in combination with two or more: styrene-butadiene rubber (SBR) or carboxymethylcellulose (CMC), poly(vinylidene fluoride), carboxy poly (vinylidene fluoride), poly(tetrafluoroethylene), poly(tetrafluoroethylene-hexafluoroethylene), poly(tetrafluoroethylene-hexafluoropropylene), vinylidene fluoride-chlorotrifluoroethylene copolymer, poly(vinylidene fluoride-hexafluoropropylene), ethylene-propylene-diene copolymer, acrylonitrile-butadiene rubber, fluoro rubber, polyvinyl acetate, poly-methyl methacrylate, nitrocellulose, polyethylene, or polypropylene.

As a solvent or solution to be used when the negative active material and the binder are compounded, it is possible to use a solvent or solution which is capable of dissolving or dispersing the binder; for example, non-aqueous solvent or aqueous solution. The following can be included as an example of non-aqueous solvent: n-methyl-2-pyrrolidone, dimethyl formamide, dimethyl acetamide, methyl ethyl ketone, cyclohexanone, methyl acetate, methyl acrylate, diethyl triamine, n,n-dimethyl amino propyl amine, ethylene oxide, and tetrahydrofuran.

As a current collector of the negative electrode, usable materials include iron, copper, stainless, or nickel. Concerning its configuration, the following shapes can be used: sheet, plane, network, foam, sintered porosity, and expanded lattice. It is also possible to use the one which is configured by putting a hole in any shape in a material which has been formed into the above-listed shape.

As a positive active material to be used in the present invention, a variety of materials are usable accordingly without special limitation. For example, the transition metallic compounds such as manganese dioxide or vanadium pentoxide; the transition metallic chalcogenides such as iron sulfide or titanium sulfide; the composite oxides of such transition metal and lithium, $Li_xMO_{2-\delta}$ (composite oxides where M represents Co, Ni, or Mn, $0.4 \leq X \leq 1.2$, and $0 \leq \delta \leq 0.5$); or such composite oxides which contain at least one element selected from the group consisting of Al, Mn, Fe, Ni, Co, Cr, Ti, and Zn, or nonmetallic element such as P or B. It is also possible to use lithium-nickel composite oxides, or the positive active materials represented by $Li_xNi_pM1_qM2_rO_{2-\delta}$ (composite oxides where M1 and M2 represent at least one element selected from the group consisting of Al, Mn, Fe, Ni, Co, Cr, Ti, and Zn, or nonmetallic element such as P or B; $0.4 \leq X \leq 1.2$, $0.8 \leq p+q+r \leq 1.2$, and $0 \leq \delta \leq 0.5$.) Among them, capable of attaining high voltage and high energy density, and also superior in cycle performance, lithium-cobalt composite oxides or lithium-cobalt-nickel composite oxides are preferred.

As a binder to be used in the positive electrode, a variety of materials are usable accordingly without special limitation. For example, the following materials or derivatives thereof can be used alone or in combination with two or more: poly(vinylidene fluoride), poly(vinylidene fluoride-hexafluoropropylene), poly(tetrafluoroethylene), fluorinated poly(vinylidene fluoride), ethylene-propylene-diene methylene linkage, styrene-butadiene rubber, acrylonitrile-butadiene rubber, fluoro rubber, polyvinyl acetate, poly-methyl methacrylate, polyethylene, or nitrocellulose.

As an electronic conductive additive to be used in the positive electrode, a variety of materials are usable accordingly without special limitation. For example, Ni, Ti, Al, Fe or alloy of two or more of these elements, or carbon material can be used. Among these, it is preferable to use carbon material. As some examples of carbon material, the following amorphous carbon can be listed: natural graphite, artificial graphite, vapor grown carbon fiber, acetylene black, ketjen black, and needle coke.

As an organic solvent for the electrolyte solution to be used in the present invention, a variety of solvents are usable accordingly without special limitation. For example, ethers, ketones, lactones, nitriles, amines, amides, sulfur compounds, halogenated hydrocarbons, esters, carbonates, nitro compounds, phosphate ester compounds, and sulfolane hydrocarbons can be used. Among these, it is preferable to use ethers, ketones, esters, lactones, halogenated hydrocarbons, carbonates, or sulfolane hydrocarbons.

Furthermore, as some examples of these, there are tetrahydrofuran, 2-methyl tetrahydrofuran, tetrahydropyran, 1,4-dioxan, anisole, monoglyme, 4-methyl-2-pentanone, methyl acetate, ethyl acetate, methyl propionate, ethyl propionate, 1,2-dichloroethane, γ-butyrolactone, γ-valerolactone, dimethoxyethane, diethoxyethane, methyl formate, dimethyl carbonate, methyl ethyl carbonate, diethyl, carbonate, dipropyl carbonate, methylpropyl carbonate, ethylene carbonate, propylene carbonate, vinylene carbonate, butylene carbonate, dimethyl formamide, dimethyl sulfoxide, dimethyl formamide, sulfolane, 3-methyl sulfolane, trimethyl phosphate, triethyl phosphate, and phosphazene derivatives and mixed solvents thereof. Among these, ethylene carbonate, propylene carbonate, γ-butyrolactone, dimethyl carbonate, methyl ethyl carbonate, and diethyl carbonate can be used alone or in combination with two or more.

As a solute for the electrolyte to be used in the present invention, a variety of solutes are usable accordingly without special limitation. For example, the following can be used alone or in combination with two or more: $LiClO_4$, $LiBF_4$, $LiAsF_6$, $LiPF_6$, $LiCF(CF_3)_5$, $LiCF_2(CF_3)_4$, $LiCF_3(CF_3)_8$, $LiCF_4(CF_3)_2$, $LiCF_5(CF_3)$, $LiCF_3(C_2F_5)_3$, $LiCF_3SO_3$, $LiN(CF_3SO_2)_2$, $LiN(C_2F_5SO_2)_2$, $LiN(C_2F_5CO)_2$, $LiI$, $LiAlCl_4$, and $LiBC_4O_8$. Among them, the use of $LiPF_6$ is preferred. Moreover, it is preferable that their lithium salt concentrations be 0.5 to 2.0 mol $dm^{-3}$.

Furthermore, at least one material selected from the group consisting of the following may be contained in the electrolyte to be used: carbonates such as vinylene carbonate and butylene carbonate; benzenes such as biphenyl and cyclohexylbenzen; sulfurs such as propane sultone; ethylenesulfide, hydrogen fluoride and triazole cyclic compounds; fluorine-containing esters; hydrogen fluoride complexes of tetraethylammonium fluoride or derivatives thereof; phosphazene and the derivatives; amido group-containing compounds; imino group-containing compounds; or nitrogen-containing compounds. It is also possible to use the electrolyte which contains at least one of the following: $CO_2$, $NO_2$, $CO$, or $SO_2$.

As a separator to be used in the present invention, a variety of materials are usable accordingly without special limitation. There are for example, woven fabric, nonwoven fabric, and synthetic-resin microporous membrane; among them, synthetic-resin microporous membrane is preferred. Concerning the material for the synthetic-resin microporous membrane, it is possible to use nylon, cellulose acetate, nitrocellulose, polysulfone, polyacrylonitrile; poly(vinylidene fluoride), and polylolefins such as polyethylene, polypropylene, and polybutene; among them, in the light of the thickness, strength, and resistance of membrane, the microporous membrane made of polyethylene or polypropylene, or the polyolefin microporous membrane such as polyethylene-polypropylene composite microporous membrane is preferred. It is also possible to use a separator which is configured by laminating several sheets of microporous membrane different in material, weight average molecular weight, or porosity; or by adding an appropriate amount of additives of various kinds such as plasticizers, antioxidants, and flame retardants to such microporous membrane.

For the above described electrolyte, furthermore, an ion-conducting electrolyte of a solid or gel state can be used either alone or in combination. In case of using it in combination, a non-aqueous electrolyte secondary battery is configured with a positive electrode, a negative electrode, and a combination of a separator, an organic or inorganic solid electrolyte, and the above-described non-aqueous electrolyte solution; or with a positive electrode, a negative electrode, and a combination of an organic or inorganic solid electrolyte membrane, as a separator, and the above-described non-aqueous electrolyte solution. It is also possible to use porous polymer electrolyte membrane of a solid state for an ion-conducting electrolyte. And for an ion-conducting electrolyte, the following can be used: polyethylene oxide, polypropylene oxide, polyacrylonitrile, polyethylene glycol, and derivatives thereof; and thio-licicon typified by LiI, $Li_3N$, $Li_{1+x}M_xTi_{2-x}(PO_4)_3$ (where M=Al, Sc, Y, and La), $Li_{0.5-3x}R_{0.5+x}TiO_3$ (where R=La, Pr, Nd, and Sm), or $Li_{4-x}Ge_{1-x}P_xS_4$. It is also possible to use oxide glass such as $LiI—Li_2O—B_2O_5$ or $Li_2O—SiO_2$, or sulfide glass such as $LiI—Li_2S—B_2S_3$, $LiI—Li_2S—SiS_2$, or $Li_2S—SiS_2—Li_3PO_4$.

Furthermore, there is no special limitation on a form of battery; the present invention is applicable to non-aqueous electrolyte secondary batteries of various forms including prismatic, elliptic, cylindrical, coin, button, and sheet type batteries.

Embodiment A

Embodiment A1

Figure 2:
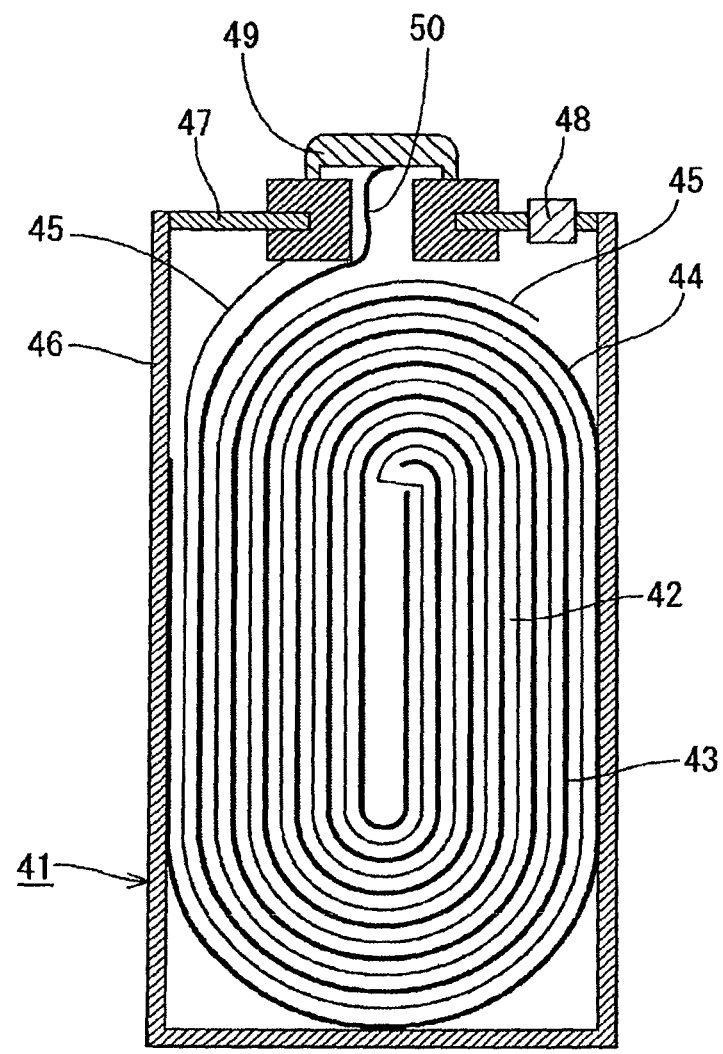
FIG. 2 is a view showing the cross sectional configuration of a prismatic battery used in Embodiment A.

Lithium cobalt oxide was used as a positive active material in the preparation of a non-aqueous electrolyte secondary battery of a prismatic type. FIG. 2 shows the cross sectional configuration of a non-aqueous electrolyte secondary battery of a prismatic type. In FIG. 2, the non-aqueous electrolyte secondary battery of a prismatic type is expressed as 41, winding-type electrodes as 42, an positive electrode as 43, a negative electrode as 44, a separator as 45, a battery case as 46, a battery cap as 47, a safety valve as 48, a positive terminal as 49, and a positive lead as 50.

The winding-type electrodes 42 is housed in the battery case 46, the battery case 46 is equipped with the safety valve 48, and the battery cap 47 and the battery case 46 are sealed up by means of laser welding. The positive terminal 49 is connected with the positive electrode 43 with the positive lead 50, and the negative electrode 44 is connected to the inner wall of the battery case 46 in direct contact.

The positive electrode was prepared according to the following manner. 90 wt. % of LiCoO$_2$ as an active material, 5 wt. % of acetylene black as a conductive material, and 5 wt. % of poly(vinylidene fluoride) as a binder were mixed together to form a positive composite, and this composite was dispersed in N-methyl-2-pyrrolidone to make a positive paste. The obtained positive paste was uniformly applied to an aluminum current collector having a thickness of 20 μm, and after dried, the obtained material was compressed and molded by roll pressing to prepare the positive electrode.

The negative electrode was prepared according to the following manner. The surface of Si particle was coated with carbon material by means of CVD method, and composite particle was prepared (which corresponds to the composite particle in the present invention, and hereinafter referred to as the composite particle (C)). The composite particle (C), which was configured so that the coating amount of the carbon material was 20 wt. %, was mixed with natural graphite (d002 of 0.3359 nm, and BET specific surface area of 7.4 cm$^2$/g), as carbon material (which corresponds to the carbon material in the present invention, and hereinafter referred to as the carbon material (D)), in a weight ratio of 80:20 to prepare a negative active material. 90 wt. % of the obtained negative active material and 10 wt. % of carboxy poly(vinylidene fluoride) as a binder were mixed together to form a negative composite, and this composite was dispersed in N-methyl-2-pyrrolidone to make a negative paste.

The above-obtained negative paste was uniformly applied to a copper foil having a thickness of 15 μm, and after dried at 100° C. for 5 hours, this material was compressed and molded by roll pressing to prepare the negative electrode.

For the separator, a polyethylene microporous membrane having a thickness of approximately 25 μm was used.

An electrolyte solution was prepared as follows: ethylene carbonate and diethyl carbonate were mixed together in a volume ratio of 1:1, and then 1.0 M of LiPF$_6$ was dissolved in the obtained mixture.

Embodiments A2 to A5, and Comparative Example A1

In these batteries, the following weight percentages were used as the amount of carbon coating in the composite particle (C): 0, 5, 40, 60, and 70 wt. %. Except for the above, the batteries have an identical configuration to that of Embodiment A1.

These non-aqueous electrolyte secondary batteries were charged at a constant current of 1 CmA and a constant voltage of 3.9 V at a temperature of 25° C. for 3 hours and made to reach a fully charged state. Subsequently, they were discharged at a current of 1 CmA until the voltages dropped to 2.45 V. These steps were taken as one cycle and the obtained discharge capacity was considered as the initial discharge capacity. After that, under the same conditions as the above, a total of 100 charge/discharge cycles were carried out, and the discharge capacity at the 1st cycle and a change in discharge capacity with an increase in the number of cycle times (capacity retention ratio according to cycle) were determined. The results are shown in Table A1.

TABLE A1

|  | Proportion of the composite particle (C) in the negative active material (wt. %) | Amount of carbon coating in the composite particle (C) (wt. %) | Proportion of the carbon material (D) in the negative active material (wt. %) | Capacity retention ratio according to cycle (%) | Discharge capacity (mAh) |
|---|---|---|---|---|---|
| EM A1 | 80 | 20 | 20 | 90 | 640 |
| EM A2 | 80 | 5.0 | 20 | 89 | 650 |
| EM A3 | 80 | 40 | 20 | 93 | 630 |
| EM A4 | 80 | 60 | 20 | 94 | 590 |
| CE A1 | 80 | 0 | 20 | 34 | 670 |
| EM A5 | 80 | 70 | 20 | 67 | 560 |

In Tables A1 to A4, EM in the first column refers to Embodiment and CE refers to Comparative Example; for example, EM A1 refers to Embodiment A1 and CE A1 refers to Comparative Example A1.

Here, the capacity retention ratio according to cycle means the percentage (%) obtained by dividing the discharge capacity at the 100$^{th}$ cycle by the one at the 1$^{st}$ cycle.

As shown in the results of Embodiments A1 to A5 and Comparative Example A1, the batteries in which carbon coating was applied in the composite particle (C) are superior in the cycle performance, although the one in which the amount of carbon coating exceeds 70 wt. % shows a deterioration in the cycle performance; therefore, it is found that the preferable amount of carbon coating is not greater than 60 wt. %. In addition, since initial discharge capacities decrease significantly when the amount of carbon coating exceeds 40 wt. %, it is also clear that the more preferable amount of carbon coating is not greater than 40 wt. %.

Embodiments A6 to A9

In these batteries, the following distances were used as the average interplanar spacing d (002) of the carbon to be used for coating in the composite particle (C): 0.3354 nm, 0.3482 nm, 0.3510 nm, and 0.370 nm. Except for the above, the batteries have an identical configuration to that of Embodiment A1.

In the same manner as the above, the discharge capacity at the 1$^{st}$ cycle and a change in discharge capacity with an increase in the number of cycle times (capacity retention ratio according to cycle) were determined. The results are shown in Table A2.

TABLE A2

|  | d (002) (nm) | Capacity retention ratio according to cycle (%) | Discharge capacity (mAh) |
|---|---|---|---|
| EM A1 | 0.3359 | 90 | 640 |
| EM A6 | 0.3354 | 89 | 650 |
| EM A7 | 0.3482 | 81 | 638 |
| EM A8 | 0.3510 | 74 | 635 |
| EM A9 | 0.370 | 70 | 630 |

As shown in the results of the capacity retention ratios of Embodiments A1, and A6 to A9, it is preferable that the average interplanar spacing d (002) of the carbon for coating be not greater than 0.35 nm. It is believed that when the average interplanar spacing is greater than 0.35 nm, the contact conductivity between the active material and between the active material and the current collector decreases, so that the cycle performance deteriorates.

Embodiments A10 to A14

In these batteries, the following areas were used as the BET specific surface area of the composite particle (C): 1.0 m$^2$/g, 6.3 m$^2$/g, 10 m$^2$/g, 0.5 m$^2$/g, and 11.0 m$^2$/g. Except for the above, the batteries have an identical configuration to that of Embodiment A1.

In the same manner as the above, the discharge capacity at the 1$^{st}$ cycle and a change in discharge capacity with an increase in the number of cycle times (capacity retention ratio according to cycle) were determined. The results are shown in Table A3.

TABLE A3

| | BET specific surface area (m$^2$/g) | Capacity retention ratio according to cycle (%) | Discharge capacity (mAh) |
|---|---|---|---|
| EM A1 | 7.4 | 90 | 640 |
| EM A10 | 1.0 | 85 | 635 |
| EM A11 | 6.3 | 81 | 638 |
| EM A12 | 10.0 | 84 | 620 |
| EM A13 | 0.5 | 62 | 630 |
| EM A14 | 11.0 | 79 | 590 |

These results reveal that when the BET specific surface area of the composite particle (C) falls within the range of 0.1.0 to 10.0 m$^2$/g, satisfactory cycle performance is achieved. It is believed that when the BET specific surface area is less than 1.0 m$^2$/g, the current density per surface area of the active material during charge/discharge becomes large; therefore, Li is deposited on the negative electrode and consequently the cycle performance deteriorates. On the other hand, it is believed that when it exceeds 10 m$^2$/g, the reaction area with the electrolyte solution during charge becomes large and the decomposition of the electrolyte solution is made to proceed, so that the cycle performance deteriorates. In addition, it is shown that when it exceeds 10 m$^2$/g, the discharge capacity deteriorates; thus, it is preferable to employ the BET specific surface area of not larger than 10 m$^2$/g.

Embodiments A15 to A17, and Comparative Example A2

In these batteries, the following weight ratios were used as the mixture ratio of the composite particle (C) to the carbon material (D): 99.5:0.5, 60:40, 50:50, and 100:0. Except for the above, the batteries have an identical configuration to that of Embodiment A1.

In the same manner as the above, the discharge capacity at the 1st cycle and a change in discharge capacity with an increase in the number of cycle times (capacity retention ratio according to cycle) were determined. The results are shown in Table A4.

TABLE A4

| | Proportion of the composite particle (C) in the negative active material (wt %) | Proportion of the carbon material (D) in the negative active material (wt %) | Capacity retention ratio according to cycle (%) | Discharge capacity (mAh) |
|---|---|---|---|---|
| EM A1 | 80 | 20 | 90 | 640 |
| EM A15 | 99.5 | 0.5 | 85 | 650 |
| EM A16 | 60 | 40 | 94 | 630 |
| EM A17 | 50 | 50 | 95 | 580 |
| CE A2 | 100 | 0 | 72 | 660 |

These results reveal that utilizing the carbon material (D) results in improvement in the capacity retention ratio according to cycle. It is believed that the reason for this may be that the contact conductivity between the active material and between the active material and the current collector deteriorates. Furthermore, it is shown that when the proportion of the carbon material (D) to the total weight of the composite particle (C) and the carbon material (D) lies in the range of 0.5 to 40 wt. %, a battery having a large initial discharge capacity and satisfactory cycle performance can be provided.

Embodiment B

Embodiment B1

Figure 3:
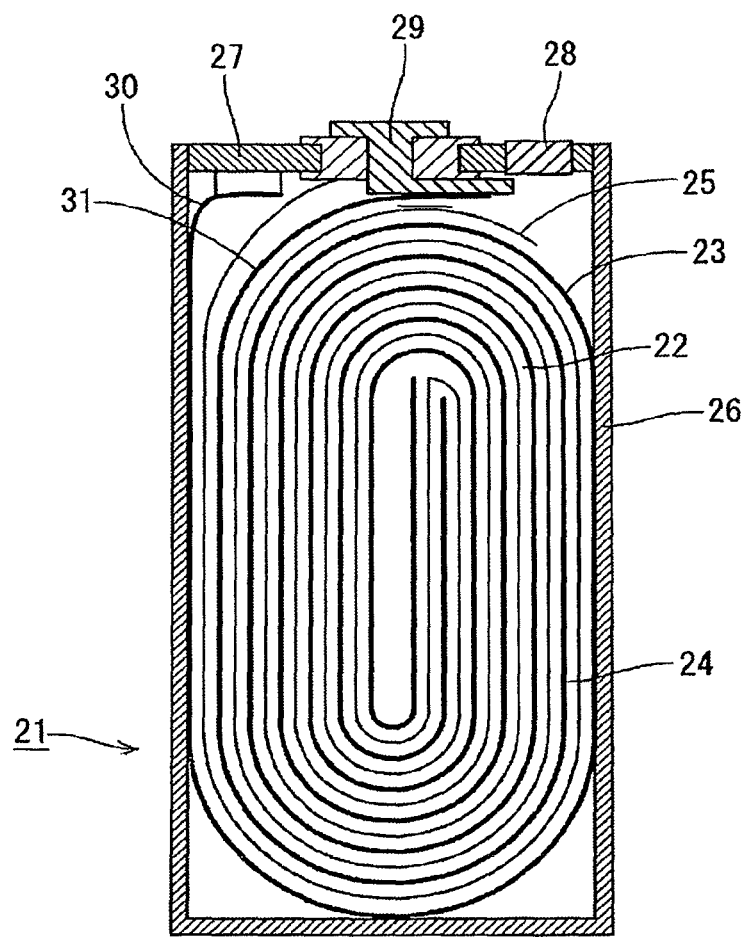
FIG. 3 is a view showing the cross sectional configuration of a prismatic battery used in Embodiment B.

Lithium cobalt oxide was used as a positive active material in the preparation of a non-aqueous electrolyte secondary battery of a prismatic type. FIG. 3 shows the cross sectional configuration of a non-aqueous electrolyte secondary battery of a prismatic type. In FIG. 3, the non-aqueous electrolyte secondary battery of a prismatic type is expressed as 21, winding-type electrodes as 22, an positive electrode as 23, a negative electrode as 24, a separator as 25, a battery case as 26, a battery cap as 27, a safety valve as 28, a negative terminal as 29, a positive lead as 30, and a negative lead as 31.

The winding-type electrodes 22 is housed in the battery case 26, and the battery cap 27 and the battery case 26 are sealed up by means of laser welding. The battery cap 27 is equipped with the safety valve 28. The negative terminal 29 is connected with the negative electrode 24 with the negative lead 31, and the positive electrode 23 is connected to the inner wall of the battery case 26 in direct contact and to the battery cap 27 with the positive lead 30.

A positive electrode plate was prepared according to the following manner. 90 wt. % of LiCoO$_2$ as an active material, 5 wt. % of acetylene black as a conductive material, and 5 wt. % of poly(vinylidene fluoride) as a binder were mixed together to form a positive composite, and this composite was dispersed in N-methyl-2-pyrrolidone to make a positive paste. The obtained positive paste was uniformly applied to an aluminum current collector having a thickness of 20 μm, and after dried, this material was compressed and molded by roll pressing to prepare the positive electrode plate. The dimensions of the positive electrode plate were 160 μm in thickness, 18 mm in width, and 600 mm in length.

A negative active material was prepared according to the following manner. As silicon material, 400 g of carbon powder (average particle size of 9 μm, specific surface area of 4 m$^2$/g, and average interplanar spacing d002 of 0.3360 nm) were added to 500 g of silicon powder (purity of 99% and average particle size of 5 µm), these powders were mixed and ground in a ball mill for 60 minutes, and then granulated bodies of silicon and carbon were prepared. 500 g of such granulated particle was put into a stainless steel container, a nitrogen atmosphere was created entirely in the stainless steel container while the container was agitated, the internal temperature was then raised up to 1000° C., subsequently benzene vapor was introduced in said stainless steel container, and CVD process was executed for 120 minutes. After that, the temperature was lowered down to the room temperature under nitrogen atmosphere, and the negative active material was obtained.

On the obtained negative active material, TG measurement was conducted, and in a temperature rise at a rate of 10±2° C./min, the following two stages of weight loss were observed: at the first stage, the temperature at which weight loss started (hereinafter referred to as T1) was 570° C. and the amount of weight loss (hereinafter referred to as W1) was 15 wt. %; and at the second stage, the temperature at which weight loss started (hereinafter referred as to T2) was 700° C. and the amount of weight loss (hereinafter referred as to W2) was 30 wt. %.

A negative electrode plate was prepared according to the following manner. 90 wt. % of the above-described negative active material and 10 wt. % of carboxy poly(vinylidene fluoride) as a binder were mixed together to form a negative composite, the obtained composite was dispersed in N-methyl-2-pyrrolidone to make a negative paste, the obtained paste was uniformly applied to a copper foil having a thickness of 15 µm, and after dried at 100° C. for 5 hours, this material was compressed and molded by roll pressing to prepare the negative electrode. The dimensions of the negative electrode plate were 180 µm in thickness, 19 mm in width, and 630 mm in length.

For the separator, a polyethylene microporous membrane having a thickness of 20 µm was used. An electrolyte solution was prepared as follows: ethylene carbonate and diethyl carbonate were mixed together in a volume ratio of 1:1, and 1.0 M of $LiPF_6$ was dissolved in the obtained mixture.

And, a winding-type power generating element was configured as follows: the positive and negative electrode plates were overlapped each other with the separator therebetween, and spirally wound in an elliptic shape around a polyethylene core as a center. This winding-type power generating element was then housed in the iron battery case of a prismatic type, the battery case was filled with the electrolyte solution, the filling port was sealed, and thus the battery was prepared. The dimensions of the battery were 47 mm in length, 23 mm in width, and 8 mm in thickness, and the rated capacity was 600 mAh. This battery was termed Battery A.

This non-aqueous electrolyte secondary battery was charged at a constant current of 600 mA at a temperature of 25° C., at first until the voltage reached 4.2 V and, when reached, at a constant voltage of 4.2 V, for a total of 3 hours, and made to reach a fully charged state. Subsequently, the battery was discharged at a constant current of 600 mA until the voltage dropped to 2.45 V. These steps were taken as one cycle and the obtained discharge capacity was considered as the initial discharge capacity. After that, under the same conditions as the above, a total of 100 charge/discharge cycles were carried out, and the discharge capacity at the $1^{st}$ cycle (initial discharge capacity), the thickness of battery at the $1^{st}$ charge/discharge cycle, and a change in discharge capacity with an increase in the number of charge/discharge cycles were determined. Here, the percentage (%) of the discharge capacity at the $100^{th}$ cycle to the one at the $1^{st}$ cycle refers to "capacity retention ratio."

Except for using the negative active materials which differ in the number of stages at which weight loss appeared, the temperature at which weight loss started, and the amount of weight loss in the TG measurement conducted at a temperature rising rate of 10±2° C./min, the batteries listed in Table B2 have an identical configuration to that of Embodiment B1. The producing conditions used for each battery are listed in Table B3.

The carbon material for each Embodiment and Comparative Example was prepared in the following manner. A given amount of carbon powder feeding, listed in Table B1, was added to 500 g of silicon powder; these powders were milled in a ball mill for a given period of time, listed in Table B1, to prepare granulated bodies; 500 g of such granulated particle was then put into a stainless steel container; the internal temperature was raised up to a given temperature for CVD process, listed in Table B1; benzene vapor was introduced; and CVD process was performed for a given period of time, listed in Table B1.

TABLE B1

| Battery | | Temperature for CVD process ° C. | Time for CVD process min. | Time for ball milling min. | Amount of feeding g |
|---|---|---|---|---|---|
| EM B1 | A | 1000 | 120 | 60 | 400 |
| EM B2 | B | 800 | 120 | 60 | 400 |
| EM B3 | C | 1050 | 120 | 60 | 400 |
| EM B4 | D | 1000 | 120 | 120 | 400 |
| EM B5 | E | 1000 | 120 | 40 | 400 |
| EM B6 | F | 780 | 120 | 60 | 400 |
| EM B7 | G | 1000 | 120 | 30 | 400 |
| EM B8 | H | 1000 | 40 | 60 | 400 |
| EM B9 | I | 1000 | 200 | 60 | 400 |
| EM B10 | J | 1000 | 120 | 60 | 130 |
| EM B11 | K | 1000 | 120 | 60 | 800 |
| EM B12 | L | 1000 | 120 | 60 | 400 |
| CM B1 | M | — | — | — | — |
| CE B2 | N | 1000 | 120 | — | — |
| CE B3 | O | 1200 | 120 | — | — |
| EM B13 | P | 1100 | 120 | 60 | 400 |
| EM B14 | Q | 1000 | 120 | 140 | 400 |
| EM B15 | R | 1000 | 8 | 60 | 400 |
| EM B16 | S | 1000 | 320 | 60 | 400 |
| EM B17 | T | 1000 | 120 | 60 | 40 |
| EM B18 | U | 1000 | 120 | 60 | 930 |

In Tables B1 to B3, EM in the first column refers to Embodiment and CE refers to Comparative Example; for example, EM B1 refers to Embodiment B1 and CE B1 refers to Comparative Example B1.

TABLE B2

| | Battery | Number of stages at which weight loss appeared in TG measurement | Temperature at which weight loss started ° C. | | Amount of weight loss % | |
|---|---|---|---|---|---|---|
| | | | T1 | T2 | W1 | W2 |
| EM B1 | A | 2 | 570 | 700 | 15 | 30 |
| EM B2 | B | 2 | 370 | 700 | 15 | 30 |
| EM B3 | C | 2 | 590 | 700 | 15 | 30 |
| EM B4 | D | 2 | 570 | 620 | 15 | 30 |
| EM B5 | E | 2 | 570 | 780 | 15 | 30 |
| EM B6 | F | 2 | 340 | 700 | 15 | 30 |

TABLE B2-continued

| Battery | | Number of stages at which weight loss appeared in TG measurement | Temperature at which weight loss started °C. | | Amount of weight loss % | |
|---|---|---|---|---|---|---|
| | | | T1 | T2 | W1 | W2 |
| EM B7 | G | 2 | 570 | 810 | 15 | 30 |
| EM B8 | H | 2 | 570 | 700 | 5 | 30 |
| EM B9 | I | 2 | 570 | 700 | 25 | 30 |
| EM B10 | J | 2 | 570 | 700 | 15 | 10 |
| EM B11 | K | 2 | 570 | 700 | 15 | 60 |
| EM B12 | L | 2 | 570 | 700 | 15 | 30 |
| CE B1 | M | 0 | — | — | — | — |
| CE B2 | N | 1 | 570 | — | 15 | — |
| CE B3 | O | 1 | 650 | — | 15 | — |
| EM B13 | P | 2 | 620 | 700 | 15 | 30 |
| EM B14 | Q | 2 | 570 | 580 | 15 | 30 |
| EM B15 | R | 2 | 570 | 700 | 1 | 30 |
| EM B16 | S | 2 | 570 | 700 | 40 | 30 |
| EM B17 | T | 2 | 570 | 700 | 15 | 3 |
| EM B18 | U | 2 | 570 | 700 | 15 | 70 |

TABLE B3

| Battery | | Initial discharge capacity mAh | Battery thickness during charge mm | Capacity retention ratio % |
|---|---|---|---|---|
| EM B1 | A | 650 | 6.10 | 90 |
| EM B2 | B | 650 | 6.15 | 89 |
| EM B3 | C | 650 | 6.10 | 88 |
| EM B4 | D | 650 | 6.10 | 86 |
| EM B5 | E | 650 | 6.15 | 90 |
| EM B6 | F | 640 | 6.20 | 68 |
| EM B7 | G | 640 | 6.20 | 72 |
| EM B8 | H | 660 | 6.15 | 85 |
| EM B9 | I | 645 | 6.10 | 90 |
| EM B10 | J | 665 | 6.10 | 86 |
| EM B11 | K | 635 | 6.10 | 91 |
| EM B12 | L | 628 | 6.10 | 96 |
| CE B1 | M | 630 | 6.50 | 20 |
| CE B2 | N | 630 | 6.25 | 40 |
| CE B3 | O | 670 | 6.30 | 50 |
| EM B13 | P | 650 | 6.30 | 63 |
| EM B14 | Q | 640 | 6.30 | 61 |
| EM B15 | R | 660 | 6.30 | 52 |
| EM B16 | S | 625 | 6.10 | 56 |
| EM B17 | T | 665 | 6.30 | 38 |
| EM B18 | U | 605 | 6.10 | 53 |

The evaluation results for these batteries are shown in Table B3.

These results reveal the following findings. In the batteries having the negative active material which exhibits two-stage weight loss, the thickness of the batteries during charge is small and the charge/discharge cycle performance is satisfactory. On the other hand, in the battery having the negative active material which exhibits no weight loss, the thickness of the battery during charge is large and the charge/discharge cycle performance is unsatisfactory. In addition, in the batteries having the negative active material which exhibits one-stage weight loss, the charge/discharge cycle performance is unsatisfactory. Moreover, those having the negative active material in which T1 is not higher than 600° C. and T2 is not lower than 600° C. show extremely, excellent charge/discharge cycle performance.

Furthermore, in the batteries having the negative active material in which W1 and W2 fall within the ranges of 3 to 30 wt. % and 5 to 65 wt. %, respectively, to the weight prior to the temperature rise in TG measurement, it is found that the swelling of the batteries is not significant and extremely excellent charge/discharge cycle performance is exhibited. In addition, in Battery L having the negative active material which was prepared using a mixture of carbon and silicon-carbon composite, although the initial discharge capacity is a little inferior to that of Battery A, the capacity retention ratio stands at 96% and therefore further improvement in charge/discharge cycle performance was able to be confirmed.

Embodiment C

Figure 4:
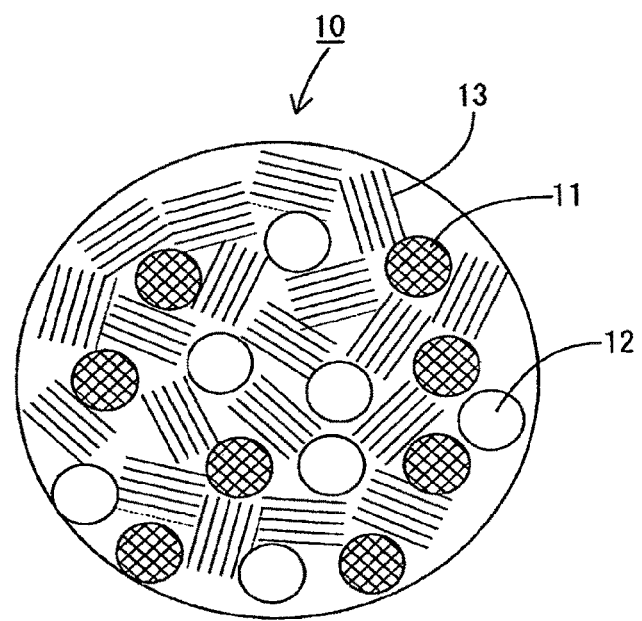
FIG. 4 is a schematic view showing the cross section of a composite particle used in Embodiment C.

FIGS. 4 to 7 show schematic views of the composite particle described in claim 6. FIG. 4 is a schematic view illustrating the composite particle 10, which is composed of the particle 11 consisting of Si, the particle 12 consisting of $SiO_x$ (where $0<X\leq2$), and the carbon material 13.

The above composite particle 10 can be obtained by milling the particle 11 consisting of Si, the particle 12 consisting of $SiO_x$, and the carbon material 13 with the use of a milling machine. Such a milling process can be carried out in the air; however, an inert atmosphere such as argon or nitrogen is preferred. There are following types of milling process: ball mill, vibration mill, satellite ball mill, tube mill, jet mill, rod mill, hammer mill, roller mill, disc mill, attritor mill, planetary ball mill, and impact mill. It is also possible to use mechanical alloying method. The applicable range of milling temperature is from 10° C. to 300° C.; and that of milling time is from 30 seconds to 48 hours.

Figure 5:
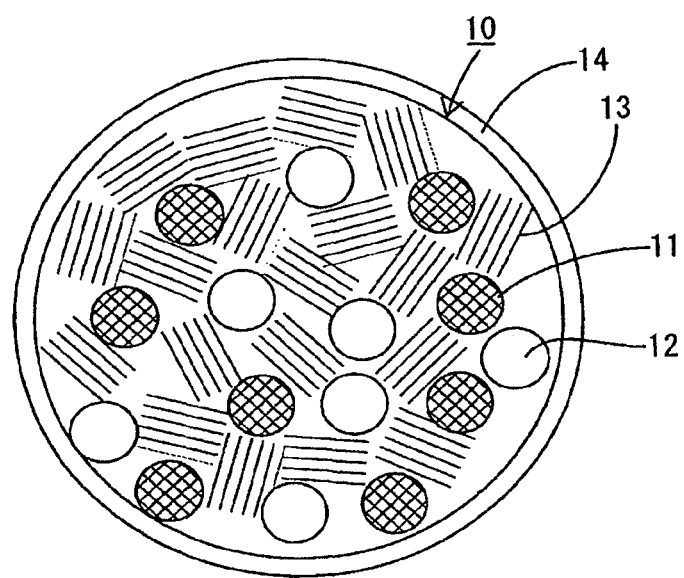
FIG. 5 is a schematic view showing the cross section of a composite particle used in Embodiment C.
Figure 6:
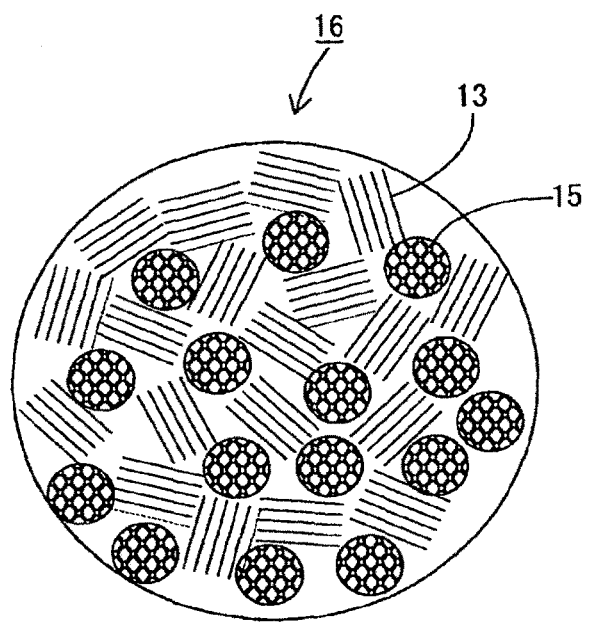
FIG. 6 is a schematic view showing the cross section of a composite particle used in Embodiment C.
Figure 7:
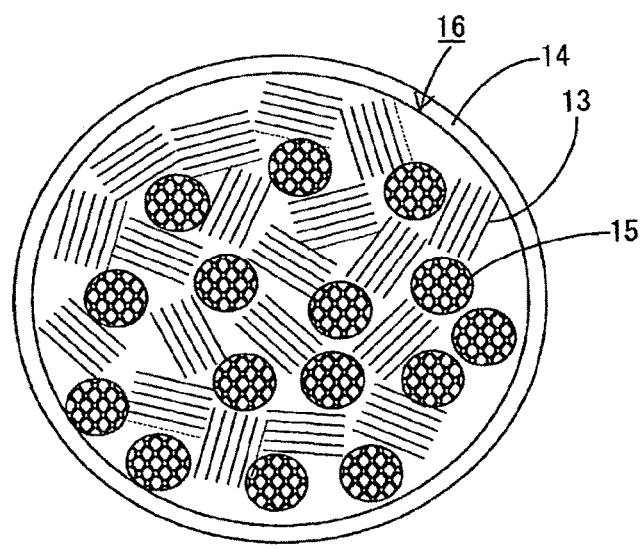
FIG. 7 is a schematic view showing the cross section of a composite particle used in Embodiment C.

FIG. 5 is a schematic view illustrating the composite particle, which is configured by coating the surface of the above-described composite particle 10 with the carbon material 14. FIG. 6 is a schematic view illustrating the composite particle 16, which is composed of the particle 15 containing Si and $SiO_x$ (where $0<X\leq2$) and the carbon material 13. Such composite particle 16 can be obtained according to the reparation procedures identical to those of the composite particle 10, by using the particle 15 containing Si and $SiO_x$ and the carbon material 13. FIG. 7 is a schematic view illustrating the composite particle, which is configured by coating the surface of the above-described composite particle 16 with the carbon material 14.

In order to coat the surface of the composite particle 10 or 16 with the carbon material 14, the following methods can be used: coating the surface of the composite particle 10 or 16 with an organic compound and then performing calcination; or utilizing chemical vapor deposition (CVD) technique.

In CVD method, it is possible to use organic compounds such as methane, acetylene, benzene, toluene, etc. as a reaction gas. The applicable reaction temperature and time, respectively, range from 700° C. to 1300° C. and from 30 seconds to 72 hours. Using CVD method, coating treatment with carbon material can be implemented at a lower reaction temperature, in comparison with the method of calcinating an organic compound on the surface. Therefore, CVD method is preferred in that the coating treatment can be performed at a temperature not higher than the respective melting points of the particle 11 consisting of Si, the particle 12 consisting of $SiO_x$, and the particle 15 containing Si and $SiO_x$.

By performing Raman spectroscopic analysis, it is possible to determine whether or not the surface of the composite particle 10 is coated with the carbon material 14. Since the surface area of a sample is analyzed by Raman spectroscopic analysis, if the surface of the composite particle 10 is entirely coated with the carbon material 14, R value (intensity ratio of a peak intensity of 1360 cm$^{-1}$ to a peak intensity of 1580 cm$^{-1}$), which indicates the crystalline quality of the carbon material 14 on the surface, should stand at a constant value wherever measurement is taken on the particle of the negative active material. For conducting Raman spectroscopic analysis, it is possible to use, for example, a spectrometer T64000 (JOBIN YVON).

Regarding the particle consisting of Si, the particle consisting of SiO$_x$ (where 0<X≤2), or the particle containing Si and SiO$_x$ (where 0<X≤2), the following can also be used: the particles which have been washed with such acid as fluorinated acid or sulfuric acid, or the particles which have been reduced with hydrogen.

The proportions of the carbon material 13 and the carbon material 14 to the entire negative active material can be determined by means of thermogravimetry. For example, in thermogravimetry at a temperature rising rate of 10±2° C./min, the carbon material 13 and the carbon material 14 are observed to exhibit weight loss in a temperature range of 30° C. to 1000° C. In the vicinity of 580° C., the carbon material 14 of relatively low crystalline on the surface of the composite particle 10 is observed to exhibit weight loss, and next in the vicinity of 610° C., the carbon material 13 which was milled together with the particle 11 consisting of Si, the particle 12 consisting of SiO$_x$, and the particle 15 containing Si and SiO$_x$, is observed to exhibit weight loss. The particle 11 consisting of Si, the particle 12 consisting of SiO$_x$, and the particle 15 containing Si and SiO$_x$ are observed to exhibit weight loss in a range of around 1500° C. to 2000° C. Based on these results, the weight ratio of each material can be determined.

As a device for such thermogravimetry, it is possible to use, for example, SSC/5200 (Seiko Instruments Inc.). The specific surface area of the negative active material can be determined by low-temperature gas adsorption technique, according to dynamic constant pressure method at a range of pressure measurement from 0 to 126.6 KPa, using, for example, a micromeritics analyzer GEMINI2370 (SHIMADZU) with the use of liquid nitrogen, and analyzed by means of BET method. And as data processing software, GEMINI-PC1 can be used.

Embodiment C1

As a negative active material, composite particle was prepared by treating 30 parts by weight of Si, 30 parts by weight of SiO$_2$, and 40 parts by weight of artificial graphite under nitrogen atmosphere by ball milling at 25° C. for 30 minutes.

95 wt. % of the above-obtained negative active material, 3 wt. % of SBR, and 2 wt. % of CMC were mixed in water to prepare a negative paste. The obtained negative paste was applied to a copper foil having a thickness of 15 µm so that the weight of the coating could be 1.15 mg/cm$^2$ and the quantity of the negative active material to be housed in the battery could be 2 g, and then dried at 150° C. to evaporate water. This process was performed on both sides of the copper foil, which then compressed and molded by roll pressing. Thus, a negative electrode plate both sides of which were coated with the negative composite layer was prepared.

90 wt. % of lithium cobalt oxide as a positive active material, 5 wt. % of acetylene black as a conductive material, and 5 wt. % of PVDF as a binder were dispersed in NMP to make a positive paste. The obtained positive paste was applied to an aluminum foil having a thickness of 20 µm so that the weight of the coating could be 2.5 mg/cm$^2$ and the quantity of the positive active material to be housed in the battery could be 5.3 g, and then dried at 150° C. to evaporate NMP. The above-described process was performed on both sides of the aluminum foil, which then compressed and molded by roll pressing. Thus, a positive electrode plate both sides of which were coated with the positive composite layer was prepared.

A winding-type power generating element was made by overlapping and winding the positive and negative electrode plates thus prepared with a polyethylene separator, with continuous porosity having a thickness of 20 µm and a porosity of 40%, being placed between them. This winding-type power generating element was housed in the case having 48 mm in height, 30 mm in width, and 4.2 mm in thickness, the case was then filled with a non-aqueous electrolyte solution, and thus a non-aqueous electrolyte secondary battery of a prismatic type was prepared. The used non-aqueous electrolyte solution was prepared as follows: ethylene carbonate (EC) and diethyl carbonate (DEC) were mixed together in a volume ratio of 1:1, and 1 mol/l of LiPF$_6$ was dissolved in the mixed solvent thus prepared.

Embodiment C2

In Embodiment C2, a negative active material was prepared as follows: composite particle was prepared by treating 20 parts by weight of Si, 20 parts by weight of SiO$_2$, and 40 parts by weight of artificial graphite under nitrogen atmosphere by ball milling at 25° C. for 30 minutes, and after that, by means of the method (CVD) of thermally decomposing methane at 900° C., the surface of the composite particle was coated with carbon material. Except for using the negative active material thus prepared, the non-aqueous electrolyte secondary battery has an identical configuration to that of Embodiment C1.

Embodiment C3

In Embodiment C3, SiO was used in stead of SiO$_2$. Except for the above, the non-aqueous electrolyte secondary battery has an identical configuration to that of Embodiment C2

Comparative Examples C1 to C4

In Comparative Examples C1 to C4, those listed in Table C1 were employed. Except for the above, the non-aqueous electrolyte secondary batteries have an identical configuration to that of Embodiment C2.

<Measurement>
(Raman Spectroscopic Analysis)

On each negative active material prepared as above, Raman spectroscopic analysis was conducted according to the above-described manner to determine an R value. The R value was found to be approximately 0.8 in any measurement point on the particle of the negative active material. This R value will stand at 0 when the sample is highly crystalline, and as the crystalline quality becomes lower, the value will become larger. Because of the value being approximately 0.8, this particle was confirmed to be uniformly coated with the carbon material of relatively low crystalline which was deposited by means of CVD method.

(Thermogravimetry)

On each negative active material prepared as above, thermogravimetry was employed according to the above-described manner, and the weight ratio of each material was determined.

(XRD)

On each negative active material prepared as above, X-ray diffraction was performed according to the above-described manner, and the average interplanar spacing d(002) of the carbon material was determined from the diffraction angle (2 θ) in the X-ray diffraction pattern with CuK α radiation.

(BET Specific Surface Area)

For each negative active material prepared as above, BET specific surface area was determined according to the above-described manner.

(Charge/Discharge Performance)

Each non-aqueous electrolyte secondary battery prepared as above was charged at a current of 1 CmA at a temperature of 25° C. until the voltage reached 4.2 V, subsequently charged at a constant voltage of 4.2 V for 2 hours, and then discharged at a current of 1 CmA until the voltage dropped to 2.0 V. These steps were taken as one cycle and the charge/discharge test was repeated 500 cycles. The ratio (expressed in percentage) of the discharge capacity at the $500^{th}$ cycle to the one at the $1^{st}$ cycle referred to the capacity retention ratio according to cycle.

<Results>

The results of measurement were summarized in Table C1.

In Embodiments C1 to C3, the capacity retention ratios are higher than that of Comparative Example C1, where $SiO_x$ is not contained, and the discharge capacities are larger than that of Comparative Example C2, where Si is not contained. In addition, the capacity retention ratios are higher than that of Comparative Example C3, where carbon material is not contained in the composite particle, and the discharge capacities are larger than that of Comparative Example C4, where Si and $SiO_x$ are not contained.

Embodiments C2 and C3, where the particle (A) is coated with carbon, are superior in the capacity retention ratios, compared to Embodiment C1.

Embodiments C4 to C8

In Embodiments C4 to C8, as the proportions of the weight of Si to the total weight of Si and $SiO_2$, those listed in Table C2 were used. Except for the above, the non-aqueous electrolyte secondary batteries have an identical configuration to that of Embodiment C2, In addition, various measurement results regarding these embodiments were summarized in Table C2.

The batteries where the proportions of the weight of the particle consisting of Si to the total weight of the particle consisting of Si and the particle consisting of $SiO_x$ fall within the range of 20 wt. % to 80 wt. % have larger discharge capacities compared to the battery where the proportion of the weight of the particle consisting of Si stands at 10 wt. %.

Embodiments C9 to C14

In Embodiments C9 to C14, as the proportions of the additive amount of the artificial graphite which is mixed together with Si and $SiO_2$, those listed in Table C3 were used. Except for the above, the non-aqueous electrolyte secondary batteries have an identical configuration to that of Embodiment C2. Various measurement results regarding these embodiments were summarized in Table C3.

The batteries where the proportions of the artificial graphite to the entire negative active material fall within the range of 3 wt. % to 60 wt. % have higher capacity retention ratios compared to the battery where the proportion of the artificial graphite stands at 1 wt. %. On the other hand, those batteries have larger discharge capacities compared to the battery where the proportion of the artificial graphite stands at 70 wt. %.

The batteries where the proportions of the total carbon material to the entire negative active material fall within the range of 30 wt. % to 80 wt. % have higher capacity retention ratios compared to the batteries where the proportions of the total carbon material stand at 21 wt. % and 23 wt. %, respectively. In addition, the former batteries have larger discharge capacities and higher capacity retention ratios compared to the battery where the proportion of the total carbon material stands at 90 wt. %.

Embodiments C15 to C17

As the carbon material which is Mixed together with Si and $SiO_2$, natural graphite, acetylene black, and vapor grown carbon fiber were used in Embodiments C15, C16, and C17, respectively, instead of artificial graphite. Except for the above, the non-aqueous electrolyte secondary batteries have an identical configuration to that of Embodiment C2. Various measurement results regarding these embodiments as well as those of Embodiment C2 were summarized in Table C4.

Embodiments C2, C15, and C17, where the average interplanar spacing d(002) fall within the range of 0.3354 nm to 0.35 nm, have larger discharge capacities and higher capacity retention ratios compared to Embodiment C16, where d(002) is 0.37 nm.

Embodiments C18 to C20

In Embodiments C18 to C20, as the amounts of the carbon with which the surface of the composite particle was coated, those listed in Table C5 were employed to prepare negative active materials. Those values were obtained by appropriately varying the reaction conditions in the coating treatment with carbon material by means of CVD method. Except for the above, the non-aqueous electrolyte secondary batteries have an identical configuration to that of Embodiment C2. Various measurement results regarding these embodiments as well as those of Embodiment C2 were summarized in Table C5.

Embodiments C2, C18, and C19, where the proportions of the carbon material on the surface of the composite particle to the entire negative active material fall within the range of 0.5 wt. % to 40 wt. %, have larger discharge capacities and higher capacity retention ratios compared to Embodiment C20, where the proportion of the carbon material is 50 wt. %.

Embodiments C21 to C23

In Embodiments C21 to C23, the negative active materials were prepared employing the BET specific surface areas listed in Table C6. Those surface areas were obtained by using the Si, $SiO_2$, and artificial graphite which have predetermined specific surface areas. Except for the above, the non-aqueous electrolyte secondary batteries have an identical configuration to that of Embodiment C2. Various measurement results regarding these embodiments as well as those of Embodiment C2 were summarized in Table C6.

Embodiments C2, C21, and C22, where the BET specific surface areas are not greater than 10.0 m²/g, have larger discharge capacities and higher capacity retention ratios compared to Embodiment C23, where the BET specific surface area is 20.0 m²/g.

Embodiment C24

In Embodiment C24, a negative active material was prepared as follows: composite particle was prepared by treating 60 parts by weight of the particle, where Si and $SiO_2$ are contained in a weight ratio of 1:1, and 40 parts by weight of artificial graphite under nitrogen atmosphere by ball milling at 25° C. for 30 minutes. Except for using the negative active material thus prepared, the non-aqueous electrolyte secondary battery has an identical configuration to that of Embodiment C1.

Embodiment C25

In Embodiment C25, a negative active material was prepared as follows: composite particle was prepared by treating 40 parts by weight of the particle, where Si and $SiO_2$ are contained in a weight ratio of 1:1, and 40 parts by weight of artificial graphite under nitrogen atmosphere by ball milling at 25° C. for 30 minutes; and after that, by means of the method (CVD) of thermally decomposing methane at 900° C., the surface of such composite particle was coated with carbon material. Except for using the negative active material thus prepared, the non-aqueous electrolyte secondary battery has an identical configuration to that of Embodiment C24.

Embodiment C26

In Embodiment C26, SiO was used in stead of $SiO_2$. Except for the above, the non-aqueous electrolyte secondary battery has an identical configuration to that of Embodiment C25.

For the negative active materials in Embodiments C24 to C26, measurement data of Raman spectroscopic analysis, thermogravimetry, XRD, and BET specific surface area were taken according to the same manner as described in Embodiment CL In addition, for the non-aqueous electrolyte secondary batteries in Embodiments C24 to C26, charge/discharge performance was determined according to the same manner as described in Embodiment C1. The results are shown in Table C7, in which data from Comparative Examples C1 to 04 shown in Table C1 was also included for comparison.

<Results>

In Embodiments C24 to C26, the capacity retention ratios are higher than that of Comparative Example C1, where $SiO_x$ is not contained; and the discharge capacities are larger than that of Comparative Example C2, where Si is not contained. In addition, the capacity retention ratios are higher than that of Comparative Example C3, where carbon material is not contained in the composite particle; and the discharge capacities are larger than that of Comparative Example C4, where Si and SiO are not contained.

Embodiments C25 and C26, where the composite particle is coated with the carbon material, are superior in the capacity retention ratios compared to Embodiment C24.

Embodiments C27 to C31

In Embodiments C27 to C31, as the proportions of Si in the particle containing Si and $SiO_2$, those listed in Table C8 were used. Except for the above, the non-aqueous electrolyte secondary batteries have an identical configuration to that of Embodiment C25.

Various measurement results regarding these embodiments as well as those of Embodiment C25 and Comparative Examples C1 and C2 were summarized in Table C8.

Embodiments C25, C28, and C31, where the proportions of Si in the particle containing Si and $SiO_2$ fall within the range of 20 wt. % to 80 wt. %, have larger discharge capacities compared to Embodiment C27, where the proportion of Si stands at 10 wt. %.

Embodiments C32 to C37

In Embodiments C32 to C37, as the proportions of the additive amount of the artificial graphite which is mixed together with the particle containing Si and $SiO_2$, those listed in Table C9 were used. Except for the above, the non-aqueous electrolyte secondary batteries have an identical configuration to that of Embodiment C25.

Various measurement results regarding these embodiments were summarized in Table C9.

Embodiments C33 to C36, where the proportions of the artificial graphite to the entire negative active material fall within the range of 3 wt. % to 60 wt. %, have higher capacity retention ratios compared to Embodiment C32, where the proportion of the artificial graphite stands at 1 wt. %. On the other hand, Embodiments C33 to C36 have larger discharge capacities compared to Embodiment C37, where the proportion of the artificial graphite stands at 70 wt. %.

In addition, Embodiments C34 to C36, where the proportions of the total carbon material to the entire negative active material fall within the range of 30 wt. % to 80 wt. %, have higher capacity retention ratios compared to Embodiments C32 and C33, where the proportions of the total carbon material stand at 21 wt. % and 23 wt. %, respectively. Embodiments C34 to C36 have larger discharge capacities and higher capacity retention ratios compared to Embodiment C37, where the proportion of the total carbon material stands at 90 wt. %.

TABLE C1

| | Particle (A) | | | | Coating | | Specific surface area ($m^2$/g) | Discharge capacity (mAh) | Capacity retention ratio (%) |
|---|---|---|---|---|---|---|---|---|---|
| | Si (wt. %) | $SiO_2$ (wt. %) | SiO (wt. %) | Carbon (wt. %) | Carbon (wt. %) | d(002) (nm) | | | |
| EM C1 | 30 | 30 | 0 | 40 | 0 | 0.34 | 5 | 815 | 71 |
| EM C2 | 20 | 20 | 0 | 40 | 20 | 0.34 | 5 | 774 | 82 |
| EM C3 | 20 | 0 | 20 | 40 | 20 | 0.34 | 5 | 780 | 76 |
| CE C1 | 40 | 0 | 0 | 40 | 20 | 0.34 | 5 | 812 | 49 |
| CE C2 | 0 | 40 | 0 | 40 | 20 | 0.34 | 5 | 520 | 59 |
| CE C3 | 40 | 40 | 0 | 0 | 20 | 0.345 | 5 | 820 | 43 |
| CE C4 | 0 | 0 | 0 | 80 | 20 | 0.34 | 5 | 601 | 72 |

In Tables C1 to C9, EM in the first column refers to Embodiment and CE refers to Comparative Example; for example, EM C1 refers to Embodiment C1 and CE C1 refers to Comparative Example C1.

TABLE C2

| | Proportion to the sum of Si and SiO$_2$ | | Proportion to the entire negative active material | | | | | Specific | Discharge | Capacity |
| --- | --- | --- | --- | --- | --- | --- | --- | --- | --- | --- |
| | | | Particle (A) | | | Coating | | surface | capacity | retention ratio |
| | Si (wt. %) | SiO$_2$ (wt. %) | Si (wt. %) | SiO$_2$ (wt. %) | Carbon (wt. %) | Carbon (wt. %) | d(002) (nm) | area (m$^2$/g) | (mAh) | (%) |
| CE C2 | 0 | 100 | 0 | 40 | 40 | 20 | 0.34 | 5 | 520 | 59 |
| EM C4 | 10 | 90 | 4 | 36 | 40 | 20 | 0.34 | 5 | 672 | 61 |
| EM C5 | 20 | 80 | 8 | 32 | 40 | 20 | 0.34 | 5 | 740 | 73 |
| EM C6 | 40 | 60 | 16 | 24 | 40 | 20 | 0.34 | 5 | 768 | 76 |
| EM C2 | 50 | 50 | 20 | 20 | 40 | 20 | 0.34 | 5 | 774 | 82 |
| EM C7 | 60 | 40 | 24 | 16 | 40 | 20 | 0.34 | 5 | 782 | 77 |
| EM C8 | 80 | 20 | 32 | 8 | 40 | 20 | 0.34 | 5 | 798 | 72 |
| CE C1 | 100 | 0 | 40 | 0 | 40 | 20 | 0.34 | 5 | 812 | 49 |

TABLE C3

| | Particle (A) | | | Coating | | Specific | Discharge | Capacity |
| --- | --- | --- | --- | --- | --- | --- | --- | --- |
| | Si (wt. %) | SiO$_2$ (wt. %) | Carbon (wt. %) | Carbon (wt. %) | d(002) (nm) | surface area (m$^2$/g) | capacity (mAh) | retention ratio (%) |
| EM C9 | 39.5 | 39.5 | 1 | 20 | 0.34 | 5 | 807 | 52 |
| EM C10 | 38.5 | 38.5 | 3 | 20 | 0.34 | 5 | 802 | 69 |
| EM C11 | 30 | 30 | 20 | 20 | 0.34 | 5 | 805 | 79 |
| EM C12 | 20 | 20 | 40 | 20 | 0.34 | 5 | 774 | 82 |
| EM C13 | 10 | 10 | 60 | 20 | 0.34 | 5 | 772 | 78 |
| EM C14 | 5 | 5 | 70 | 20 | 0.34 | 5 | 682 | 68 |

TABLE C4

| | Particle (A) | | | Coating | | Specific | Discharge | Capacity |
| --- | --- | --- | --- | --- | --- | --- | --- | --- |
| | Si (wt. %) | SiO$_2$ (wt. %) | Carbon (wt. %) | Carbon (wt. %) | d(002) (nm) | surface area (m$^2$/g) | capacity (mAh) | retention ratio (%) |
| EM C15 | 20 | 20 | 40 | 20 | 0.3354 | 5 | 780 | 73 |
| EM C2 | 20 | 20 | 40 | 20 | 0.34 | 5 | 774 | 82 |
| EM C16 | 20 | 20 | 40 | 20 | 0.37 | 5 | 709 | 65 |
| EM C17 | 20 | 20 | 40 | 20 | 0.35 | 5 | 789 | 81 |

TABLE C5

| | Particle (A) | | | Coating | | Specific | Discharge | Capacity |
| --- | --- | --- | --- | --- | --- | --- | --- | --- |
| | Si (wt. %) | SiO$_2$ (wt. %) | Carbon (wt. %) | Carbon (wt. %) | d(002) (nm) | surface area (m$^2$/g) | capacity (mAh) | retention ratio (%) |
| EM C18 | 29.75 | 29.75 | 40 | 0.5 | 0.34 | 5 | 811 | 80 |
| EM C2 | 20 | 20 | 40 | 20 | 0.34 | 5 | 774 | 82 |
| EM C19 | 10 | 10 | 40 | 40 | 0.34 | 5 | 752 | 83 |
| EM C20 | 5 | 5 | 40 | 50 | 0.34 | 5 | 702 | 70 |

TABLE C6

| | Particle (A) | | | Coating | | Specific | Discharge | Capacity |
| --- | --- | --- | --- | --- | --- | --- | --- | --- |
| | Si (wt. %) | SiO$_2$ (wt. %) | Carbon (wt. %) | Carbon (wt. %) | d(002) (nm) | surface area (m$^2$/g) | capacity (mAh) | retention ratio (%) |
| EM C21 | 20 | 20 | 40 | 20 | 0.34 | 1 | 782 | 79 |
| EM C2 | 20 | 20 | 40 | 20 | 0.34 | 5 | 774 | 82 |
| EM C22 | 20 | 20 | 40 | 20 | 0.34 | 10 | 776 | 70 |
| EM C23 | 20 | 20 | 40 | 20 | 0.34 | 20 | 721 | 61 |

TABLE C7

|  | Particle (A) | | | Coating | | d(002) (nm) | Specific surface area (m²/g) | Discharge capacity (mAh) | Capacity retention ratio (%) |
|---|---|---|---|---|---|---|---|---|---|
|  | Si (wt. %) | SiO₂ (wt. %) | SiO (wt. %) | Carbon (wt. %) | Carbon (wt. %) | | | | |
| EM C24 | 30 | 30 | 0 | 40 | 0 | 0.34 | 5 | 819 | 79 |
| EM C25 | 20 | 20 | 0 | 40 | 20 | 0.34 | 5 | 782 | 84 |
| EM C26 | 20 | 0 | 20 | 40 | 20 | 0.34 | 5 | 795 | 83 |
| CE C1 | 40 | 0 | 0 | 40 | 20 | 0.34 | 5 | 812 | 49 |
| CE C2 | 0 | 40 | 0 | 40 | 20 | 0.34 | 5 | 520 | 59 |
| CE C3 | 40 | 40 | 0 | 0 | 20 | 0.345 | 5 | 820 | 43 |
| CE C4 | 0 | 0 | 0 | 80 | 20 | 0.34 | 5 | 601 | 72 |

TABLE C8

|  | Proportion to the sum of Si and SiO₂ | | Proportion to the entire negative active material | | | | d(002) (nm) | Specific surface area (m²/g) | Discharge capacity (mAh) | Capacity retention ratio (%) |
|---|---|---|---|---|---|---|---|---|---|---|
|  | | | Particle (A) | | Coating | | | | | |
|  | Si (wt. %) | SiO₂ (wt. %) | Si (wt. %) | SiO₂ (wt. %) | Carbon (wt. %) | Carbon (wt. %) | | | | |
| CE C2 | 0 | 100 | 0 | 40 | 40 | 20 | 0.34 | 5 | 520 | 69 |
| EM C27 | 10 | 90 | 4 | 36 | 40 | 20 | 0.34 | 5 | 675 | 75 |
| EM C28 | 20 | 80 | 8 | 32 | 40 | 20 | 0.34 | 5 | 749 | 79 |
| EM C29 | 40 | 60 | 16 | 24 | 40 | 20 | 0.34 | 5 | 773 | 83 |
| EM C25 | 50 | 50 | 20 | 20 | 40 | 20 | 0.34 | 5 | 782 | 84 |
| EM C30 | 60 | 40 | 24 | 16 | 40 | 20 | 0.34 | 5 | 795 | 81 |
| EM C31 | 80 | 20 | 32 | 8 | 40 | 20 | 0.34 | 5 | 803 | 77 |
| CE C1 | 100 | 0 | 40 | 0 | 40 | 20 | 0.34 | 5 | 812 | 49 |

TABLE C9

|  | Particle (A) | | | Coating | d(002) (nm) | Specific surface area (m²/g) | Discharge capacity (mAh) | Capacity retention ratio (%) |
|---|---|---|---|---|---|---|---|---|
|  | Si (wt. %) | SiO₂ (wt. %) | Carbon (wt. %) | Carbon (wt. %) | | | | |
| EM C32 | 39.5 | 39.5 | 1 | 20 | 0.34 | 5 | 815 | 67 |
| EM C33 | 38.5 | 38.5 | 3 | 20 | 0.34 | 5 | 807 | 76 |
| EM C34 | 30 | 30 | 20 | 20 | 0.34 | 5 | 802 | 79 |
| EM C35 | 20 | 20 | 40 | 20 | 0.34 | 5 | 782 | 84 |
| EM C36 | 10 | 10 | 60 | 20 | 0.34 | 5 | 776 | 81 |
| EM C37 | 5 | 5 | 70 | 20 | 0.34 | 5 | 701 | 78 |

Embodiment D

Embodiment D1

To the particle consisting of both microcrystalline Si phase and amorphous $SiO_x$ phase (hereinafter such particle is referred to as the particle (S)), X-ray diffraction technique with the use of CuKα radiation was utilized. As a result, on the particle (S), diffraction peaks appeared in a range of diffraction angle (2θ) from 46° to 49° and the half width of the main diffraction peak appearing in said range was smaller than 3°(2θ).

The surface of such particle (S) was coated with carbon using the method (CVD) of thermally decomposing benzene gas under argon atmosphere at 1000° C., so that the composite particle (C) was prepared. The amount of the carbon coating was determined to be 20 wt. % to the total amount of the particle (S) and the carbon as coating material. The number average particle size of the composite particle (C) was 10 μm. The number average particle size of particle is defined as a number average which can be obtained by laser diffraction technique.

Figure 8:
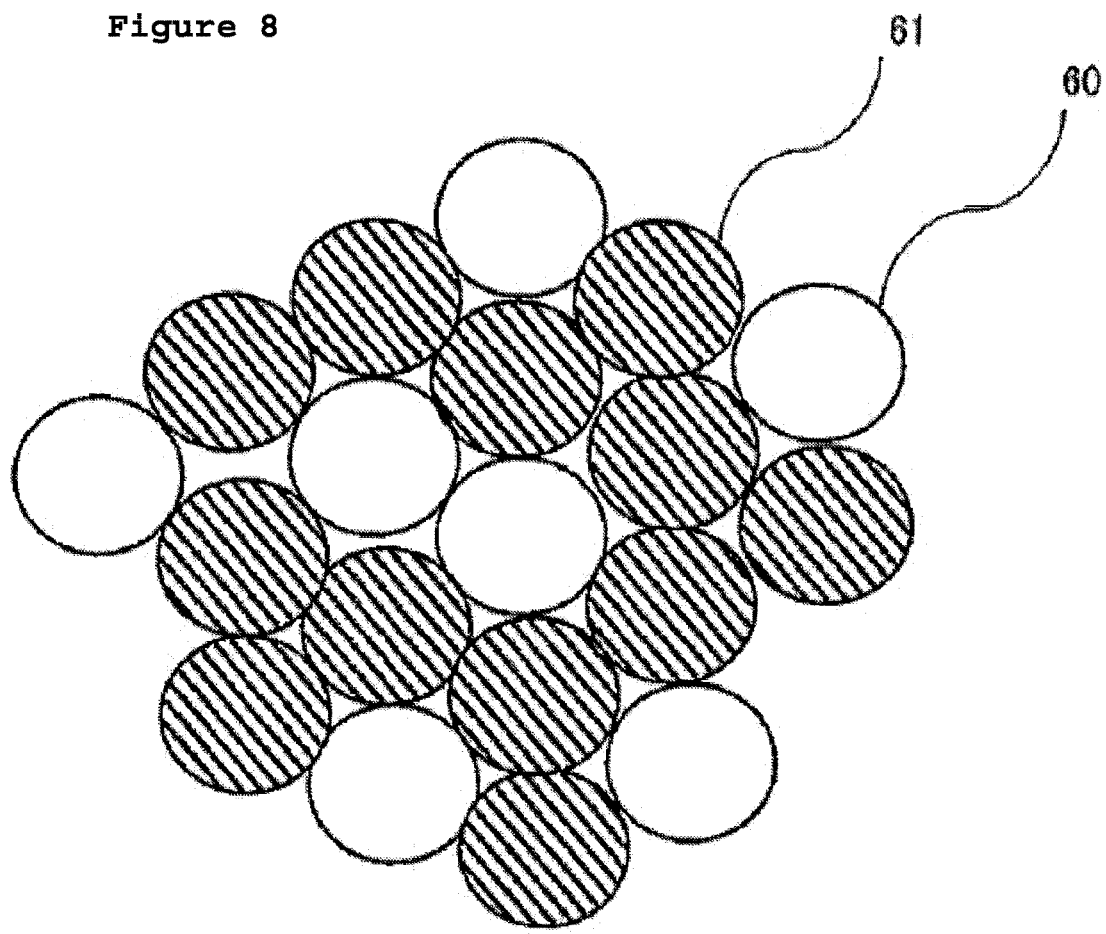
FIG. 8 is a view showing a mixture of carbon material (D) and composite particles (C).

With the use of such composite particle (C), a non-aqueous electrolyte secondary battery was produced according to the following manner. First, 10 wt. % of the composite particle (C) and, as the carbon material (D), 40 wt. % of meso carbon micro beads (MCMB), 30 wt. % of natural graphite and 20.0 wt. % of artificial graphite 20 were mixed together to prepare a negative active material. An illustration of this type of negative active material can be seen in FIG. 8, which shows a mixture of carbon material (D) 61 and composite particles (C) 60.

97 wt. % of the above-obtained negative active material, 2 wt. % of styrene-butadiene rubber (SBR), and 1 wt. % of carboxymethyl cellulose (CMC) were mixed in water to prepare a paste. The obtained paste was applied to a copper foil having a thickness of 15 μm so that the weight of the coating could be 1.15 mg/cm² and the quantity of the negative active material to be housed in the battery could be 2 g, and then dried at 150° C. to evaporate water. This process was performed on both sides of the copper foil, which then compressed and molded by roll pressing. Thus, a negative electrode plate, or the copper foil both sides of which were coated with the negative composite layer, was prepared.

Next, 90 wt. % of lithium cobalt oxide, 5 wt. % of acetylene black, and 5 wt. % of poly(vinylidene fluoride)

(PVdF) were dispersed in NMP to make a paste. The obtained paste was applied to an aluminum foil having a thickness of 20 μm so that the density could be 2.5 mg/cm$^2$ and the quantity of the positive active material to be housed in the battery could be 5.3 g, and then dried at 150° C. to evaporate NMP. The above-described process was performed on both sides of the aluminum foil, which then compressed and molded by roll pressing. Thus, a positive electrode plate, or the aluminum foil both sides of which were coated with the positive composite layer, was prepared.

The positive and negative electrode plates thus prepared were overlapped and wound with a polyethylene separator, with continuous porosity having a thickness of 20 μm and a porosity of 40%, being placed between them, and this element was housed in the case having 48 mm in height, 30 mm in width and 4.2 mm in thickness to form a non-aqueous electrolyte secondary battery of a prismatic type. Finally, the case was filled with a non-aqueous electrolyte solution; thus the non-aqueous electrolyte secondary battery of a prismatic type of Embodiment 1 was prepared. The used non-aqueous electrolyte solution was prepared as follows: ethylene carbonate (EC) and ethylmethyl carbonate (EMC) were mixed together in a volume ratio of 1:1, and 1 mol/1 of LiPF$_6$ was dissolved in the mixed solvent thus prepared. The rated capacity of the battery was 700 mAh.

Embodiment D2

The particle (S) and artificial graphite of a scale-like shape were granulated in a weight mixture ratio of 1:1 by means of ball milling. The surface of the particle thus granulated was coated with carbon using the method (CVD) of thermally decomposing benzene gas under argon atmosphere at 1000° C., so that the composite particle (C) was prepared. The amount of the carbon coating was determined to be 20 wt. % to the weight of the composite particle (C). The number average particle size of the composite particle (C) coated with the carbon was 10 μm.

10 wt. % of the composite particle (C) and, as the carbon material (D), 40 wt. % of MCMB, 30 wt. % of natural graphite and 20.0 wt. % of artificial graphite were mixed together to prepare a negative active material. Except for the above, the non-aqueous electrolyte secondary battery of a prismatic type has an identical configuration to that of Embodiment D1. This battery was termed Embodiment D2.

Comparative Example D1

As a negative active material, 100 wt. % of natural graphite was used. Except for the above, the non-aqueous electrolyte secondary battery of a prismatic type has an identical configuration to that of Embodiment D1. This battery was termed Comparative Example D1.

Comparative Example D2

10 wt. % of the particle (S) having a number average particle size of 10 μm, and, as the carbon material (D), 40 wt. % of MCMB, 30 wt. % of natural graphite and 20.0 wt. % of artificial graphite were used. Except for the above, the non-aqueous electrolyte secondary battery of a prismatic type has an identical configuration to that of Embodiment D1. This battery was termed Comparative Example D2.

Comparative Example D3

As a negative active material, the composite particle (C) prepared in Embodiment D1 was used alone. The amount of the carbon coating was determined to be 20 wt. % to the weight of the composite particle (C). The number average particle size of the composite particle (C) was 10 μm. Except for the above, the non-aqueous electrolyte secondary battery of a prismatic type has an identical configuration to that of Embodiment D1. This battery was termed Comparative Example D3.

Comparative Example D4

The surface of silicon particle was coated with carbon using the method (CVD) of thermally decomposing benzene gas under argon atmosphere at 1000° C. The amount of the carbon coating was determined to be 20 wt. % to the total amount of the silicon particle and the carbon as coating material. The number average particle size of the silicon particle coated with the carbon was 1 μm. Except for using such carbon-coated Si particle as a negative active material, the non-aqueous electrolyte secondary battery of a prismatic type has an identical configuration to that of Embodiment D1. This battery was termed Comparative Example D4.

The structures of the negative active materials used in Embodiments D1 and D2 and Comparative Examples D1 to D4 were summarized in Table D1.

TABLE D1

| | Particle to be coated & coating material, and composition of composite particle (C) | | | | | Composition of negative active material (wt. %) | |
|---|---|---|---|---|---|---|---|
| | Particle to be coated & coating material | | Composition of (C) (wt. %) | | Number average particle size of (C) (μm) | Composite particle (C) | Carbon material (D) |
| | Particle to be coated | Coating material | Particle to be coated | Coating material | | | |
| EM D1 | Particle(S) | Carbon | 80 | 20 | 10 | 10 | 90 |
| EM D2 | Particle(S) + Carbon | Carbon | 40 + 40 | 20 | 10 | 10 | 90 |
| CM D1 | — | — | — | — | — | 0 | 100 |
| CM D2 | Particle(S) | — | 100 | — | 10 | 10 | 90 |
| CM D3 | Particle(S) | Carbon | 80 | 20 | 10 | 100 | 0 |
| CM D4 | Silicon particle | Carbon | 80 | 20 | 1 | 100 | 0 |

In Tables D1 to D14, EM in the first column refers to Embodiment and CE, refers to Comparative Example; for example, EM D1 refers to Embodiment D1 and CE D1 refers to Comparative Example D1.

Embodiments D3 to D7, D56, and D57

Using the CVD method as described in Embodiment D1, the surface of the particle (S) was coated with carbon, and the composite particle (C) was prepared. The amount of the carbon coating was determined to be 20 wt. % to the weight of the composite particle (C). The number average particle size of the carbon-coated SiO particle was 1 µm.

By mixing such composite particle (C) with the carbon material (D), a negative active material was prepared. As the carbon material (D), a mixture of MCMB, natural graphite, and artificial graphite were used. Except for the composition of the negative active material, the non-aqueous electrolyte secondary batteries of a prismatic type have an identical configuration to that of Embodiment D1.

In Embodiments D3 to D7, the following compositions were used to prepare the negative active materials, respectively: 1 wt. % of the composite particle (C), and 40 wt. % of MCMB, 39 wt. % of natural graphite and 20 wt. % of artificial graphite in Embodiment D3; 5 wt. % of the composite particle (C), and 40 wt. % of MCMB, 35 wt. % of natural graphite and 20 wt. % of artificial graphite in Embodiment D4; 10 wt. % of the composite particle (C), and 40 wt. % of MCMB, 30 wt. % of natural graphite and 20 wt. % of artificial graphite in Embodiment D5; 20 wt. % of the composite particle (C), and 40 wt. % of MCMB, 20 wt. % of natural graphite and 20 wt. % of artificial graphite in Embodiment D6; and 30 wt. % of the composite particle (C), and 40 wt. % of MCMB, 10 wt. % of natural graphite and 20 wt. % of artificial graphite in Embodiment D7.

In Embodiments D56 and D57, the following compositions were used to prepare the negative active materials, respectively: 0.5 wt. % of the composite particle (C), and 40 wt. % of MCMB, 39.5 wt. % of natural graphite and 20 wt. % of artificial graphite in Embodiment D56; and 35 wt. % of the composite particle (C), and 40 wt. % of MCMB, 5 wt. % of natural graphite and 20 wt. % of artificial graphite in Embodiment D57.

The structures of the negative active materials used in Embodiments D3 to D7, D56, and D57 were summarized in Table D2.

TABLE D2

| | Composition of composite particle (C) (wt. %) | | Number average particle size of composite particle (C) (µm) | Composition of negative active material (wt. %) | |
|---|---|---|---|---|---|
| | Particle (S) | Carbon | | Composite particle (C) | Carbon material (D) |
| EM D56 | 80 | 20 | 1 | 0.5 | 99.5 |
| EM D3 | 80 | 20 | 1 | 1 | 99 |
| EM D4 | 80 | 20 | 1 | 5 | 95 |
| EM D5 | 80 | 20 | 1 | 10 | 90 |
| EM D6 | 80 | 20 | 1 | 20 | 80 |
| EM D7 | 80 | 20 | 1 | 30 | 70 |
| EM D57 | 80 | 20 | 1 | 35 | 65 |

Embodiments D8 to D12

Using the CVD method as described in Embodiment D1; the surface of the particle (S) was coated with carbon, and the composite particle (C) was prepared. Having a negative active material which was prepared by mixing such composite particle (C) with the carbon material (D), a non-aqueous electrolyte secondary battery was produced. The following composition was used to prepare the negative active material: 10 wt. % of the composite particle (C), and 40 wt. % of MCMB, 30 wt. % of natural graphite and 20 wt. % of artificial graphite.

Except for the composition of the composite particle (C), or the proportion of the weight of the carbon to the weight of the composite particle (C), the non-aqueous electrolyte secondary batteries of a prismatic type have an identical configuration to that of Embodiment D1.

In Embodiments D8 to D12, the respective carbon compositions in the composite particle (C) and the respective number average particle sizes of the composite particle (C) were as follows: 0.5 wt. % and 1.0 µm in Embodiment D8; 1 wt. % and 1.0 µm in Embodiment D9; 10 wt. % and 1.0 µm in Embodiment D10; 30 wt. % and 1.1 µm in Embodiment D11; and 40 wt. % and 1.2 µm in Embodiment D12.

The structures of the negative active materials used in Embodiments D8 to D12 were summarized in Table D3.

TABLE D3

| | Composition of composite particle (C) (wt. %) | | Number average particle size of composite particle (C) (µm) | Composition of negative active material (wt. %) | |
|---|---|---|---|---|---|
| | Particle (S) | Carbon | | Composite particle (C) | Carbon material (D) |
| EM D8 | 99.5 | 0.5 | About 1.0 | 10 | 90 |
| EM D9 | 99 | 1 | About 1.0 | 10 | 90 |
| EM D10 | 90 | 10 | About 1.0 | 10 | 90 |
| EM D11 | 70 | 30 | About 1.0 | 10 | 90 |
| EM D12 | 60 | 40 | About 1.0 | 10 | 90 |

Embodiments D13 to D16

Using the CVD method as described in Embodiment D1, the surface of the particle (S) was coated with carbon, and the composite particle (C) was prepared. The amount of the carbon coating was determined to be 20 wt. % to the weight of the composite particle (C). Having a negative active material which was prepared by mixing such composite particle (C) with the carbon material (D), a non-aqueous electrolyte secondary battery was produced. The following composition was used to prepare the negative active material: 10 wt. % of the composite particle (C), and 40 wt. % of MCMB, 30 wt. % of natural graphite and 20 wt. % of artificial graphite Except for using the composite particle (C) having a different number average particle size, the non-aqueous electrolyte secondary batteries of a prismatic type have an identical configuration to that of Embodiment D1.

In Embodiments D13 to D16, the respective number average particle sizes of the composite particle (C) were as follows: 0.05 µm in Embodiment D13, 0.1 µm in Embodiment D14, 20 µm in Embodiment D15, and 30 µm in Embodiment D16.

The structures of the negative active materials used in Embodiments D13 to D16 were summarized in Table D4, in which the structure used in Embodiment D1 was also included.

TABLE D4

| Composition of composite particle (C) (wt. %) | | Number average particle size of composite particle (C) (μm) | Composition of negative active material (wt. %) | |
|---|---|---|---|---|
| Particle (S) | Carbon | | Composite particle (C) | Carbon material (D) |
| EM D13 | 80 | 20 | 0.05 | 10 | 90 |
| EM D14 | 80 | 20 | 0.1 | 10 | 90 |
| EM D1 | 80 | 20 | 10 | 10 | 90 |
| EM D15 | 80 | 20 | 20 | 10 | 90 |
| EM D16 | 80 | 20 | 80 | 10 | 90 |

Embodiments D17 to D21, D58, and D59

The particle (S) and graphite of a scale-like shape were granulated in a weight mixture ratio of 50:50 using a ball milling machine. After that, using the method (CVD) as described in Embodiment D1, the surface of the particle thus granulated was coated with carbon, and the composite particle (C) was prepared. The amount of the carbon coating was determined to be 20 wt. % to the weight of the composite particle (C). The number average particle size of the composite particle (C) was 20 μm.

Having a negative active material which was prepared by mixing such composite particle (C) with the carbon material (D), a non-aqueous electrolyte secondary battery was produced. As the carbon material (D), a mixture of MCMB, natural graphite, and artificial graphite were used. Except for the composition of the negative active material, the non-aqueous electrolyte secondary batteries of a prismatic type have an identical configuration to that of Embodiment D1.

In Embodiments D17 to D21, the following compositions were used to prepare the negative active materials, respectively: 1 wt. % of the composite particle (C), and 40 wt. % of MCMB, 39 wt. % of natural graphite and 20 wt. % of artificial graphite in Embodiment D17; 5 wt. % of the composite particle (C), and 40 wt. % of MCMB, 35 wt. % of natural graphite and 20 wt. % of artificial graphite in Embodiment D18; 10 wt. % of the composite particle (C), and 40 wt. % of MCMB, 30 wt. % of natural graphite and 20 wt. % of artificial graphite in Embodiment D19; 20 wt. % of the composite particle (C), and 40 wt. % of MCMB, 20 wt. % of natural graphite and 20 wt. % of artificial graphite in Embodiment D20; and 30 wt. % of the composite particle (C), and 40 wt. % of MCMB, 10 wt. % of natural graphite and 20 wt. % of artificial graphite in Embodiment D21.

In Embodiments D58 and D59, the following compositions were used to prepare the negative active materials, respectively: 0.5 wt. % of the composite particle (C), and 40 wt. % of MCMB, 39.5 wt. % of natural graphite and 20 wt. % of artificial graphite in Embodiment D58; and 35 wt. % of the composite particle (0, and 40 wt. % of MCMB, 5 wt. % of natural graphite and 20 wt. % of artificial graphite in Embodiment 59.

The structures of the negative active materials used in Embodiments D17 to D21, D58 and D59 were summarized in Table D5.

TABLE D5

| | Composition of granulated particle (wt. %) | | Composition of composite particle (C) (wt. %) | | Number average particle size of (C) (μm) | Composition of negative active material (wt. %) | |
|---|---|---|---|---|---|---|---|
| | Particle (S) | Graphite | Granulated particle | Carbon coating | | Composite particle (C) | Carbon material (D) |
| EM D58 | 50 | 50 | 80 | 20 | 20 | 0.5 | 99.5 |
| EM D17 | 50 | 50 | 80 | 20 | 20 | 1 | 99 |
| EM D18 | 50 | 50 | 80 | 20 | 20 | 5 | 95 |
| EM D19 | 50 | 50 | 80 | 20 | 20 | 10 | 90 |
| EM D20 | 50 | 50 | 80 | 20 | 20 | 20 | 80 |
| EM D21 | 50 | 50 | 80 | 20 | 20 | 30 | 70 |
| EM D59 | 50 | 50 | 80 | 20 | 20 | 35 | 65 |

Embodiments D22 to D27

The particle (S) and graphite of a scale-like shape were granulated in a weight mixture ratio of 50:50 using a ball milling machine. After that, using the method (CVD) as described in Embodiment D1, the surface of the particle thus granulated was coated with carbon, and the composite particle (C) was prepared.

Having a negative active material which was prepared by mixing such composite particle (C) with the carbon material (D), a non-aqueous electrolyte secondary battery was produced. The following composition was used to prepare the negative active material: 10 wt. % of the composite particle (C), and 40 wt. % of MCMB, 40 wt. % of natural graphite and 20 wt. % of artificial graphite. Except for the composition of the composite particle (C), or the proportion of the weight of the carbon to the weight of the composite particle (C), the non-aqueous electrolyte secondary batteries of a prismatic type have an identical configuration to that of Embodiment D1.

In Embodiments D22 to D27, the respective carbon compositions used in the composite particle (C) and the respective number average particle sizes of the composite particle (C) were as follows: 0.5 wt. % and approximately 20 μm in Embodiment D22; 1 wt. % and approximately 20 μm in Embodiment D23; 10 wt. % and approximately 20.4 μm in Embodiment D24; 20 wt. % and approximately 20.8 μm in Embodiment D25; 30 wt. % and approximately 21.2 μm in Embodiment D26; and 40 wt. % and approximately 21.8 μm in Embodiment D27.

The structures of the negative active materials used in Embodiments D22 to D27 were summarized in Table D6.

(D), a non-aqueous electrolyte secondary battery was produced. The following composition was used to prepare the negative active material: 10 wt. % of the composite particle (C), and 40 wt. % of MCMB, 40 wt. % of natural graphite and 20 wt. % of artificial graphite. Except for the mixture ratio of the particle (S) to the graphite of a scale-like shape in the granulated particle, the non-aqueous electrolyte secondary batteries of a prismatic type have an identical configuration to that of Embodiment D1.

TABLE D6

| | Composition of granulated particle (wt. %) | | Composition of composite particle (C) (wt. %) | | Number average particle size of (C) (μm) | Mixture ratio of negative active material (wt. %) | |
|---|---|---|---|---|---|---|---|
| | Particle (S) | Graphite | Granulated particle | Carbon coating | | Composite particle (C) | Carbon material (D) |
| EM D22 | 50 | 50 | 99.5 | 0.5 | 20 | 10 | 90 |
| EM D23 | 50 | 50 | 99 | 1 | 20 | 10 | 90 |
| EM D24 | 50 | 50 | 90 | 10 | 20.4 | 10 | 90 |
| EM D25 | 50 | 50 | 80 | 20 | 20.8 | 10 | 90 |
| EM D26 | 50 | 50 | 70 | 30 | 21.2 | 10 | 90 |
| EM D27 | 50 | 50 | 60 | 40 | 21.5 | 10 | 90 |

Embodiments D28 to D32

The particle (S) and graphite of a scale-like shape were granulated using a ball milling machine. After that, using the method (CVD) as described in Embodiment D1, the surface of the particle thus granulated was coated with carbon, and the composite particle (C) was prepared. The amount of the carbon coating was determined to be 20 wt. % to the weight of the composite particle (C). The number average particle size of the composite particle (C) was approximately 20 μm.

Having a negative active material which was prepared by mixing such composite particle (C) with the carbon material In Embodiments D28 to D32, the respective weight mixture ratios of the particle (S) to the graphite of a scale-like shape in the granulated particle were as follows: 10:90 in Embodiment D28; 20:80 in Embodiment D29; 40:60 in Embodiment D30; 70:30 in Embodiment D31; and 80:20 in Embodiment D32.

The structures of the negative active materials used in Embodiments D28 to D32 were summarized in Table D7, in which the structure used in Embodiment D19 was also included.

TABLE D7

| | Composition of granulated particle (wt. %) | | Composition of composite particle (C) (wt. %) | | Number average particle size of (C) (μm) | Composition of negative active material (wt. %) | |
|---|---|---|---|---|---|---|---|
| | Particle (S) | Graphite | Granulated particle | Carbon coating | | Composite particle (C) | Carbon material (D) |
| EM D28 | 10 | 90 | 80 | 20 | 20 | 10 | 90 |
| EM D29 | 20 | 80 | 80 | 20 | 20 | 10 | 90 |
| EM D19 | 50 | 50 | 80 | 20 | 20 | 10 | 90 |
| EM D30 | 40 | 60 | 80 | 20 | 20 | 10 | 90 |
| EM D31 | 70 | 30 | 80 | 20 | 20 | 10 | 90 |
| EM D32 | 80 | 20 | 80 | 20 | 20 | 10 | 90 |

Embodiments D33 to D37

The particle (S) and graphite of a scale-like shape were granulated in a weight mixture ratio of 50:50 using a ball milling machine. After that, using the method (CVD) as described in Embodiment D1, the surface of the granulated composite particle was coated with carbon, and the composite particle (C) was prepared. The amount of the carbon coating was determined to be 20 wt. % to the weight of the composite particle (C).

Having a negative active material which was prepared by mixing such composite particle (C) with the carbon material (D), a non-aqueous electrolyte secondary battery was produced. The following composition was used to prepare the negative active material: 10 wt. % of the composite particle (C), and 40 wt. % of MCMB, 40 wt. % of natural graphite and 20 wt. % of artificial graphite. Except for using composite particle (C) which is different in "the respective number average particle sizes", the non-aqueous electrolyte secondary batteries of a prismatic type have an identical configuration to that of Embodiment D1.

In Embodiments D33 to D37, the respective number average particle sizes of the composite particle (C) were as follows: 0.05 μm in Embodiment D33, 0.1 μm in Embodiment D34, 20 μm in Embodiment D35, 30 μm in Embodiment D36, and 40 μm in Embodiment D37.

The structures of the negative active materials used in Embodiments D33 to D37 were summarized in Table D8, in which the structure used in Embodiment D2 was also included.

TABLE D8

| | Composition of granulated particle (wt. %) | | Composition of composite particle (C) (wt. %) | | Number average particle size of (C) (μm) | Composition of negative active material (wt. %) | |
|---|---|---|---|---|---|---|---|
| | Particle (S) | Graphite | Granulated particle | Carbon coating | | Composite particle (C) | Carbon material (D) |
| EM D33 | 50 | 50 | 80 | 20 | 0.05 | 10 | 90 |
| EM D34 | 50 | 50 | 80 | 20 | 0.1 | 10 | 90 |
| EM D2 | 50 | 50 | 80 | 20 | 10 | 10 | 90 |
| EM D35 | 50 | 50 | 80 | 20 | 20 | 10 | 90 |
| EM D36 | 50 | 50 | 80 | 20 | 30 | 10 | 90 |
| EM D37 | 50 | 50 | 80 | 20 | 40 | 10 | 90 |

Embodiment D38

Carbon and the particle (S) were mixed and, using the mechanical milling method, the surface of the particle (S) was coated with the carbon; thus the composite particle (C) was prepared. The amount of the carbon coating was determined to be 20 wt. % to the weight of the composite particle (C). The number average particle size of the composite particle (C) was 10 μm.

Using such composite particle (C), a non-aqueous electrolyte secondary battery was produced. The following composition was used to prepare the negative active material: 10 wt. % of the composite particle (C), and 40 wt. % of MCMB, 30 wt. % of natural graphite and 20 wt. % of artificial graphite. Except for the negative active material, the non-aqueous electrolyte secondary battery of a prismatic type has an identical configuration to that of Embodiment D1. This battery was termed Embodiment D38.

Embodiment D39

According to the same manner as described in Embodiment D38, the surface of the particle (S) was coated with carbon using the mechanical milling method, and the composite particle (C) was prepared. 10 wt. % of the composite particle (C), and, as the carbon material (D), 40 wt. % of meso carbon fiber containing boron, 30 wt. % of natural graphite and 20 wt. % of artificial graphite were mixed together to prepare a negative active material. Except for the negative active material, the non-aqueous electrolyte secondary battery of a prismatic type has an identical configuration to that of Embodiment D1. This battery was termed Embodiment D39.

Embodiment D40

According to the same manner as described in Embodiment D38, the surface of the particle (S) was coated with carbon using the mechanical milling method, and the composite particle (C) was prepared. 10 wt. % of the composite particle (C), and, as the carbon material. (D), 70 wt. % of natural graphite and 20 wt. % of artificial graphite were mixed together to prepare a negative active material. Except for the negative active material, the non-aqueous electrolyte secondary battery of a prismatic type has an identical configuration to that of Embodiment D1. This battery was termed Embodiment D40.

Embodiment D41

Silicon particle and graphite of a scale-like shape were granulated in a weight mixture ratio of 50:50 using a ball milling machine. Alter that, using the method (CVD) as described in Embodiment D1, the surface of the particle thus granulated was coated with carbon, and the composite particle (C) was prepared. The amount of the carbon coating was determined to be 20 wt. % to the weight of the composite particle (C). The number average particle size of the composite particle (C) was 20 μm.

10 wt. % of the composite particle (C), and, as the carbon material (D), 40 wt. % of MCMB, 30 wt. % of natural graphite and 20 wt. % of artificial graphite were mixed together to prepare a negative active material. Except for the composition of the negative active material, the non-aqueous electrolyte secondary battery of a prismatic type has an identical configuration to that of Embodiment D1. This battery was termed Embodiment D41.

Embodiment D42

ZrSi$_2$ particle and graphite of a scale-like shape were granulated in a weight mixture ratio of 50:50 using a ball milling machine. Except for the above, the non-aqueous electrolyte secondary battery of a prismatic type has an identical configuration to that of Embodiment D1. This battery was termed Embodiment D42.

Embodiment D43

The SiO particle consisting of amorphous single-phase (identified by the peak of Si in X-ray diffraction pattern) and graphite of a scale-like shape were granulated in a weight mixture ratio of 50:50 using a ball milling machine. Except for the above, the non-aqueous electrolyte secondary battery of a prismatic type has an identical configuration to that of Embodiment D41. This battery was termed Embodiment D43.

The structures of the negative active materials used in Embodiments D38 to D43 were summarized in Tables D9 and D10. In the "MCMB" column of Embodiment D39 in Table 10, the value of boron-containing meso carbon fiber is entered.

Embodiments D44 to D49

The particle (S) and graphite of a scale-like shape were granulated in a weight mixture ratio of 50:50 using a ball milling machine. After that, the granulated particle was immersed in an electrolytic bath, and by electroless plating, the surface of such particle was coated with copper (Cu); thus, the composite particle (C) was prepared.

Having a negative active material which was prepared by mixing such composite particle (C) with the carbon material (D), a non-aqueous electrolyte secondary battery was produced. The following composition was used to prepare the negative active material: 10 wt. % of the composite particle (C), and 40 wt. % of MCMB, 40 wt. % of natural graphite and 20 wt. % of artificial graphite. Except for the amount of Cu coating to the weight of the composite particle (C), the non-aqueous electrolyte secondary batteries of a prismatic type have an identical configuration to that of Embodiment D1.

In Embodiments D44 to D49, the respective amounts of Cu coating in the composite particle (C) and the respective number average particle sizes of the composite particle (C) were as follows: 0.5 wt. % and approximately 20 μm in Embodiment D44; 1 wt. % and approximately 20 μm in Embodiment D46; 10 wt. % and approximately 20.6 μm in Embodiment D46; 20 wt. % and approximately 20.9 μm in Embodiment D47; 30 wt. % and approximately 21.5 μm in Embodiment D48; and 40 wt. % and approximately 21.7 μm in Embodiment D49.

The structures of the negative active materials used in Embodiments D44 to D49 were summarized in Table D11.

TABLE D9

| | Particle to be coated | | | | |
|---|---|---|---|---|---|
| | Composition | | Mixture ratio (wt. %) | | |
| | Silicon-containing particle | Carbon | Silicon-containing particle | Carbon | Carbon coating method |
| EM D38 | SiO | — | 100 | — | Mechanical milling |
| EM D39 | SiO | — | 100 | — | Mechanical milling |
| EM D40 | SiO | — | 100 | — | Mechanical milling |
| EM D41 | Si | Scale-like graphite | 50 | 50 | CVD |
| EM D42 | ZrSi$_2$ | Scale-like graphite | 50 | 50 | CVD |
| EM D43 | amorphous single-phase SiO | Scale-like graphite | 50 | 50 | CVD |

TABLE D10

| | Composition of Composite particle (C) (wt. %) | | Number average particle size of (C) (μm) | Composition of negative active material (wt. %) | | | |
|---|---|---|---|---|---|---|---|
| | Coated particle | Carbon coating | | Composite particle (C) | MCMB | Natural graphite | Artificial graphite |
| EM D38 | 80 | 20 | 10 | 10 | 40 | 30 | 20 |
| EM D39 | 80 | 20 | 10 | 10 | 40 | 30 | 20 |
| EM D40 | 80 | 20 | 10 | 10 | 0 | 70 | 20 |
| EM D41 | 80 | 20 | 20 | 10 | 40 | 30 | 20 |
| EM D42 | 80 | 20 | 20 | 10 | 40 | 30 | 20 |
| EM D43 | 80 | 20 | 20 | 10 | 40 | 30 | 20 |

TABLE D11

| | Composition of granulated particle (wt. %) | | Composition of composite particle (C) (wt. %) | | Number average particle size of (C) (μm) | Composition of negative active material (wt. %) | |
|---|---|---|---|---|---|---|---|
| | Particle (S) | Graphite | Granulated particle | Cu coating | | Composite particle (C) | Carbon material (D) |
| EM D44 | 50 | 50 | 99.5 | 0.5 | 20 | 10 | 90 |
| EM D45 | 50 | 50 | 99 | 1 | 20 | 10 | 90 |
| EM D46 | 50 | 50 | 90 | 10 | 20.5 | 10 | 90 |
| EM D47 | 50 | 50 | 80 | 20 | 20.9 | 10 | 90 |
| EM D48 | 50 | 50 | 70 | 30 | 21.5 | 10 | 90 |
| EM D49 | 50 | 50 | 60 | 40 | 21.7 | 10 | 90 |

Embodiments D50 to D55

The particle (S) and graphite of a scale-like shape were granulated in a weight mixture ratio of 50:50 using a ball milling machine. After that, the granulated particle was immersed in an electrolytic bath, and by electroless plating, the surface of such particle was coated with nickel (Ni); thus, the composite particle (C) was prepared. Except for the above, the non-aqueous electrolyte secondary batteries of a prismatic type have an identical configuration to that of Embodiment D44.

In Embodiments D50 to D55, the respective amounts of Ni coating in the composite particle (C) and the respective number average particle sizes of the composite particle (C) were as follows: 0.5 wt. % and approximately 20 μm in Embodiment D50; 1 wt. % and approximately 20.1 μm in Embodiment D51; 10 wt. % and approximately 20.4 μm in Embodiment D52; 20 wt. % and approximately 20.8 μm in Embodiment D53; 30 wt. % and approximately 21.3 μm in Embodiment D54; and 40 wt. % and approximately 21.5 μm in Embodiment D55.

The structures of the negative active materials used in Embodiments D50 to D55 were summarized in Table D12.

TABLE D12

| | Composition of granulated particle (wt. %) | | Composition of composite particle (C) (wt. %) | | Number average particle size of (C) (μm) | Composition of negative active material (wt. %) | |
|---|---|---|---|---|---|---|---|
| | Particle (S) | Graphite | Granulated particle | Cu coating | | Composite particle (C) | Carbon material (D) |
| EM D50 | 50 | 50 | 99.5 | 0.5 | 20 | 10 | 90 |
| EM D51 | 50 | 50 | 99 | 1 | 20.1 | 10 | 90 |
| EM D52 | 50 | 50 | 90 | 10 | 20.4 | 10 | 90 |
| EM D53 | 50 | 50 | 80 | 20 | 20.8 | 10 | 90 |
| EM D54 | 50 | 50 | 70 | 30 | 21.3 | 10 | 90 |
| EM D55 | 50 | 50 | 60 | 40 | 21.5 | 10 | 90 |

(Charge/Discharge Measurement)

Each battery prepared as above was charged at a constant current of 700 mA at a temperature of 25° C. until the voltage reached 4.2 V, subsequently charged at a constant voltage of 4.2 V for 2 hours, and then discharged at a constant current of 700 mA until the voltage dropped to 2.0 V. These steps were taken as one cycle and the charge/discharge test was repeated 500 cycles. Table D13 shows the discharge capacity at the $1^{st}$ cycle (initial discharge) and the capacity retention ratio for the batteries of Embodiments D1 to D43, D56 to D59, and Comparative Examples D1 to D4; and Table D14 shows those for the batteries of Embodiments D44 to D55, Here, "capacity retention ratio" means the ratio of the discharge capacity at the $500^{th}$ cycle to the one at the $1^{st}$ cycle (expressed in percentage).

TABLE D13

| | Discharge capacity (mAh) | Capacity retention ratio (%) |
|---|---|---|
| EM D1 | 749 | 75 |
| EM D2 | 742 | 84 |
| EM D3 | 730 | 80 |
| EM D4 | 750 | 86 |
| EM D5 | 752 | 85 |
| EM D6 | 755 | 76 |
| EM D7 | 754 | 68 |
| EM D8 | 760 | 56 |
| EM D9 | 752 | 72 |
| EM D10 | 754 | 86 |
| EM D11 | 739 | 78 |
| EM D12 | 700 | 76 |
| EM D13 | 760 | 59 |
| EM D14 | 751 | 71 |
| EM D15 | 753 | 69 |
| EM D16 | 755 | 54 |

TABLE D13-continued

| | Discharge capacity (mAh) | Capacity retention ratio (%) |
|---|---|---|
| EM D17 | 719 | 83 |
| EM D18 | 732 | 82 |
| EM D19 | 742 | 84 |
| EM D20 | 747 | 79 |
| EM D21 | 741 | 74 |
| EM D22 | 745 | 61 |
| EM D23 | 743 | 74 |

TABLE D13-continued

| | Discharge capacity (mAh) | Capacity retention ratio (%) |
|---|---|---|
| EM D24 | 740 | 78 |
| EM D25 | 736 | 82 |
| EM D26 | 728 | 80 |
| EM D27 | 680 | 78 |
| EM D28 | 701 | 80 |
| EM D29 | 739 | 82 |
| EM D30 | 743 | 81 |
| EM D31 | 747 | 77 |
| EM D32 | 732 | 51 |
| EM D33 | 741 | 52 |
| EM D34 | 745 | 69 |
| EM D35 | 744 | 73 |
| EM D36 | 743 | 79 |
| EM D37 | 740 | 57 |
| EM D38 | 750 | 69 |
| EM D39 | 743 | 83 |
| EM D40 | 747 | 53 |
| EM D41 | 741 | 74 |
| EM D42 | 742 | 76 |
| EM D43 | 751 | 65 |
| CE D1 | 635 | 80 |
| CE D2 | 630 | 10 |
| CE D3 | 370 | 79 |
| CE D4 | 820 | 9 |
| EM D56 | 690 | 78 |
| EM D57 | 754 | 18 |
| EM D58 | 672 | 79 |
| EM D59 | 739 | 22 |

TABLE D14

| | Initial capacity (mAh) | Capacity retention ratio (%) |
|---|---|---|
| EM D44 | 735 | 49 |
| EM D45 | 734 | 78 |
| EM D46 | 729 | 79 |
| EM D47 | 723 | 82 |
| EM D48 | 715 | 81 |
| EM D49 | 689 | 78 |
| EM D50 | 732 | 52 |
| EM D51 | 732 | 75 |
| EM D52 | 715 | 77 |
| EM D53 | 712 | 78 |
| EM D54 | 709 | 82 |
| EM D55 | 662 | 77 |

From the comparison of the results of Embodiments D1 to D43, D56 to D59, and Comparative Examples D1 to D4, the following were revealed.

Embodiments D1, D2, and Comparative Examples D1 to D4 were compared. In Comparative Example D1, where conventional graphite alone was used as the negative active material, the initial capacity was 635 mAh and the capacity retention ratio was 80%; meanwhile, in Comparative Example D2, where a mixture of SiO and carbon material was used as the negative active material, the initial capacity was about the same level but the capacity retention ratio was extremely low. In addition, in Comparative Example D3, where the SiO particle alone, the surface of which was coated with carbon, was used as the negative active material, the capacity retention ratio was about the same level but the initial capacity was much smaller, as compared to Comparative Example D1. Moreover, in Comparative Example D4, where the Si particle alone, the surface of which was coated with carbon, was used as the negative active material, the initial capacity was larger but the capacity retention ratio was extremely lower, as compared to Comparative Example D1.

In addition, in the comparison of Embodiments D1 and D2 with Comparative Examples D1 to D4, the initial capacities were larger and the capacity retention ratios were superior in Embodiments D1 and D2. As described previously, in Embodiment D1, a mixture of carbon-coated SiO and carbon material was used as the negative active material; and in Embodiment D2, the surface of the mixed particle of SiO particle and scale-like artificial graphite was coated with carbon to prepare composite particle, and a mixture of such composite particle and carbon material was used as the negative active material. From these results, it is believed that electronic conductivity improves by coating the surface of SiO particle with carbon.

Next, Embodiments D3 to D7, D56, and D57 were compared; where a mixture of carbon-coated SiO particle and carbon material was used as the negative active material and a different mixture ratio between the carbon-coated SiO particle and the carbon material was applied to each embodiment. In Embodiments D3 to D7, where the compositions of the carbon-coated SiO particle in the total amount of the carbon-coated SiO particle and the carbon material fall within the range of 1 to 30 wt. %, the initial capacities were large and the capacity retention ratios were significantly high, too. Meanwhile, in Embodiment D56, where the composition of the carbon-coated SiO particle stood at 0.5 wt. %, the content of the SiO particle highly capable of absorbing lithium was too small to attain a sufficient initial capacity for the battery; and in Embodiment D57, where the composition of the carbon-coated SiO particle stood at 35 wt. %, the expansion/contraction of the negative electrode plate was so large that current collection performance was caused to be deteriorated and the capacity retention ratio became significantly low. Therefore, from the viewpoint of the cycle performance and discharge capacity, when a mixture of the carbon-coated SiO particle and the carbon material is used as the negative active material, it is preferable that the composition of the carbon-coated SiO particle in the total amount of the carbon-coated SiO particle and the carbon material lie in the range of 1 to 30 wt. %.

Next, Embodiments D8 to D12 were compared; where the composition of the carbon with which the surface of SiO particle was coated in the total amount of the SiO particle and the carbon on the surface of the SiO particle was varied. In Embodiments D9 to D11, where the compositions of the carbon fall within the range of 1 to 30 wt. %, the initial capacities were large and the capacity retention ratios were high, too. Meanwhile, in Embodiment 8, where the composition of the carbon was 0.5 wt. %, the desired effect was hardly obtained because the capacity retention ratio was rather low, and in Embodiment D12, where the composition of the carbon was 40 wt. %, the content of the SiO particle highly capable of absorbing lithium was small, so that the initial capacity became rather low. Therefore, it is more preferable that the composition of the carbon with which the surface of the SiO particle is coated in the total amount of the SiO particle and the carbon on the surface of the SiO particle lie in the range of 1 to 30 wt. %.

Next, Embodiments D1, and D13 to D16 were compared; where the number average particle size of the SiO particle, the surface of which was coated with carbon, was varied. In Embodiments D1, D14 and D15, where the number average particle sizes were in the range of 0.1 to 20 μm, large initial capacities and high capacity retention ratios were attained. Meanwhile, in Embodiment D13, where the number average particle size was 0.05 μm, it was difficult to prepare and handle the active material, so that the capacity retention ratio became rather low. In Embodiment D16, in addition, where the number average particle size was 30 μm, the negative electrode plate was hard to be prepared, so that the capacity retention ratio became rather low. Therefore, it is more preferable that the number average particle size of the SiO particle, the surface of which is coated with carbon, lie in the range of 0.1 to 20 μm.

Hereinafter, the results will be compared in terms of the following case; the composite particle was prepared by mixing SiO particle and graphite of a scale-like shape, the surface of the composite particle was coated with carbon, and a mixture of the carbon-coated composite particle and carbon material was used as the negative active material.

First, Embodiments D17 to D21, D58, and D59 were compared, where a different mixture ratio of the carbon-coated composite particle to the total amount of the carbon-coated composite particle and the carbon material was applied to each embodiment. In Embodiments D17 to D21, where the compositions of the carbon-coated composite particle fell within the range of 1 to 30 wt. %, the initial capacities were large and the capacity retention ratios were high, too. Meanwhile, in Embodiment D58, where the composition of the carbon-coated composite particle was 0.5 wt. %, the content of the SiO particle highly capable of absorbing lithium was too small to attain a sufficient initial capacity for a battery; and in Embodiment D59, where the composition of the carbon-coated composite particle stood at 35 wt. %, the expansion/contraction of the negative electrode plate was so large that the current collection performance was caused to be deteriorated and the capacity retention ratio became significantly low. Therefore, for the enhancement of both initial capacity and capacity retention ratio, it is preferable that the composition of the carbon-coated composite particle in the total amount of the carbon-coated composite particle and the carbon material lie in the range of 1 to 30 wt. %.

Next, Embodiments D22 to D27 were compared; where a different mixture ratio of the carbon on the composite particle, which was prepared using SiO particle and graphite of a scale-like shape, to the total amount of the carbon on the composite particle, the SiO particle, and the graphite of a scale-like shape was applied to each embodiment. In Embodiments D23 to D26, where the compositions of the carbon fell within the range of 1 to 30 wt. %, large initial capacities and high capacity retention ratios were attained. Meanwhile, in Embodiment D22, where the composition of the carbon was 0.5 wt. %, the capacity retention ratio was rather low, and in Embodiment D27, where the composition of the carbon was 40 wt. %, the content of the SiO particle highly capable of absorbing lithium was small, so that the initial capacity was rather small. Therefore, it is preferable that the composition of the carbon on the composite particle in the total amount of the carbon on the composite particle, the SiO particle, and the graphite of a scale-like shape lie in the range of 1 to 30 wt. %.

Next, Embodiments D19, and D28 to D32 were compared, where a different mixture composition of SiO particle in the total amount of the SiO particle and the graphite of a scale-like shape was applied to each embodiment. In Embodiments D19, and D29 to D31, where the compositions of SiO particle fell within the range of 20 to 70 wt. %, large initial capacities and high capacity retention ratios were attained. Meanwhile, in Embodiment D28, where the composition of the SiO particle was 10 wt. %, the content of the SiO particle highly capable of absorbing lithium was small, so that the initial capacity became small, and in Embodiment D32, where the composition of the SiO particle was 80 wt. %, the influence of the SiO particle on the volume expansion/contraction during the charge/discharge was so large as to cause a small decrease in the capacity retention ratio. Therefore, it is preferable that the composition of the SiO particle in the total amount of the SiO particle and the graphite of a scale-like shape lie in the range of 20 to 70 wt. %.

Next, Embodiments D2, and D33 to D37 were compared; where the number average particle size of the carbon-coated composite particle was varied. In Embodiments D2, and D34 to D36, where the number average particle sizes were in the range of 0.1 to 30 μm, large initial capacities and high capacity retention ratios were attained. Meanwhile, in Embodiment D33, where the number average particle size was 0.05 μm, it was difficult to prepare and handle the active material, so that the capacity retention ratio became rather small. In Embodiment D37, in addition, where the number average particle size was 40 μm, the negative electrode plate was hard to be prepared, and the capacity retention ratio became rather small. Therefore, it is more preferable that the number average particle size of the carbon-coated composite particle lie in the range of 0.1 to 30 μm.

Hereinafter, the results will be compared in terms of the process of preparing the composite particle, or the composition of the carbon material in the negative active materials.

Embodiments D38 to D40 were compared; where mechanical milling method was employed for coating the surface of SiO particle with carbon, and the composition of the carbon material to be mixed with such carbon-coated SiO particle was varied. In the comparison of Embodiment D38 with Embodiment D5, where CVD method was employed for coating the surface of SiO particle with carbon, large initial capacities were attained in both methods; however, a larger capacity retention ratio was obtained by using CVD method in Embodiment D5. It is believed that the reason for this may be that the surface can be coated more uniformly by the use of CVD method. In the comparison between Embodiment D38, where MCMB was contained in the carbon material, and Embodiment D39, where boron-containing meso carbon fiber was contained in the carbon material, large initial capacities and high capacity retention ratios were obtained in both batteries. However, in Embodiment 40, where natural graphite and artificial graphite, with no MCMB, were used as the carbon material, the capacity retention ratio became rather low.

In addition, Embodiments D41 to D43 were compared. In Embodiments D41 and D42, where Si and $ZrSi_2$ were used respectively as the silicon-containing material, in stead of SiO, large initial capacities and high capacity retention ratios were attained. Moreover, in Embodiment D43, where amorphous single-phase SiO was used as the silicon-containing material, a large initial capacity and a high capacity retention ratio were obtained. Thus, when SiO disproportionated to microcrystalline Si and amorphous $SiO_2$, and when a diffraction peak appeared in a range of diffraction angle (2θ) from 46° to 49° and the half width of the main diffraction peak appearing in said range was smaller than 3°(2θ) in X-ray diffraction pattern with the use of the CuKα radiation, large initial capacities and extremely high capacity retention ratios were achieved.

Finally, the results will be compared in terms of the following case: as a core material, composite particle was prepared by mixing SiO particle (S) and graphite of a scale-like shape; the surface of the composite particle was coated with cupper (Cu) or nickel (Ni); and the mixture ratio of the Cu or Ni on the composite particle to the total amount of the Cu or Ni on the composite particle, the SiO particle, and the graphite of a scale-like shape was varied.

Embodiments D44 to D49 were compared, where Cu was used as coating material. In Embodiments D45 to D48, where the compositions of the Cu on the composite particle fell within the range of 1 to 30 wt. %, large initial capacities and high capacity retention ratios were attained. Meanwhile, in Embodiment D44, where the composition of the Cu was 0.5 wt. %, the capacity retention ratio became rather low, and in Embodiment D49, where the composition of the Cu was 40 wt. %, the content of the SiO particle highly capable of absorbing lithium was small, so that the initial capacity became rather small. Therefore, it is preferable that the composition of the Cu on the composite particle in the total amount of the Cu on the composite particle, the SiO particle, and the graphite of a scale-like shape lie in the range of 1 to 30 wt. %.

In the comparison among Embodiments D50 to D55, where Ni was used as the coating material, similar results to those in the case where Cu was used were obtained in the relationship of the coating amount to the initial capacity and the capacity retention ratio. In addition, the results were consistent with those obtained in Embodiments D22 to D27, where carbon was used as the coating material.

Embodiment E

Embodiment E1

The surface of Si particle (s) was supported with carbon, as the electronic conductive additive (B), using the method (CVD) of thermally decomposing toluene gas under argon atmosphere at 1000° C., so that composite particle (e1) was prepared. The proportion of the electronic conductive additive (B) was determined to be 0.5 wt. % to the total mass of the composite particle (e1). The number average particle size of the product (e1) was 10 μm.

Next, with the use of such composite particle (e1), a non-aqueous electrolyte secondary battery was produced according to the following manner. First, 95.5 wt. % of the composite particle (e1) and, as the carbon material (D), 0.5 wt. % of artificial graphite were mixed together to prepare a negative active material. 97 wt. % of the obtained negative active material, 2 wt. % of styrene-butadiene rubber (SBR), and 1 wt. % of carboxymethyl-cellulose (CMC) were mixed in water to prepare a paste. The obtained paste was applied to a copper foil having a thickness of 15 μm so that the total amount of the negative active material to be housed in the battery could be 2.0 g, and then dried at 150° C. to evaporate water. This process was performed on both sides of the copper foil, which then compressed and molded by roll pressing. Thus, a negative electrode having the negative composite layer on either side was prepared.

Next, 90 wt. % of lithium cobalt oxide, 5 wt. % of acetylene black, and 5 wt. % of poly(vinylidene fluoride) (PVdF) were dispersed in NMP to make a paste. The obtained paste was applied to an aluminum foil having a thickness of 20 μm so that the total amount of the positive active material to be housed in the battery could be 5.3 g, and then dried at 150° C. to evaporate NMP. The above-described process was performed on both sides of the aluminum foil, which then compressed and molded by roll pressing. Thus, a positive electrode having the positive composite layer on either side was prepared.

The positive and negative electrodes thus prepared were overlapped and wound with a polyethylene separator, with continuous porosity having a thickness of 20 μm and a porosity of 40%, being placed between them, and this element was housed in the case having 48 mm in height, 30 mm in width, and 4.2 mm in thickness to form a prismatic-type battery having a rated capacity of 700 mA. Finally, the case was filled with a non-aqueous electrolyte solution; thus Battery (A1) of Embodiment 1 was completed. The non-aqueous electrolyte solution was prepared as follows: ethylene carbonate (EC) and diethyl carbonate (DEC) were mixed together in a volume ratio of 1:1, and 1 mol dm$^{-3}$ of LiPF$_6$ was dissolved in the mixed solvent thus prepared.

Embodiment E2

The surface of Si particle (s) was supported with carbon, as the electronic conductive additive (B), using the method (CVD) of thermally decomposing benzene gas under argon atmosphere at 1000° C., so that composite particle (e2) was prepared. The proportion of the electronic conductive additive (B) was determined to be 5.0 wt. % to the total mass of the composite particle (e2). The number average particle size of the composite particle (e2) was 10.9 μm. Except for using such composite particle (e2), Battery (A2) has an identical configuration to that of Embodiment E1. This battery was termed Embodiment E2.

Embodiment E3

The surface of Si particle (s) was supported with carbon, as the electronic conductive additive (B), using the method (CVD) of thermally decomposing benzene gas under argon atmosphere at 1000° C., so that composite particle (e3) was prepared. The proportion of the electronic conductive additive (B) was determined to be 10.0 wt. % to the total mass of the composite particle (e3). The number average particle size of the composite particle (e3) was 11.5 μm. Except for using such composite particle (e3), Battery (A3) has an identical configuration to that of Embodiment E1. This battery was termed Embodiment E3.

Embodiment E4

The surface of Si particle (s) was supported with carbon, as the electronic conductive additive (B), using the method (CVD) of thermally decomposing benzene gas under argon atmosphere at 1000° C., so that composite particle (e4) was prepared. The proportion of the electronic conductive additive (B) was determined to be 20.0 wt. % to the total mass of the composite particle (e4). The number average particle size of the composite particle (e4) was 13.0 μm. Except for using such composite particle (e4), Battery (A4) has an identical configuration to that of Embodiment E1. This battery was termed Embodiment E4.

Embodiment E5

The surface of Si particle (s) was supported with carbon, as the electronic conductive additive (B), using the method (CVD) of thermally decomposing benzene gas under argon atmosphere at 1000° C., so that composite particle (e5) was prepared. The proportion of the electronic conductive additive (B) was determined to be 30.0 wt. % to the total mass of the composite particle (e5). The number average particle size of the composite particle (e5) was 14.5 μm. Except for using such composite particle (e5), Battery (A5) has an identical configuration to that of Embodiment E1. This battery was termed Embodiment E5.

Embodiment E6

The surface of Si particle (s) was supported with carbon, as the electronic conductive additive (B), using the method (CVD) of thermally decomposing benzene gas under argon atmosphere at 1000° C., so that composite particle (e6) was prepared. The proportion of the electronic conductive additive (B) was determined to be 38.0 wt. % to the total mass of the composite particle (e6). The number average particle size of the composite particle (a) was 16.1 μm. Except for using such composite particle (e6), Battery (A6) has an identical configuration to that of Embodiment E1. This battery was termed Embodiment E6.

Embodiment E7

The surface of Si particle (s) was supported with carbon, as the electronic conductive additive (B), using the method (CVD) of thermally decomposing benzene gas under argon atmosphere at 1000° C., so that a product (e7) was prepared. The proportion of the electronic conductive additive (B) was determined to be 40.0 wt. % to the total mass of the product (e7). The number average particle size of the product (e7) was 16.4 μm. Except for using this product (e7), Battery (A7) has an identical configuration to that of Embodiment E1. This battery was termed Embodiment E7.

Comparative Example E1

The surface of Si particle (s) was supported with carbon, as the electronic conductive additive (B), using the method (CVD) of thermally decomposing benzene gas under argon atmosphere at 1000° C., so that a product (e8) was prepared. The proportion of the electronic conductive additive (B) was determined to be 0.1 wt. % to the total mass of the product (e8). The number average particle size of the product (e8) was 9.8 μm. Except for using this product (e8), Battery (B1) has an identical configuration to that of Embodiment E1. This battery was termed Comparative Example E1.

Embodiment E153

The surface of Si particle (s) was supported with carbon, as the electronic conductive additive (B), using the method (CVD) of thermally decomposing benzene gas under argon atmosphere at 1000° C., so that a product (e9) was prepared. The proportion of the electronic conductive additive (B) was determined to be 50.0 wt. % to the total mass of the product (e9). The number average particle size of the product (e9) was 18.1 μm. Except for using this product (e9), Battery (B2) has an identical configuration to that of Embodiment E1. This battery was termed Embodiment E153.

Embodiment E8

80.0 wt. % of the product (e1) and, as the carbon material (D), 20.0 wt. % of artificial graphite were mixed together to prepare a negative active material. Except for the above, Battery (A8) has an identical configuration to that of Embodiment E1. This battery was termed Embodiment E8.

Embodiments E9 to 14

Except for using the product (e2), Battery (A9) has an identical configuration to that of Embodiment E8. This battery was termed Embodiment E9. Except for using the product (e3), Battery (A10) has an identical configuration to that of Embodiment E8. This battery was termed Embodiment E10, Except for using the product (e4), Battery (A11) has an identical configuration to that of Embodiment E8. This battery was termed Embodiment E11. Except for using the product (e5), Battery (A12) has an identical configuration to that of Embodiment E8. This battery was termed Embodiment E12. Except for using the product (e6), Battery (A13) has an identical configuration to that of Embodiment E8. This battery was termed Embodiment E13. And, except for using the product (e7), Battery (A14) has an identical configuration to that of Embodiment E8. This battery was termed Embodiment E14.

Comparative Example E2

Except for using the product (e8), Battery (B3) has an identical configuration to that of Embodiment E8. This battery was termed Comparative Example E2.

Embodiment E154

Except for using the product (e9), Battery (B4) has an identical configuration to that of Embodiment E8. This battery was termed Embodiment E154.

Embodiment E15

99.9 wt. % of the product (e1) and, as the carbon material (D), 0.1 wt. % of artificial graphite were mixed together to prepare a negative active material. Except for the above, Battery (A15) has an identical configuration to that of Embodiment E1. This battery was termed Embodiment E15.

Embodiment E16

99.0 wt. % of the product (e1) and, as the carbon material (D), 1.0 wt. % of artificial graphite were mixed together to prepare a negative active material. Except for the above, Battery (A16) has an identical configuration to that of Embodiment E1. This battery was termed Embodiment E16.

Embodiment E17

95.0 wt. % of the product (e1) and, as the carbon material (D), 5.0 wt. % of artificial graphite were mixed together to prepare a negative active material. Except for the above, Battery (A17) has an identical configuration to that of Embodiment E1. This battery was termed Embodiment E17.

Embodiment E18

90.0 wt. % of the product (e1) and, as the carbon material (D), 10.0 wt. % of artificial graphite were mixed together to prepare a negative active material. Except for the above, Battery (A18) has an identical configuration to that of Embodiment E1. This battery was termed Embodiment E18.

Embodiment E19

85.0 wt. % of the product (e1) and, as the carbon material (D), 15.0 wt. % of artificial graphite were mixed together to prepare a negative active material. Except for the above, Battery (A19) has an identical configuration to that of Embodiment E1. This battery was termed Embodiment E19.

Embodiment E20

75.0 wt. % of the product (e1) and, as the carbon material (D), 25.0 wt. % of artificial graphite were mixed together to prepare a negative active material. Except for the above, Battery (A20) has an identical configuration to that of Embodiment E1. This battery was termed Embodiment E20.

Embodiment E21

99.9 wt. % of the product (e4) and, as the carbon material (D), 0.1 wt. % of artificial graphite were mixed together to prepare a negative active material. Except for the above, Battery (A21) has an identical configuration to that of Embodiment E1. This battery was termed Embodiment E21.

Embodiment E22

99.0 wt. % of the product (e4) and, as the carbon material (D), 1.0 wt. % of artificial graphite were mixed together to prepare a negative active material. Except for the above, Battery (A22) has an identical configuration to that of Embodiment E1. This battery was termed Embodiment E22.

Embodiment E23

95.0 wt. % of the product (e4) and, as the carbon material (D), 5.0 wt. % of artificial graphite were mixed together to prepare a negative active material. Except for the above, Battery (A23) has an identical configuration to that of Embodiment E1. This battery was termed Embodiment E23.

Embodiment E24

90.0 wt. % of the product (e4) and, as the carbon material (D), 10.0 wt. % of artificial graphite were mixed together to prepare a negative active material. Except for the above, Battery (A24) has an identical configuration to that of Embodiment E1. This battery was termed Embodiment E24.

Embodiment E25

85.0 wt. % of the product (e4) and, as the carbon material (D), 15.0 wt. % of artificial graphite were mixed together to prepare a negative active material. Except for the above, Battery (A25) has an identical configuration to that of Embodiment E1. This battery was termed Embodiment E25.

Embodiment E26

75.0 wt. % of the product (e4) and, as the carbon material (D), 25.0 wt. % of artificial graphite were mixed together to prepare a negative active material. Except for the above, Battery (A26) has an identical configuration to that of Embodiment E1. This battery was termed Embodiment E26.

Embodiment E27

99.9 wt. % of the product (e7) and, as the carbon material (D), 0.1 wt. % of artificial graphite were mixed together to prepare a negative active material. Except for the above, Battery (A27) has an identical configuration to that of Embodiment E1. This battery was termed Embodiment E27.

Embodiment E28

99.0 wt. % of the product (e7) and, as the carbon material (D), 1.0 wt. % of artificial graphite were mixed together to prepare a negative active material. Except for the above, Battery (A28) has an identical configuration to that of Embodiment E1. This battery was termed Embodiment E28.

Embodiment E29

95.0 wt. % of the product (e7) and, as the carbon material (D), 5.0 wt. % of artificial graphite were mixed together to prepare a negative active material. Except for the above, Battery (A29) has an identical configuration to that of Embodiment E1. This battery was termed Embodiment E29.

Embodiment E30

90.0 wt. % of the product (e7) and, as the carbon material (D), 10.0 wt. % of artificial graphite were mixed together to prepare a negative active material. Except for the above, Battery (A30) has an identical configuration to that of Embodiment E1. This battery was termed Embodiment E30.

Embodiment E31

85.0 wt. % of the product (e7) and, as the carbon material (D), 15.0 wt. % of artificial graphite were mixed together to prepare a negative active material. Except for the above, Battery (A31) has an identical configuration to that of Embodiment E1. This battery was termed Embodiment E31.

Embodiment E32

75.0 wt. % of the product (e7) and, as the carbon material (D), 25.0 wt. % of artificial graphite were mixed together to prepare a negative active material. Except for the above, Battery (A32) has an identical configuration to that of Embodiment E1. This battery was termed Embodiment E32.

Embodiment E33

By mechanochemical reaction between Si particle (s) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e10) was prepared. The proportions of the electronic conductive additive (B) and the carbon material (E) were determined to be 0.5 wt. % and 59.5 wt. %, respectively, to the total mass of the product (e10). The number average particle size of the product (e10) was 15 μm.

Except for using the product (e10), Battery (A33) has an identical configuration to that of Embodiment E1. This battery was termed Embodiment E33.

Embodiment E34

By mechanochemical reaction between Si particle (s) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e11) was prepared. The proportions of the electronic conductive additive (B) and the carbon material (E) were determined to be 5.0 wt. % and 59.0 wt. %, respectively, to the total mass of the product (e11). The number average particle size of the product (e11) was 15.5 μm.

Except for using the product (e11), Battery (A34) has an identical configuration to that of Embodiment E1. This battery was termed Embodiment E34.

Embodiment E35

By mechanochemical reaction between Si particle (s) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e12) was prepared. The proportions of the electronic conductive additive (B) and the carbon material (E) were determined to be 10.0 wt. % and 50.0 wt. %, respectively, to the total mass of the product (e12). The number average particle size of the product (e12) was 16.1 μm.

Except for using the product (e12), Battery (A35) has an identical configuration to that of Embodiment E1. This battery was termed Embodiment E35.

Embodiment E36

By mechanochemical reaction between Si particle (s) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e13) was prepared. The proportions of the electronic conductive additive (B) and the carbon material (E) were determined to be 20.0 wt. % and 40.0 wt. %, respectively, to the total mass of the product (e13). The number average particle size of the product (e13) was 17.2 μm.

Except for using the product (e13), Battery (A36) has an identical configuration to that of Embodiment E1. This battery was termed Embodiment E36.

Embodiment E37

By mechanochemical reaction between Si particle (s) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e14) was prepared. The proportions of the electronic conductive additive (B) and the carbon material (E) were determined to be 30.0 wt. % and 30.0 wt. %, respectively, to the total mass of the product (e14). The number average particle size of the product (e14) was 18.1 μm.

Except for using the product (e14), Battery (A37) has an identical configuration to that of Embodiment E1. This battery was termed Embodiment E37.

Embodiment E38

By mechanochemical reaction between Si particle (s) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e15) was prepared. The proportions of the electronic conductive additive (B) and the carbon material (E) were determined to be 38.0 wt. % and 22.0 wt. %, respectively, to the total mass of the product (e15). The number average particle size of the product (e15) was 19.5 μm.

Except for using the product (e15), Battery (A38) has an identical configuration to that of Embodiment E1. This battery was termed Embodiment E38.

Embodiment E39

By mechanochemical reaction between Si particle (s) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e16) was prepared. The proportions of the electronic conductive additive (B) and the carbon material (E) were determined to be 40.0 wt. % and 20.0 wt. %, respectively, to the total mass of the product (e16). The number average particle size of the product (e16) was 20.4 μm.

Except for using the product (e16), Battery (A39) has an identical configuration to that of Embodiment E1. This battery was termed Embodiment E39.

Comparative Example E3

By mechanochemical reaction between Si particle (s) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e17) was prepared. The proportions of the electronic conductive additive (B) and the carbon material (E) were determined to be 0.1 wt. % and 59.9 wt. %, respectively, to the total mass of the product (e17). The number average particle size of the product (e17) was 14.8 μm.

Except for using the product (e17), Battery (B5) has an identical configuration to that of Embodiment E1. This battery was termed Comparative Example E3.

Embodiment E155

By mechanochemical reaction between Si particle (s) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e18) was prepared. The proportions of the electronic conductive additive (B) and the carbon material (E) were determined to be 50.0 wt. % and 10.0 wt. %, respectively, to the total mass of the product (e18). The number average particle size of the product (e18) was 21.5 μm.

Except for using the product (e18), Battery (B6) has an identical configuration to that of Embodiment E1. This battery was termed Embodiment E155.

Embodiment E40

80.0 wt. % of the product (e10) and, as the carbon material (D), 20.0 wt. % of artificial graphite were mixed together to prepare a negative active material. Except for the above, Battery (A40) has an identical configuration to that of Embodiment E1. This battery was termed Embodiment E40.

Embodiment E41

Except for using the product (e11), Battery (A41) has an identical configuration to that of Embodiment E40. This battery was termed Embodiment E41.

Embodiment E42

Except for using the product (e12), Battery (A42) has an identical configuration to that of Embodiment E40. This battery was termed Embodiment E42.

Embodiment E43

Except for using the product (e13), Battery (A43) has an identical configuration to that of Embodiment E40. This battery was termed Embodiment E43.

Embodiment E44

Except for using the product (e14), Battery (A44) has an identical configuration to that of Embodiment E40. This battery was termed Embodiment E44.

Embodiment E45

Except for using the product (e15), Battery (A45) has an identical configuration to that of Embodiment E40. This battery was termed Embodiment E45.

Embodiment E46

Except for using the product (e16), Battery (A46) has an identical configuration to that of Embodiment E40. This battery was termed Embodiment E46.

Comparative Example E4

Except for using the product (e17), Battery (B7) has an identical configuration to that of Embodiment E40. This battery was termed Comparative Example E4.

Embodiment E156

Except for using the product (e18), Battery (B8) has an identical configuration to that of Embodiment E40. This battery was termed Embodiment E156.

Embodiment E47

99.9 wt. % of the product (e10) and, as the carbon material (D), 0.1 wt. % of artificial graphite were mixed together to prepare a negative active material. Except for the above, Battery (A47) has an identical configuration to that of Embodiment E1. This battery was termed Embodiment E47.

Embodiment E48

99.0 wt. % of the product (e10) and, as the carbon material (D), 1.0 wt. % of artificial graphite were mixed together to prepare a negative active material. Except for the above, Battery (A48) has an identical configuration to that of Embodiment E1. This battery was termed Embodiment E48.

Embodiment E49

95.0 wt. % of the product (e10) and, as the carbon material (D), 5.0 wt. % of artificial graphite were mixed together to prepare a negative active material. Except for the above, Battery (A49) has an identical configuration to that of Embodiment E1. This battery was termed Embodiment E49.

Embodiment E50

90.0 wt. % of the product (e10) and, as the carbon material (D), 10.0 wt. % of artificial graphite were mixed together to prepare a negative active material. Except for the above, Battery (A50) has an identical configuration to that of Embodiment E1. This battery was termed Embodiment E50.

Embodiment E51

85.0 wt. % of the product (e10) and, as the carbon material (D), 15.0 wt. % of artificial graphite were mixed together to prepare a negative active material. Except for the above, Battery (A51) has an identical configuration to that of Embodiment E1. This battery was termed Embodiment E51.

Embodiment E52

75.0 wt. % of the product (e10) and, as the carbon material (D), 25.0 wt. % of artificial graphite were mixed together to prepare a negative active material. Except for the above, Battery (A52) has an identical configuration to that of Embodiment E1. This battery was termed Embodiment E52.

Embodiment E53

99.9 wt. % of the product (e13) and, as the carbon material (D), 0.1 wt. % of artificial graphite were mixed together to prepare a negative active material. Except for the above, Battery (A53) has an identical configuration to that of Embodiment E1. This battery was termed Embodiment E53.

Embodiment E54

99.0 wt. % of the product (e13) and, as the carbon material (D), 1.0 wt. % of artificial graphite were mixed together to prepare a negative active material. Except for the above, Battery (A54) has an identical configuration to that of Embodiment E1. This battery was termed Embodiment E54.

Embodiment E55

95.0 wt. % of the product (e13) and, as the carbon material (D), 5.0 wt. % of artificial graphite were mixed together to prepare a negative active material. Except for the above, Battery (A56) has an identical configuration to that of Embodiment E1. This battery was termed Embodiment E55.

Embodiment E56

90.0 wt. % of the product (e13) and, as the carbon material (D), 10.0 wt. % of artificial graphite were mixed together to prepare a negative active material. Except for the above, Battery (A56) has an identical configuration to that of Embodiment E1. This battery was termed Embodiment E56.

Embodiment E57

85.0 wt. % of the product (e13) and, as the carbon material (D), 15.0 wt. % of artificial graphite were mixed together to prepare a negative active material. Except for the above, Battery (A57) has an identical configuration to that of Embodiment E1. This battery was termed Embodiment E57.

Embodiment E58

75.0 wt. % of the product (e13) and, as the carbon material (D), 25.0 wt. % of artificial graphite were mixed together to prepare a negative active material. Except for the above, Battery (A58) has an identical configuration to that of Embodiment E1. This battery was termed Embodiment E58.

Embodiment E59

99.9 wt. % of the product (e16) and, as the carbon material (D), 0.1 wt. % of artificial graphite were mixed together to prepare a negative active material. Except for the above, Battery (A59) has an identical configuration to that of Embodiment E1. This battery was termed Embodiment E59.

Embodiment E60

99.0 wt. % of the product (e16) and, as the carbon material (D), 1.0 wt. % of artificial graphite were mixed together to prepare a negative active material. Except for the above, Battery (A60) has an identical configuration to that of Embodiment E1. This battery was termed Embodiment EGO.

Embodiment E61

95.0 wt. % of the product (e16) and, as the carbon material (D), 5.0 wt. % of artificial graphite were mixed together to prepare a negative active material. Except for the above, Battery (A61) has an identical configuration to that of Embodiment E1. This battery was termed Embodiment E61.

Embodiment E62

90.0 wt. % of the product (e16) and, as the carbon material (D), 10.0 wt. % of artificial graphite were mixed together to prepare a negative active material. Except for the above, Battery (A62) has an identical configuration to that of Embodiment E1. This battery was termed Embodiment E62.

Embodiment E63

85.0 wt. % of the product (e16) and, as the carbon material (D), 15.0 wt. % of artificial graphite were mixed together to prepare a negative active material. Except for the above, Battery (A63) has an identical configuration to that of Embodiment E1. This battery was termed Embodiment E63.

Embodiment E64

75.0 wt. % of the product (e16) and, as the carbon material (D), 25.0 wt. % of artificial graphite were mixed together to prepare a negative active material. Except for the above, Battery (A64) has an identical configuration to that of Embodiment E1. This battery was termed Embodiment E64.

Embodiment E65

The surface of SiO particle (t) was supported with carbon, as the electronic conductive additive (B), using the method (CVD) of thermally decomposing toluene gas under argon atmosphere at 1000° C., so that a product (e17) was prepared. The proportion of the electronic conductive additive (B) was determined to be 0.5 wt. % to the total mass of the product (e17). The number average particle size of the product (e17) was 0.9 µm.
30 wt. % of the product (e17) and, as the carbon material (D), 40 wt. % of meso carbon microbeads, 10 wt. % of natural graphite and 20 wt. % of artificial graphite were mixed together to prepare a negative active material. Except for the above, Battery (A65) has an identical configuration to that of Embodiment E1. This battery was termed Embodiment E65.

Embodiment E66

The surface of SiO particle (t) was supported with carbon, as the electronic conductive additive (B), using the method (CVD) of thermally decomposing toluene gas under argon atmosphere at 1000° C., so that a product (e18) was prepared. The proportion of the electronic conductive additive (B) was determined to be 1.0 wt. % to the total mass of the product (e18). The number average particle size of the product (e18) was 0.9 µm.
Except for using this product (e18), Battery (A66) has an identical configuration to that of Embodiment E65. This battery was termed Embodiment E66.

Embodiment E67

The surface of SiO particle (t) was supported with carbon, as the electronic conductive additive (B), using the method (CVD) of thermally decomposing toluene gas under argon atmosphere at 1000° C., so that a product (e19) was prepared. The proportion of the electronic conductive additive (B) was determined to be 10.0 wt. % to the total mass of the product (e19). The number average particle size of the product (e19) was 1.0 µm.
Except for using this product (e19), Battery (A67) has an identical configuration to that of Embodiment E65. This battery was termed Embodiment E67.

Embodiment E68

The surface of SiO particle (t) was supported with carbon, as the electronic conductive additive (B), using the method (CVD) of thermally decomposing toluene gas under argon atmosphere at 1000° C., so that a product (e20) was prepared. The proportion of the electronic conductive additive (B) was determined to be 20.0 wt. % to the total mass of the product (e20). The number average particle size of the product (e20) was 1.0 µm.
Except for using this product (e20), Battery (A68) has an identical configuration to that of Embodiment E65. This battery was termed Embodiment E68.

Embodiment E69

The surface of SiO particle (t) was supported with carbon, as the electronic conductive additive (B), using the method (CVD) of thermally decomposing toluene gas under argon atmosphere at 1000° C., so that a product (e21) was prepared. The proportion of the electronic conductive additive (B) was determined to be 30.0 wt. % to the total mass of the product (e21). The number average particle size of the product (e21) was 1.1 µm.
Except for using this product (e21), Battery (A69) has an identical configuration to that of Embodiment E65. This battery was termed Embodiment E69.

Embodiment E70

The surface of SiO particle (t) was supported with carbon, as the electronic conductive additive (B), using the method (CVD) of thermally decomposing toluene gas under argon atmosphere at 1000° C., so that a product (e22) was prepared. The proportion of the electronic conductive additive (B) was determined to be 38.0 wt. % to the total mass of the product (e22). The number average particle size of the product (e22) was 1.2 µm.
Except for using this product (e22), Battery (A70) has an identical configuration to that of Embodiment E65. This battery was termed Embodiment E70.

Embodiment E71

The surface of SiO particle (t) was supported with carbon, as the electronic conductive additive (B), using the method (CVD) of thermally decomposing toluene gas under argon atmosphere at 1000° C., so that a product (e23) was prepared. The proportion of the electronic conductive additive (B) was determined to be 40.0 wt. % to the total mass of the product (e23). The number average particle size of the product (e23) was 1.4 µm.

Except for using this product (e23), Battery (A71) has an identical configuration to that of Embodiment E65. This battery was termed Embodiment E71.

Comparative Example E5

The surface of SiO particle (t) was supported with carbon, as the electronic conductive additive (B), using the method (CVD) of thermally decomposing toluene gas under argon atmosphere at 1000° C., so that a product (e24) was prepared. The proportion of the electronic conductive additive (B) was determined to be 0.1 wt. % to the total mass of the product (e24). The number average particle size of the product (e24) was 0.8 µm.

Except for using this product (e24), Battery (B9) has an identical configuration to that of Embodiment E65. This battery was termed Comparative Example E5.

Embodiment E157

The surface of SiO particle (t) was supported with carbon, as the electronic conductive additive (B), using the method (CVD) of thermally decomposing toluene gas under argon atmosphere at 1000° C., so that a product (e25) was prepared. The proportion of the electronic conductive additive (B) was determined to be 50.0 wt. % to the total mass of the product (e25). The number average particle size of the product (e25) was 1.5 µm.

Except for using this product (e25), Battery (B10) has an identical configuration to that of Embodiment E65. This battery was termed Embodiment E157.

Embodiment E72

10 wt. % of the product (e17) and, as the carbon material (D), 40 wt. % of meso carbon microbeads, 30 wt. % of natural graphite and 20 wt. % of artificial graphite were mixed together to prepare a negative active material. Except for the above, Battery (A72) has an identical configuration to that of Embodiment E1. This battery was termed Embodiment E72.

Embodiment E73

Except for using the product (e18), Battery (A73) has an identical configuration to that of Embodiment E72. This battery was termed Embodiment E73.

Embodiment E74

Except for using the product (e19), Battery (A74) has an identical configuration to that of Embodiment E72. This battery was termed Embodiment E74.

Embodiment E75

Except for using the product (e20), Battery (A75) has an identical configuration to that of Embodiment E72. This battery was termed Embodiment E75.

Embodiment E76

Except for using the product (e21), Battery (A76) has an identical configuration to that of Embodiment E72. This battery was termed Embodiment E76.

Embodiment E77

Except for using the product (e22), Battery (A77) has an identical configuration to that of Embodiment E72. This battery was termed Embodiment E77.

Embodiment E78

Except for using the product (e23), Battery (A78) has an identical configuration to that of Embodiment E72. This battery was termed Embodiment E78.

Comparative Example E6

Except for using the product (e24), Battery (B11) has an identical configuration to that of Embodiment E72. This battery was termed Comparative Example E6.

Embodiment E158

Except for using the product (e25), Battery (B12) has an identical configuration to that of Embodiment E72. This battery was termed Embodiment E158.

Embodiment E79

5 wt. % of the product (e17) and, as the carbon material (D), 40 wt. % of meso carbon microbeads, 35 wt. % of natural graphite and 20 wt. % of artificial graphite were mixed together to prepare a negative active material. Except for the above, Battery (A79) has an identical configuration to that of Embodiment E1. This battery was termed Embodiment E79.

Embodiment E80

Except for using the product (e18), Battery (A80) has an identical configuration to that of Embodiment E79. This battery was termed Embodiment E80.

Embodiment E81

Except for using the product (e19), Battery (A81) has an identical configuration to that of Embodiment E79. This battery was termed Embodiment E81.

Embodiment E82

Except for using the product (e20), Battery (A82) has an identical configuration to that of Embodiment E79. This battery was termed Embodiment E82.

Embodiment E83

Except for using the product (e21), Battery (A83) has an identical configuration to that of Embodiment E79. This battery was termed Embodiment E83.

Embodiment E84

Except for using the product (e22), Battery (A84) has an identical configuration to that of Embodiment E79. This battery was termed Embodiment E84.

Embodiment E85

Except for using the product (e23), Battery (A85) has an identical configuration to that of Embodiment E79. This battery was termed Embodiment E85.

Comparative Example E7

Except for using the product (e24), Battery (B13) has an identical configuration to that of Embodiment E79. This battery was termed Comparative Example E7.

Embodiment E159

Except for using the product (e25), Battery (B14) has an identical configuration to that of Embodiment E79. This battery was termed Embodiment E159.

Embodiment E86

1 wt. % of the product (e17) and, as the carbon material (D), 40 wt. % of meso carbon microbeads, 39 wt. % of natural graphite and 20 wt. % of artificial graphite were mixed together to prepare a negative active material. Except for the above, Battery (A86) has an identical configuration to that of Embodiment E1. This battery was termed Embodiment E86.

Embodiment E87

Except for using the product (e18), Battery (A87) has an identical configuration to that of Embodiment. E86. This battery was termed Embodiment E87.

Embodiment E88

Except for using the product (e19), Battery (A88) has an identical configuration to that of Embodiment E86. This battery was termed Embodiment E88.

Embodiment E89

Except for using the product (e20), Battery (A89) has an identical configuration to that of Embodiment E86. This battery was termed Embodiment E89.

Embodiment E90

Except for using the product (e21), Battery (A90) has an identical configuration to that of Embodiment E86. This battery was termed Embodiment E90.

Embodiment E91

Except for using the product (e22), Battery (A91) has an identical configuration to that of Embodiment E86. This battery was termed Embodiment E91.

Embodiment E92

Except for using the product (e23), Battery (A92) has an identical configuration to that of Embodiment E86. This battery was termed Embodiment E92.

Comparative Example E8

Except for using the product (e24), Battery (B15) has an identical configuration to that of Embodiment E86. This battery was termed Comparative Example E8.

Embodiment E160

Except for using the product (e25), Battery (B16) has an identical configuration to that of Embodiment E86. This battery was termed Embodiment E160.

Embodiment E93

35 wt. % of the product (e17) and, as the carbon material (D), 40 wt. % of meso carbon microbeads, 5 wt. % of natural graphite and 20 wt. % of artificial graphite were mixed together to prepare a negative active material. Except for the above, Battery (A93) has an identical configuration to that of Embodiment E1. This battery was termed Embodiment E93.

Embodiment E94

20 wt. % of the product (e17) and, as the carbon material (D), 40 wt. % of meso carbon microbeads, 20 wt. % of natural graphite and 20 wt. % of artificial graphite were mixed together to prepare a negative active material. Except for the above, Battery (A94) has an identical configuration to that of Embodiment E1. This battery was termed Embodiment E94.

Embodiment E95

0.5 wt. % of the product (e17) and, as the carbon material (D), 40 wt. % of meso carbon microbeads, 35.5 wt. % of natural graphite and 20 wt. % of artificial graphite were mixed together to prepare a negative active material. Except for the above, Battery (A95) has an identical configuration to that of Embodiment E1. This battery was termed Embodiment E95.

Embodiment E96

35 wt. % of the product (e20) and, as the carbon material (D), 40 wt. % of meso carbon microbeads, 5 wt. % of natural graphite and 20 wt. % of artificial graphite were mixed together to prepare a negative active material. Except for the above, Battery (A96) has an identical configuration to that of Embodiment E1. This battery was termed Embodiment E96.

Embodiment E97

20 wt. % of the product (e20) and, as the carbon material (D), 40 wt. % of meso carbon microbeads, 20 wt. % of natural graphite and 20 wt. % of artificial graphite were mixed together to prepare a negative active material. Except for the above, Battery (A97) has an identical configuration to that of Embodiment E1. This battery was termed Embodiment E97.

Embodiment E98

0.5 wt. % of the product (e20) and, as the carbon material (D), 40 wt. % of mesa carbon microbeads, 35.5 wt. % of natural graphite and 20 wt. % of artificial graphite were mixed together to prepare a negative active material. Except for the above, Battery (A98) has an identical configuration to that of Embodiment E1. This battery was termed Embodiment E98.

Embodiment E99

35 wt. % of the product (e23) and, as the carbon material (D), 40 wt. % of meso carbon microbeads, 5 wt. % of natural graphite and 20 wt. % of artificial graphite were mixed together to prepare a negative active material. Except for the above, Battery (A99) has an identical configuration to that of Embodiment E1. This battery was termed Embodiment E99.

Embodiment E100

20 wt. % of the product (e23) and, as the carbon material (D), 40 wt. % of meso carbon microbeads, 20 wt. % of natural graphite and 20 wt. % of artificial graphite were mixed together to prepare a negative active material. Except for the above, Battery (MOO) has an identical configuration to that of Embodiment E1. This battery was termed Embodiment E100.

Embodiment E101

0.5 wt. % of the product (e23) and, as the carbon material (D), 40 wt. % of meso carbon microbeads, 35.5 wt. % of natural graphite and 20 wt. % of artificial graphite were mixed together to prepare a negative active material. Except for the above, Battery (A101) has an identical configuration to that of Embodiment E1. This battery was termed Embodiment E101.

Embodiment E102

The surface of SiO particle (t) was supported with nickel, as the electronic conductive additive (B), by electroless plating technique with the use of Ni-801 (Kojundo Chemical Laboratory) as a plating solution, so that a product (e26) was prepared. The proportion of the electronic conductive additive (B) was determined to be 0.5 wt. % to the total mass of the product (e26). The number average particle size of the product (e26) was 0.9 μm.

5 wt. % of the product (e26) and, as the carbon material (D), 40 wt. % of meso carbon microbeads, 35 wt. % of natural graphite and 20 wt. % of artificial graphite were mixed together to prepare a negative active material. Except for the above, Battery (A102) has an identical configuration to that of Embodiment E1. This battery was termed Embodiment E102.

Embodiment E103

The surface of SiO particle (t) was supported with nickel, as the electronic conductive additive (B), by electroless plating technique with the use of Ni-801 (Kojundo Chemical Laboratory) as a plating solution, so that a product (e27) was prepared. The proportion of the electronic conductive additive (B) was determined to be 1.0 wt. % to the total mass of the product (e27). The number average particle size of the product (e27) was 1.0 μm.

Except for using the product (e27), Battery (A103) has an identical configuration to that of Embodiment E102. This battery was termed Embodiment E103.

Embodiment E104

The surface of SiO particle (t) was supported with nickel, as the electronic conductive additive (B), by electroless plating technique with the use of Ni-801 (Kojundo Chemical Laboratory) as a plating solution, so that a product (e28) was prepared. The proportion of the electronic conductive additive (B) was determined to be 10.0 wt. % to the total mass of the product (e28). The number average particle size of the product (e28) was 1.0 μm.

Except for using the product (e28), Battery (A104) has an identical configuration to that of Embodiment E103. This battery was termed Embodiment E104.

Embodiment E105

The surface of SiO particle (t) was supported with nickel, as the electronic conductive additive (B), by electroless plating technique with the use of Ni-801 (Kojundo Chemical Laboratory) as a plating solution, so that a product (e29) was prepared. The proportion of the electronic conductive additive (B) was determined to be 20.0 wt. % to the total mass of the product (e29). The number average particle size of the product (e29) was 1.0 μm.

Except for using the product (e29), Battery (A105) has an identical configuration to that of Embodiment E103. This battery was termed Embodiment E105.

Embodiment E106

The surface of SiO particle (t) was supported with nickel, as the electronic conductive additive (B), by electroless plating technique with the use of Ni-801 (Kojundo Chemical Laboratory) as a plating solution, so that a product (e30) was prepared. The proportion of the electronic conductive additive (B) was determined to be 30.0 wt. % to the total mass of the product (e30). The number average particle size of the product (e30) was 1.0 μm.

Except for using the product (e30), Battery (A106) has an identical configuration to that of Embodiment E103. This battery was termed Embodiment E106.

Embodiment E107

The surface of SiO particle (t) was supported with nickel, as the electronic conductive additive (B), by electroless plating technique with the use of Ni-801 (Kojundo Chemical Laboratory) as a plating solution, so that a product (e31) was prepared. The proportion of the electronic conductive additive (B) was determined to be 38.0 wt. % to the total mass of the product (e31). The number average particle size of the product (e31) was 1.1 μm.

Except for using the product (e31), Battery (A107) has an identical configuration to that of Embodiment E103. This battery was termed Embodiment E107.

Embodiment E108

The surface of SiO particle (t) was supported with nickel, as the electronic conductive additive (B), by electroless plating technique with the use of Ni-801 (Kojundo Chemical Laboratory) as a plating solution, so that a product (e32) was prepared. The proportion of the electronic conductive additive (B) was determined to be 40.0 wt. % to the total mass of the product (e32). The number average particle size of the product (e32) was 1.2 μm.

Except for using the product (e32), Battery (A108) has an identical configuration to that of Embodiment E103. This battery was termed Embodiment E108.

Comparative Example E9

The surface of SiO particle (t) was supported with nickel, as the electronic conductive additive (B), by electroless plating technique with the use of Ni-801 (Kojundo Chemical Laboratory) as a plating solution, so that a product (e33) was prepared. The proportion of the electronic conductive additive (B) was determined to be 0.1 wt. % to the total mass of the product (e33). The number average particle size of the product (e33) was 0.9 μm.

Except for using the product (e33), Battery (B17) has an identical configuration to that of Embodiment E108. This battery was termed Comparative Example E9.

Embodiment E161

The surface of SiO particle (t) was supported with nickel, as the electronic conductive additive (B), by electroless plating technique with the use of Ni-801 (Kojundo Chemical Laboratory) as a plating solution, so that a product (e34) was prepared. The proportion of the electronic conductive additive (B) was determined to be 50.0 wt. % to the total mass of the product (e34). The number average particle size of the product (e34) was 1.4 μm.

Except for using the product (e34), Battery (B18) has an identical configuration to that of Embodiment E108. This battery was termed Embodiment E161.

Embodiment E109

By mechanochemical reaction between SiO particle (t) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e35) was prepared. The proportions of the electronic conductive additive (B) and the carbon material (E) were determined to be 0.5 wt. % and 59.5 wt. %, respectively, to the total mass of the product (e35). The number average particle size of the product (e35) was 15.5 μm.

30 wt. % of the product (e35) and, as the carbon material (D), 40 wt. % of meso carbon microbeads, 10 wt. % of natural graphite and 20 wt. % of artificial graphite were mixed together to prepare a negative active material. Except for the above, Battery (A109) has an identical configuration to that of Embodiment E1. This battery was termed Embodiment E109.

Embodiment E110

By mechanochemical reaction between SiO particle (t) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e36) was prepared. The proportions of the electronic conductive additive (B) and the carbon material (E) were determined to be 1.0 wt. % and 59.0 wt. %, respectively, to the total mass of the product (e36). The number average particle size of the product (e36) was 16.3 μm.

Except for using this product (e36), Battery (A110) has an identical configuration to that of Embodiment E109. This battery was termed Embodiment E110.

Embodiment E111

By mechanochemical reaction between SiO particle (t) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e37) was prepared. The proportions of the electronic conductive additive (B) and the carbon material (E) were determined to be 10.0 wt. % and 50.0 wt. %, respectively, to the total mass of the product (e37). The number average particle size of the product (e37) was 18.3 μm.

Except for using this product (e37), Battery (A111) has an identical configuration to that of Embodiment E109. This battery was termed Embodiment E111.

Embodiment E112

By mechanochemical reaction between SiO particle (t) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e38) was prepared. The proportions of the electronic conductive additive (B) and the carbon material (E) were determined to be 20.0 wt. % and 40.0 wt. %, respectively, to the total mass of the product (e38). The number average particle size of the product (e38) was 20.0 μm.

Except for using this product (e38), Battery (A112) has an identical configuration to that of Embodiment E109. This battery was termed Embodiment E112.

Embodiment E113

By mechanochemical reaction between SiO particle (t) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e39) was prepared. The proportions of the electronic conductive additive (B) and the carbon material (E) were determined to be 30.0 wt. % and 30.0 wt. %, respectively, to the total mass of the product (e39). The number average particle size of the product (e39) was 20.3 μm.

Except for using this product (e39), Battery (A113) has an identical configuration to that of Embodiment E109. This battery was termed Embodiment E113.

Embodiment E114

By mechanochemical reaction between SiO particle (t) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e40) was prepared. The proportions of the electronic conductive additive (B) and the carbon material (E) were determined to be 38.0 wt. % and 22.0 wt. %, respectively, to the total mass of the product (e40). The number average particle size of the product (e40) was 20.7 µm.

Except for using this product (e40), Battery (A114) has an identical configuration to that of Embodiment E109. This battery was termed Embodiment E114.

Embodiment E115

By mechanochemical reaction between SiO particle (t) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e41) was prepared. The proportions of the electronic conductive additive (B) and the carbon material (E) were determined to be 40.0 wt. % and 20.0 wt. %, respectively, to the total mass of the product (e41). The number average particle size of the product (e41) was 21.7 µm.

Except for using this product (e41), Battery (A115) has an identical configuration to that of Embodiment E109. This battery was termed Embodiment E115.

Comparative Example E10

By mechanochemical reaction between SiO particle (t) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e42) was prepared. The proportions of the electronic conductive additive (B) and the carbon material (E) were determined to be 0.1 wt. % and 59.9 wt. %, respectively, to the total mass of the product (e42). The number average particle size of the product (e42) was 14.5 µm.

Except for using this product (e42), Battery (B19) has an identical configuration to that of Embodiment E109. This battery was termed Comparative Example E10.

Embodiment E162

By mechanochemical reaction between SiO particle (t) and artificial graphite, as the carbon material (E), a composite was prepared. The surface of such composite was supported with carbon, as the electronic conductive additive (B), using the method (CVD) of thermally decomposing toluene gas under argon atmosphere at 1000° C., so that a product (e43) was prepared. The proportions of the electronic conductive additive (B) and the carbon material (E) were determined to be 50.0 wt. % and 10.0 wt. %, respectively, to the total mass of the product (e43). The number average particle size of the product (e43) was 22.5 µm.

Except for using this product (e43), Battery (B20) has an identical configuration to that of Embodiment E109. This battery was termed Embodiment E162.

Embodiment E116

10 wt. % of the product (e35) and, as the carbon material (D), 40 wt. % of meso carbon microbeads, 30 wt. % of natural graphite and 20 wt. % of artificial graphite were mixed together to prepare a negative active material. Except for the above, Battery (A116) has an identical configuration to that of Embodiment E1. This battery was termed Embodiment E116.

Embodiment E117

Except for using the product (e36), Battery (A117) has an identical configuration to that of Embodiment E116. This battery was termed Embodiment E117.

Embodiment E118

Except for using the product (e37), Battery (A118) has an identical configuration to that of Embodiment E116. This battery was termed Embodiment E118.

Embodiment E119

Except for using the product (e38), Battery (A119) has an identical configuration to that of Embodiment E116. This battery was termed Embodiment E119.

Embodiment E120

Except for using the product (e39), Battery (A120) has an identical configuration to that of Embodiment E116. This battery was termed Embodiment E120.

Embodiment E121

Except for using the product (e40), Battery (A121) has an identical configuration to that of Embodiment E116. This battery was termed Embodiment E121.

Embodiment E122

Except for using the product (e41), Battery (A122) has an identical configuration to that of Embodiment E116. This battery was termed Embodiment E122.

Comparative Example E11

Except for using the product (e42), Battery (B21) has an identical configuration to that of Embodiment E116. This battery was termed Comparative Example E11.

Embodiment E163

Except for using the product (e43), Battery (B22) has an identical configuration to that of Embodiment E116. This battery was termed Embodiment E163

Embodiment E123

5 wt. % of the product (e35) and, as the carbon material (D), 40 wt. % of meso carbon microbeads, 35 wt. % of natural graphite and 20 wt. % of artificial graphite were mixed together to prepare a negative active material. Except for the above, Battery (A123) has an identical configuration to that of Embodiment E1. This battery was termed Embodiment E123.

Embodiment E124

Except for using the product (e36), Battery (A124) has an identical configuration to that of Embodiment E123. This battery was termed Embodiment E124.

Embodiment E125

Except for using the product (e37), Battery (A125) has an identical configuration to that of Embodiment E123. This battery was termed Embodiment E125.

Embodiment E126

Except for using the product (e38), Battery (A126) has an identical configuration to that of Embodiment E123. This battery was termed Embodiment E126.

Embodiment E127

Except for using the product (e39), Battery (A127) has an identical configuration to that of Embodiment E123. This battery was termed Embodiment E127.

Embodiment E128

Except for using the product (e40), Battery (A128) has an identical configuration to that of Embodiment E123. This battery was termed Embodiment E128.

Embodiment E129

Except for using the product (e41), Battery (A129) has an identical configuration to that of Embodiment E123. This battery was termed Embodiment E129.

Comparative Example E12

Except for using the product (e42), Battery (B23) has an identical configuration to that of Embodiment E123. This battery was termed Comparative Example E12.

Embodiment E164

Except for using the product (e43), Battery (B24) has an identical configuration to that of Embodiment E123. This battery was termed Embodiment E164

Embodiment E130

1 wt. % of the product (e35) and, as the carbon material (D), 40 wt. % of meso carbon microbeads, 39 wt. % of natural graphite and 20 wt. % of artificial graphite were mixed together to prepare a negative active material. Except for the above, Battery (A130) has an identical configuration to that of Embodiment E1. This battery was termed Embodiment E130.

Embodiment E131

Except for using the product (e36), Battery (A131) has an identical configuration to that of Embodiment E130. This battery was termed Embodiment E131.

Embodiment E132

Except for using the product (e37), Battery (A132) has an identical configuration to that of Embodiment E130. This battery was termed Embodiment E132.

Embodiment E133

Except for using the product (e38), Battery (A133) has an identical configuration to that of Embodiment E130. This battery was termed Embodiment E133.

Embodiment E134

Except for using the product (e39), Battery (A134) has an identical configuration to that of Embodiment E130. This battery was termed Embodiment E134.

Embodiment E135

Except for using the product (e40), Battery (A135) has an identical configuration to that of Embodiment E130. This battery was termed Embodiment E135.

Embodiment E136

Except for using the product (e41), Battery (A136) has an identical configuration to that of Embodiment E130. This battery was termed Embodiment E136.

Comparative Example E13

Except for using the product (e42), Battery (B25) has an identical configuration to that of Embodiment E130. This battery was termed Comparative Example E13.

Embodiment E165

Except for using the product (e43), Battery (B26) has an identical configuration to that of Embodiment E130. This battery was termed Embodiment E165

Embodiment E137

35 wt. % of the product (e35) and, as the carbon material (D), 40 wt. % of meso carbon microbeads, 5 wt. % of natural graphite and 20 wt. % of artificial graphite were mixed together to prepare a negative active material. Except for the above, Battery (A137) has an identical configuration to that of Embodiment E1. This battery was termed Embodiment E137.

Embodiment E138

20 wt. % of the product (e35) and, as the carbon material (D), 40 wt. % of meso carbon microbeads, 20 wt. % of natural graphite and 20 wt. % of artificial graphite were mixed together to prepare a negative active material. Except for the above, Battery (A138) has an identical configuration to that of Embodiment E1. This battery was termed Embodiment E138.

Embodiment E139

0.5 wt. % of the product (e35) and, as the carbon material (D), 40 wt. % of meso carbon microbeads, 35.5 wt. % of natural graphite and 20 wt. % of artificial graphite were mixed together to prepare a negative active material. Except for the above, Battery (A139) has an identical configuration to that of Embodiment E1. This battery was termed Embodiment E139.

Embodiment E140

35 wt. % of the product (e38) and, as the carbon material (D), 40 wt. % of meso carbon microbeads, 5 wt. % of natural graphite and 20 wt. % of artificial graphite were mixed together to prepare a negative active material. Except for the above, Battery (A140) has an identical configuration to that of Embodiment E1. This battery was termed Embodiment E140.

Embodiment E141

20 wt. % of the product (e38) and, as the carbon material (D), 40 wt. % of meso carbon microbeads, 20 wt. % of natural graphite and 20 wt. % of artificial graphite were mixed together to prepare a negative active material. Except for the above, Battery (A141) has an identical configuration to that of Embodiment E1. This battery was termed Embodiment E141.

Embodiment E142

0.5 wt. % of the product (e38) and, as the carbon material (D), 40 wt. % of meso carbon microbeads, 35.5 wt. % of natural graphite and 20 wt. % of artificial graphite were mixed together to prepare a negative active material. Except for the above, Battery (A142) has an identical configuration to that of Embodiment E1. This battery was termed Embodiment E142.

Embodiment E143

35 wt. % of the product (e41) and, as the carbon material (D), 40 wt. % of meso carbon microbeads, 6 wt. % of natural graphite and 20 wt. % of artificial graphite were mixed together to prepare a negative active material. Except for the above, Battery (A143) has an identical configuration to that of Embodiment E1. This battery was termed Embodiment E143.

Embodiment E144

20 wt. % of the product (e41) and, as the carbon material (D), 40 wt. % of meso carbon microbeads, 20 wt. % of natural graphite and 20 wt. % of artificial graphite were mixed together to prepare a negative active material. Except for the above, Battery (A144) has an identical configuration to that of Embodiment E1. This battery was termed Embodiment E144.

Embodiment E145

0.5 wt. % of the product (e41) and, as the carbon material (D), 40 wt. % of meso carbon microbeads, 35.5 wt. % of natural graphite and 20 wt. % of artificial graphite were mixed together to prepare a negative active material. Except for the above, Battery (A145) has an identical configuration to that of Embodiment E1. This battery was termed Embodiment E145.

Embodiment E146

By mechanochemical reaction between SiO particle (t) and artificial graphite, as the carbon material (E), a composite was prepared. The surface of such composite was supported with copper, as the electronic conductive additive (B), by electroless plating technique with the use of C200LT solution (Kojundo Chemical Laboratory) as a plating solution, so that a product (e44) was prepared. The proportions of the electronic conductive additive (B) and the carbon material (E) were determined to be 0.5 wt. % and 59.5 wt. %, respectively, to the total mass of the product (e44). The number average particle size of the product (e44) was 13.2 μm.

10 wt. % of the product (e44) and, as the carbon material (D), 40 wt. % of meso carbon microbeads, 30 wt. % of natural graphite and 20 wt. % of artificial graphite were mixed together to prepare a negative active material. Except for the above, Battery (A146) has an identical configuration to that of Embodiment E1. This battery was termed Embodiment E146.

Embodiment E147

By mechanochemical reaction between SiO particle (t) and artificial graphite, as the carbon material (E), a composite was prepared. The surface of such composite was supported with copper, as the electronic conductive additive (B), by electroless plating technique with the use of C200LT solution (Kojundo Chemical Laboratory) as a plating solution, so that a product (e45) was prepared. The proportions of the electronic conductive additive (B) and the carbon material (E) were determined to be 1.0 wt. % and 59.0 wt. %, respectively, to the total mass of the product (e45). The number average particle size of the product (e45) was 14.2 μm.

Except for using this product (e45), Battery (A147) has an identical configuration to that of Embodiment E146. This battery was termed Embodiment E147.

Embodiment E148

By mechanochemical reaction between SiO particle (t) and artificial graphite, as the carbon material (E), a composite was prepared. The surface of such composite was supported with copper, as the electronic conductive additive (B), by electroless plating technique with the use of C200LT solution (Kojundo Chemical Laboratory) as a plating solution, so that a product (e46) was prepared. The proportions of the electronic conductive additive (B) and the carbon material (E) were determined to be 10.0 wt. % and 50.0 wt. %, respectively, to the total mass of the product (e46). The number average particle size of the product (e46) was 15.4 μm.

Except for using this product (e46), Battery (A148) has an identical configuration to that of Embodiment E146. This battery was termed Embodiment E148.

Embodiment E149

By mechanochemical reaction between SiO particle (t) and artificial graphite, as the carbon material (E), a composite was prepared. The surface of such composite was supported with copper, as the electronic conductive additive (B), by electroless plating technique with the use of C200LT solution (Kojundo Chemical Laboratory) as a plating solution, so that a product (e47) was prepared. The proportions of the electronic conductive additive (B) and the carbon material (E) were determined to be 20.0 wt. % and 40.0 wt. %, respectively, to the total mass of the product (e47). The number average particle size of the product (e47) was 16.7 μm.

Except for using this product (e47), Battery (A149) has an identical configuration to that of Embodiment E146. This battery was termed Embodiment E149.

Embodiment E150

By mechanochemical reaction between SiO particle (t) and artificial graphite, as the carbon material (E), a composite was prepared. The surface of such composite was supported with copper, as the electronic conductive additive (B), by electroless plating technique with the use of C200LT solution (Kojundo Chemical, Laboratory) as a plating solution, so that a product (e48) was prepared. The proportions of the electronic conductive additive (B) and the carbon material (E) were determined to be 30.0 wt. % and 30.0 wt. %, respectively, to the total mass of the product (e48). The number average particle size of the product (e48) was 18.2 µm.

Except for using this product (e48), Battery (A160) has an identical configuration to that of Embodiment E146. This battery was termed Embodiment E150.

Embodiment E151

By mechanochemical reaction between SiO particle (t) and artificial graphite, as the carbon material (E), a composite was prepared. The surface of such composite was supported with copper, as the electronic conductive additive (B), by electroless plating technique with the use of C200LT solution (Kojundo Chemical Laboratory) as a plating solution, so that a product (e49) was prepared. The proportions of the electronic conductive additive (B) and the carbon material (E) were determined to be 38.0 wt. % and 22.0 wt. %, respectively, to the total mass of the product (e49). The number average particle size of the product (e49) was 19.9 µm.

Except for using this product (e49), Battery (A151) has an identical configuration to that of Embodiment E146. This battery was termed Embodiment E151.

Embodiment E152

By mechanochemical reaction between SiO particle (t) and artificial graphite, as the carbon material (E), a composite was prepared. The surface of such composite was supported with copper, as the electronic conductive additive (B), by electroless plating technique with the use of C200LT solution (Kojundo Chemical Laboratory) as a plating solution, so that a product (e50) was prepared. The proportions of the electronic conductive additive (B) and the carbon material (E) were determined to be 40.0 wt. % and 20.0 wt. %, respectively, to the total mass of the product (e50). The number average particle size of the product (e50) was 20.2 µm.

Except for using this product (e50), Battery (A152) has an identical configuration to that of Embodiment E146. This battery was termed Embodiment E152.

Comparative Example E14

By mechanochemical reaction between SiO particle (t) and artificial graphite, as the carbon material (E), a composite was prepared. The surface of such composite was supported with copper, as the electronic conductive additive (B), by electroless plating technique with the use of C200LT solution (Kojundo Chemical Laboratory) as a plating solution, so that a product (e51) was prepared. The proportions of the electronic conductive additive (B) and the carbon material (E) were determined to be 0.1 wt. % and 59.9 wt. %, respectively, to the total mass of the product (e51). The number average particle size of the product (e51) was 13.0 µm.

Except for using this product (e51), Battery (B27) has an identical configuration to that of Embodiment E146. This battery was termed Comparative Example E14.

Embodiment E166

By mechanochemical reaction between SiO particle (t) and artificial graphite, as the carbon material (E), a composite was prepared. The surface of such composite was supported with copper, as the electronic conductive additive (B), by electroless plating technique with the use of C200LT solution (Kojundo Chemical Laboratory) as a plating solution, so that a product (e52) was prepared. The proportions of the electronic conductive additive (B) and the carbon material (E) were determined to be 50.0 wt. % and 10.0 wt. %, respectively, to the total mass of the product (e52). The number average particle size of the product (e52) was 21.1 µm.

Except for using this product (e52), Battery (328) has an identical configuration to that of Embodiment E146. This battery was termed Embodiment E166.

Comparative Example E15

Except for using artificial graphite as the negative active material, Battery (B29) has an identical configuration to that of Embodiment E1. This battery was termed Comparative Example E15.

Comparative Example E16

Except for using the product (e1) as the negative active material, Battery (330) has an identical configuration to that of Embodiment E1. This battery was termed Comparative Example E16.

<Measurement of Particle Size Distribution>

The particle size distribution described in this description was measured according to the following manner. 0.1 g of sample was stirred in water and this preparation was sent to a measuring stand. With the use of a semiconductor laser (wave length of 680 nm, and power of 3 mW) as a light source, the preparation was measured by means of laser diffraction and laser scattering methods (SALD2000J, SHIMADZU).

<Charge/Discharge Test>

Each battery described above was charged at a current of 1 CmA (700 mA) at a temperature of 25° C. until the voltage reached 4.2 V, subsequently charged at a constant voltage of 4.2 V for 2 hours, and then discharged at a current of 1 CmA until the voltage dropped to 2.0 V. These steps were taken as one cycle, and the initial capacity and the capacity retention ratio after 500 cycles were examined.

The initial capacity described in this description means the discharge capacity at the $1^{st}$ cycle, and the capacity retention ratio means the ratio of the discharge capacity at the $500^{th}$ cycle to the one at the $1^{st}$ cycle (expressed in percentage).

TABLE E1

| | Material (A) | Active material (C) Electronic conductive additive (B) | Amount of (B) support wt. % (B)/(C) | Amount of (D) mixture wt. % (D)/((C) + (D)) | Result Initial capacity mAh | Capacity retention ratio % |
|---|---|---|---|---|---|---|
| CE E1   | Si | C | 0.1  | 0.5 | 702 | 12 |
| EM E1   | Si | C | 0.5  | 0.5 | 811 | 52 |
| EM E2   | Si | C | 5.0  | 0.5 | 822 | 61 |
| EM E3   | Si | C | 10.0 | 0.5 | 823 | 63 |
| EM E4   | Si | C | 20.0 | 0.5 | 819 | 67 |
| EM E5   | Si | C | 30.0 | 0.5 | 805 | 64 |
| EM E6   | Si | C | 38.0 | 0.5 | 798 | 63 |
| EM E7   | Si | C | 40.0 | 0.5 | 795 | 55 |
| EM E153 | Si | C | 50.0 | 0.5 | 712 | 40 |

In Tables E1 to E27, EM in the first column refers to Embodiment and CE refers to Comparative Example; for example, EM E1 refers to Embodiment E1 and CE E1 refers to Comparative Example E1.

TABLE E2

| | Material (A) | Active material (C) Electronic conductive additive (B) | Amount of (B) support wt. % (B)/(C) | Amount of (D) mixture wt. % (D)/((C) + (D)) | Result Initial capacity mAh | Capacity retention ratio % |
|---|---|---|---|---|---|---|
| CE E2   | Si | C | 0.1  | 20.0 | 687 | 16 |
| EM E8   | Si | C | 0.5  | 20.0 | 783 | 54 |
| EM E9   | Si | C | 5.0  | 20.0 | 794 | 64 |
| EM E10  | Si | C | 10.0 | 20.0 | 798 | 67 |
| EM E11  | Si | C | 20.0 | 20.0 | 784 | 70 |
| EM E12  | Si | C | 30.0 | 20.0 | 772 | 69 |
| EM E13  | Si | C | 38.0 | 20.0 | 764 | 67 |
| EM E14  | Si | C | 40.0 | 20.0 | 741 | 57 |
| EM E154 | Si | C | 50.0 | 20.0 | 673 | 42 |

TABLE E3

| | Material (A) | Active material (C) Electronic conductive additive (B) | Amount of (B) support wt. % (B)/(C) | Amount of (D) mixture wt. % (D)/((C) + (D)) | Result Initial capacity mAh | Capacity retention ratio % |
|---|---|---|---|---|---|---|
| EM E15 | Si | C | 0.5 | 0.1  | 753 | 50 |
| EM E1  | Si | C | 0.5 | 0.5  | 811 | 52 |
| EM E16 | Si | C | 0.5 | 1.0  | 806 | 65 |
| EM E17 | Si | C | 0.5 | 5.0  | 798 | 70 |
| EM E18 | Si | C | 0.5 | 10.0 | 794 | 69 |
| EM E19 | Si | C | 0.5 | 15.0 | 789 | 62 |
| EM E8  | Si | C | 0.5 | 20.0 | 783 | 54 |
| EM E20 | Si | C | 0.5 | 25.0 | 730 | 51 |

TABLE E4

| | Material (A) | Active material (C) Electronic conductive additive (B) | Amount of (B) support wt. % (B)/(C) | Amount of (D) mixture wt. % (D)/((C) + (D)) | Result Initial capacity mAh | Capacity retention ratio % |
|---|---|---|---|---|---|---|
| EM E21 | Si | C | 20.0 | 0.1 | 739 | 50 |
| EM E4  | Si | C | 20.0 | 0.5 | 819 | 55 |
| EM E22 | Si | C | 20.0 | 1.0 | 813 | 69 |

TABLE E4-continued

| | Active material (C) | | | Result | |
|---|---|---|---|---|---|
| | | Electronic conductive additive (B) | Amount of (B) support wt. % (B)/(C) | Amount of (D) mixture wt. % (D)/((C) + (D)) | Initial capacity mAh | Capacity retention ratio % |
| Material (A) | | | | | |
| EM E23 | Si | C | 20.0 | 5.0 | 809 | 72 |
| EM E24 | Si | C | 20.0 | 10.0 | 802 | 75 |
| EM E25 | Si | C | 20.0 | 15.0 | 794 | 74 |
| EM E11 | Si | C | 20.0 | 20.0 | 786 | 72 |
| EM E26 | Si | C | 20.0 | 25.0 | 730 | 51 |

TABLE E5

| | Active material (C) | | | Result | |
|---|---|---|---|---|---|
| Material (A) | Electronic conductive additive (B) | Amount of (B) support wt. % (B)/(C) | Amount of (D) mixture wt. % (D)/((C) + (D)) | Initial capacity mAh | Capacity retention ratio % |
| EM E27 | Si | C | 40.0 | 0.1 | 724 | 51 |
| EM E7 | Si | C | 40.0 | 0.5 | 795 | 55 |
| EM E28 | Si | C | 40.0 | 1.0 | 790 | 69 |
| EM E29 | Si | C | 40.0 | 5.0 | 782 | 73 |
| EM E30 | Si | C | 40.0 | 10.0 | 775 | 75 |
| EM E31 | Si | C | 40.0 | 15.0 | 759 | 68 |
| EM E14 | Si | C | 40.0 | 20.0 | 741 | 57 |
| EM E32 | Si | C | 40.0 | 25.0 | 714 | 50 |

TABLE E6

| | Active material (F) | | | | Result | |
|---|---|---|---|---|---|---|
| Material (A) | Electronic conductive additive (B) | Amount of (B) support wt. % (B)/(F) | Amount of (E) mixture wt. % (E)/(F) | Amount of (D) mixture wt. % (D)/((F) + (D)) | Initial capacity mAh | Capacity retention ratio % |
| CE E3 | Si | C | 0.1 | 59.9 | 0.5 | 692 | 32 |
| EM E33 | Si | C | 0.5 | 59.5 | 0.5 | 798 | 63 |
| EM E34 | Si | C | 5.0 | 59.0 | 0.5 | 802 | 72 |
| EM E35 | Si | C | 10.0 | 50.0 | 0.5 | 805 | 75 |
| EM E36 | Si | C | 20.0 | 40.0 | 0.5 | 799 | 78 |
| EM E37 | Si | C | 30.0 | 30.0 | 0.5 | 785 | 73 |
| EM E38 | Si | C | 38.0 | 22.0 | 0.5 | 778 | 70 |
| EM E39 | Si | C | 40.0 | 20.0 | 0.5 | 776 | 64 |
| EM E155 | Si | C | 50.0 | 10.0 | 0.5 | 684 | 42 |

TABLE E7

| | Active material (F) | | | | Result | |
|---|---|---|---|---|---|---|
| Material (A) | Electronic conductive additive (B) | Amount of (B) support wt. % (B)/(F) | Amount of (E) mixture wt. % (E)/(F) | Amount of (D) mixture wt. % (D)/((F) + (D)) | Initial capacity mAh | Capacity retention ratio % |
| CE E4 | Si | C | 0.1 | 59.9 | 20.0 | 669 | 35 |
| EM E40 | Si | C | 0.5 | 59.5 | 20.0 | 764 | 64 |
| EM E41 | Si | C | 5.0 | 59.0 | 20.0 | 779 | 73 |
| EM E42 | Si | C | 10.0 | 50.0 | 20.0 | 779 | 75 |
| EM E43 | Si | C | 20.0 | 40.0 | 20.0 | 768 | 79 |
| EM E44 | Si | C | 30.0 | 30.0 | 20.0 | 759 | 74 |
| EM E45 | Si | C | 38.0 | 22.0 | 20.0 | 742 | 73 |
| EM E46 | Si | C | 40.0 | 20.0 | 20.0 | 725 | 65 |
| EM E156 | Si | C | 50.0 | 10.0 | 20.0 | 659 | 43 |

TABLE E8

| | Material (A) | Electronic conductive additive (B) | Active material (F) Amount of (B) support wt. % (B)/(F) | Active material (F) Amount of (E) mixture wt. % (E)/(F) | Amount of (D) mixture wt. % (D)/((F) + (D)) | Result Initial capacity mAh | Result Capacity retention ratio % |
|---|---|---|---|---|---|---|---|
| EM E47 | Si | C | 0.5 | 59.5 | 0.1 | 731 | 60 |
| EM E27 | Si | C | 0.5 | 59.5 | 0.5 | 798 | 63 |
| EM E48 | Si | C | 0.5 | 59.5 | 1.0 | 792 | 75 |
| EM E49 | Si | C | 0.5 | 59.5 | 5.0 | 785 | 78 |
| EM E50 | Si | C | 0.5 | 59.5 | 10.0 | 781 | 75 |
| EM E51 | Si | C | 0.5 | 59.5 | 15.0 | 774 | 69 |
| EM E34 | Si | C | 0.5 | 59.5 | 20.0 | 764 | 64 |
| EM E52 | Si | C | 0.5 | 59.5 | 25.0 | 701 | 53 |

TABLE E9

| | Material (A) | Electronic conductive additive (B) | Active material (F) Amount of (B) support wt. % (B)/(F) | Active material (F) Amount of (E) mixture wt. % (E)/(F) | Amount of (D) mixture wt. % (D)/((F) + (D)) | Result Initial capacity mAh | Result Capacity retention ratio % |
|---|---|---|---|---|---|---|---|
| EM E53 | Si | C | 20.0 | 40.0 | 0.1 | 717 | 61 |
| EM E30 | Si | C | 20.0 | 40.0 | 0.5 | 799 | 78 |
| EM E54 | Si | C | 20.0 | 40.0 | 1.0 | 793 | 79 |
| EM E55 | Si | C | 20.0 | 40.0 | 5.0 | 785 | 80 |
| EM E56 | Si | C | 20.0 | 40.0 | 10.0 | 776 | 79 |
| EM E57 | Si | C | 20.0 | 40.0 | 15.0 | 770 | 79 |
| EM E37 | Si | C | 20.0 | 40.0 | 20.0 | 768 | 79 |
| EM E58 | Si | C | 20.0 | 40.0 | 25.0 | 715 | 63 |

TABLE E10

| | Material (A) | Electronic conductive additive (B) | Active material (F) Amount of (B) support wt. % (B)/(F) | Active material (F) Amount of (E) mixture wt. % (E)/(F) | Amount of (D) mixture wt. % (D)/((F) + (D)) | Result Initial capacity mAh | Result Capacity retention ratio % |
|---|---|---|---|---|---|---|---|
| EM E59 | Si | C | 40.0 | 20.0 | 0.1 | 689 | 58 |
| EM E33 | Si | C | 40.0 | 20.0 | 0.5 | 776 | 64 |
| EM E60 | Si | C | 40.0 | 20.0 | 1.0 | 773 | 69 |
| EM E61 | Si | C | 40.0 | 20.0 | 5.0 | 763 | 73 |
| EM E62 | Si | C | 40.0 | 20.0 | 10.0 | 756 | 72 |
| EM E63 | Si | C | 40.0 | 20.0 | 15.0 | 741 | 70 |
| EM E40 | Si | C | 40.0 | 20.0 | 20.0 | 725 | 65 |
| EM E64 | Si | C | 40.0 | 20.0 | 25.0 | 684 | 52 |

TABLE E11

| | Material (A) | Electronic conductive additive (B) | Active material (C) Amount of (B) support wt. % (B)/(F) | Amount of (D) mixture wt. % (D)/((C) + (D)) | Result Initial capacity mAh | Result Capacity retention ratio % |
|---|---|---|---|---|---|---|
| CE E5 | SiO | C | 0.1 | 70.0 | 580 | 42 |
| EM E65 | SiO | C | 0.5 | 70.0 | 730 | 54 |
| EM E66 | SiO | C | 1.0 | 70.0 | 745 | 72 |
| EM E67 | SiO | C | 10.0 | 70.0 | 749 | 74 |
| EM E68 | SiO | C | 20.0 | 70.0 | 754 | 68 |
| EM E69 | SiO | C | 30.0 | 70.0 | 760 | 66 |
| EM E70 | SiO | C | 38.0 | 70.0 | 768 | 65 |

TABLE E11-continued

| | Active material (C) | | Amount of (B) support wt. % (B)/(F) | Amount of (D) mixture wt. % (D)/((C) + (D)) | Result | |
|---|---|---|---|---|---|---|
| | Material (A) | Electronic conductive additive (B) | | | Initial capacity mAh | Capacity retention ratio % |
| EM E71 | SiO | C | 40.0 | 70.0 | 710 | 56 |
| EM E157 | SiO | C | 50.0 | 70.0 | 630 | 34 |

TABLE E12

| | Active material (C) | | Amount of (B) support wt. % (B)/(F) | Amount of (D) mixture wt. % (D)/((C) + (D)) | Result | |
|---|---|---|---|---|---|---|
| | Material (A) | Electronic conductive additive (B) | | | Initial capacity mAh | Capacity retention ratio % |
| CE E6 | SiO | C | 0.1 | 90.0 | 590 | 44 |
| EM E72 | SiO | C | 0.5 | 90.0 | 760 | 56 |
| EM E73 | SiO | C | 1.0 | 90.0 | 752 | 72 |
| EM E74 | SiO | C | 10.0 | 90.0 | 754 | 86 |
| EM E75 | SiO | C | 20.0 | 90.0 | 749 | 75 |
| EM E76 | SiO | C | 20.0 | 90.0 | 739 | 78 |
| EM E77 | SiO | C | 38.0 | 90.0 | 732 | 77 |
| EM E78 | SiO | C | 40.0 | 90.0 | 700 | 76 |
| EM E158 | SiO | C | 50.0 | 90.0 | 642 | 41 |

TABLE E13

| | Active material (C) | | Amount of (B) support wt. % (B)/(F) | Amount of (D) mixture wt. % (D)/((C) + (D)) | Result | |
|---|---|---|---|---|---|---|
| | Material (A) | Electronic conductive additive (B) | | | Initial capacity mAh | Capacity retention ratio % |
| CE E7 | SiO | C | 0.1 | 95.0 | 595 | 45 |
| EM E79 | SiO | C | 0.5 | 95.0 | 730 | 58 |
| EM E80 | SiO | C | 1.0 | 95.0 | 763 | 75 |
| EM E81 | SiO | C | 10.0 | 95.0 | 769 | 83 |
| EM E82 | SiO | C | 20.0 | 95.0 | 750 | 86 |
| EM E83 | SiO | C | 30.0 | 95.0 | 745 | 84 |
| EM E84 | SiO | C | 38.0 | 95.0 | 740 | 81 |
| EM E85 | SiO | C | 40.0 | 95.0 | 708 | 77 |
| EM E159 | SiO | C | 50.0 | 95.0 | 645 | 45 |

TABLE E14

| | Active material (C) | | Amount of (B) support wt. % (B)/(C) | Amount of (D) mixture wt. % (D)/((C) + (D)) | Result | |
|---|---|---|---|---|---|---|
| | Material (A) | Electronic conductive additive (B) | | | Initial capacity mAh | Capacity retention ratio % |
| CE E8 | SiO | C | 0.1 | 99.0 | 598 | 48 |
| EM E86 | SiO | C | 0.5 | 99.0 | 721 | 62 |
| EM E87 | SiO | C | 1.0 | 99.0 | 763 | 76 |
| EM E88 | SiO | C | 10.0 | 99.0 | 755 | 77 |
| EM E89 | SiO | C | 20.0 | 99.0 | 730 | 80 |
| EM E90 | SiO | C | 30.0 | 99.0 | 729 | 78 |
| EM E91 | SiO | C | 38.0 | 99.0 | 723 | 75 |
| EM E92 | SiO | C | 40.0 | 99.0 | 703 | 73 |
| EM E160 | SiO | C | 50.0 | 99.0 | 649 | 49 |

TABLE E15

| | Active material (C) | | Amount of (B) support wt. % (B)/(C) | Amount of (D) mixture wt. % (D)/((C) + (D)) | Result | |
|---|---|---|---|---|---|---|
| | Material (A) | Electronic conductive additive (B) | | | Initial capacity mAh | Capacity retention ratio % |
| EM E93 | SiO | C | 0.5 | 67.0 | 702 | 51 |
| EM E53 | SiO | C | 0.5 | 70.0 | 730 | 54 |
| EM E94 | SiO | C | 0.5 | 80.0 | 745 | 55 |
| EM E60 | SiO | C | 0.5 | 90.0 | 760 | 56 |
| EM E67 | SiO | C | 0.5 | 95.0 | 730 | 58 |
| EM E74 | SiO | C | 0.5 | 99.0 | 721 | 62 |
| EM E95 | SiO | C | 0.5 | 99.5 | 704 | 63 |

TABLE E16

| | Active material (C) | | Amount of (D) mixture wt. % (D)/((C) + (D)) | Result | |
|---|---|---|---|---|---|
| Material (A) | Electronic conductive additive (B) | Amount of (B) support wt. % (B)/(C) | | Initial capacity mAh | Capacity retention ratio % |
| EM E96 | SiO | C | 20 | 67.0 | 730 | 53 |
| EM E56 | SiO | C | 20.0 | 70.0 | 754 | 68 |
| EM E97 | SiO | C | 20.0 | 80.0 | 755 | 76 |
| EM E63 | SiO | C | 20.0 | 90.0 | 749 | 75 |
| EM E70 | SiO | C | 20.0 | 95.0 | 750 | 86 |
| EM E77 | SiO | C | 20.0 | 99.0 | 730 | 80 |
| EM E98 | SiO | C | 20.0 | 99.5 | 752 | 85 |

TABLE E17

| | Active material (C) | | Amount of (D) mixture wt. % (D)/((C) + (D)) | Result | |
|---|---|---|---|---|---|
| Material (A) | Electronic conductive additive (B) | Amount of (B) support wt. % (B)/(C) | | Initial capacity mAh | Capacity retention ratio % |
| EM E99 | SiO | C | 40.0 | 67.0 | 702 | 51 |
| EM E59 | SiO | C | 40.0 | 70.0 | 710 | 56 |
| EM E100 | SiO | C | 40.0 | 80.0 | 705 | 68 |
| EM E66 | SiO | C | 40.0 | 90.0 | 700 | 76 |
| EM E73 | SiO | C | 40.0 | 95.0 | 708 | 77 |
| EM E80 | SiO | C | 40.0 | 99.0 | 703 | 73 |
| EM E101 | SiO | C | 40.0 | 99.5 | 700 | 72 |

TABLE E18

| | Active material (C) | | Amount of (D) mixture wt. % (D)/((C) + (D)) | Result | |
|---|---|---|---|---|---|
| Material (A) | Electronic conductive additive (B) | Amount of (B) support wt. % (B)/(C) | | Initial capacity mAh | Capacity retention ratio % |
| CE E9 | SiO | Ni | 0.1 | 95.0 | 545 | 38 |
| EM E84 | SiO | Ni | 0.5 | 95.0 | 702 | 52 |
| EM E85 | SiO | Ni | 1.0 | 95.0 | 733 | 65 |
| EM E86 | SiO | Ni | 10.0 | 95.0 | 739 | 73 |
| EM E87 | SiO | Ni | 20.0 | 95.0 | 720 | 75 |
| EM E88 | SiO | Ni | 30.0 | 95.0 | 715 | 72 |
| EM E89 | SiO | Ni | 38.0 | 95.0 | 710 | 69 |
| EM E90 | SiO | Ni | 40.0 | 95.0 | 705 | 65 |
| EM E161 | SiO | Ni | 50.0 | 95.0 | 602 | 32 |

TABLE E19

| | Active material (F) | | | | Result | |
|---|---|---|---|---|---|---|
| Material (A) | Electronic conductive additive (B) | Amount of (B) support wt. % (B)/(F) | Amount of (E) mixture wt. % (E)/(F) | Amount of (D) mixture wt. % (D)/((F) + (D)) | Initial capacity mAh | Capacity retention ratio % |
| CE E10 | SiO | C | 0.1 | 59.9 | 70.0 | 565 | 38 |
| EM E109 | SiO | C | 0.5 | 59.5 | 70.0 | 726 | 63 |
| EM E110 | SiO | C | 1.0 | 59.0 | 70.0 | 739 | 81 |
| EM E111 | SiO | C | 10.0 | 50.0 | 70.0 | 740 | 85 |
| EM E112 | SiO | C | 20.0 | 40.0 | 70.0 | 741 | 74 |
| EM E113 | SiO | C | 30.0 | 30.0 | 70.0 | 745 | 72 |
| EM E114 | SiO | C | 38.0 | 22.0 | 70.0 | 746 | 71 |
| EM E115 | SiO | C | 40.0 | 20.0 | 70.0 | 702 | 65 |
| EM E162 | SiO | C | 50.0 | 10.0 | 70.0 | 615 | 44 |

TABLE E20

| | Active material (F) | | | | Result | |
|---|---|---|---|---|---|---|
| Material (A) | Electronic conductive additive (B) | Amount of (B) support wt. % (B)/(F) | Amount of (E) mixture wt. % (E)/(F) | Amount of (D) mixture wt. % (D)/((F) + (D)) | Initial capacity mAh | Capacity retention ratio % |
| CE E11 | SiO | C | 0.1 | 59.9 | 90.0 | 680 | 42 |
| EM E116 | SiO | C | 0.5 | 59.5 | 90.0 | 745 | 61 |
| EM E117 | SiO | C | 1.0 | 59.0 | 90.0 | 743 | 74 |
| EM E118 | SiO | C | 10.0 | 50.0 | 90.0 | 740 | 78 |
| EM E119 | SiO | C | 20.0 | 40.0 | 90.0 | 736 | 82 |
| EM E120 | SiO | C | 30.0 | 30.0 | 90.0 | 728 | 80 |
| EM E121 | SiO | C | 38.0 | 22.0 | 90.0 | 714 | 79 |
| EM E122 | SiO | C | 40.0 | 20.0 | 90.0 | 680 | 78 |
| EM E163 | SiO | C | 50.0 | 10.0 | 90.0 | 673 | 64 |

TABLE E21

| | Active material (F) | | | | Result | |
|---|---|---|---|---|---|---|
| | | Electronic | | | | |
| | Material (A) | conductive additive (B) | Amount of (B) support wt. % (B)/(F) | Amount of (E) mixture wt. % (E)/(F) | Amount of (D) mixture wt. % (D)/((F) + (D)) | Initial capacity mAH | Capacity retention ratio % |
| CE E12 | SiO | C | 0.1 | 59.9 | 95.0 | 675 | 40 |
| EM E123 | SiO | C | 0.5 | 59.5 | 95.0 | 721 | 63 |
| EM E124 | SiO | C | 1.0 | 59.0 | 95.0 | 725 | 71 |
| EM E125 | SiO | C | 10.0 | 50.0 | 95.0 | 729 | 77 |
| EM E126 | SiO | C | 20.0 | 40.0 | 95.0 | 732 | 82 |
| EM E127 | SiO | C | 30.0 | 30.0 | 95.0 | 726 | 78 |
| EM E128 | SiO | C | 38.0 | 22.0 | 95.0 | 723 | 74 |
| EM E129 | SiO | C | 40.0 | 20.0 | 95.0 | 719 | 72 |
| EM E164 | SiO | C | 50.0 | 10.0 | 95.0 | 670 | 63 |

TABLE E22

| | Active material (F) | | | | Result | |
|---|---|---|---|---|---|---|
| | Material (A) | Electronic conductive additive (B) | Amount of (B) support wt. % (B)/(F) | Amount of (E) mixture wt. % (E)/(F) | Amount of (D) mixture wt. % (D)/((F) + (D)) | Initial capacity mAh | Capacity retention ratio % |
| CE E13 | SiO | C | 0.1 | 59.9 | 99.0 | 642 | 39 |
| EM E130 | SiO | C | 0.5 | 59.5 | 99.0 | 692 | 65 |
| EM E131 | SiO | C | 1.0 | 59.0 | 99.0 | 703 | 73 |
| EM E132 | SiO | C | 10.0 | 50.0 | 99.0 | 711 | 78 |
| EM E133 | SiO | C | 20.0 | 40.0 | 99.0 | 719 | 83 |
| EM E134 | SiO | C | 30.0 | 30.0 | 99.0 | 704 | 79 |
| EM E135 | SiO | C | 38.0 | 22.0 | 99.0 | 702 | 75 |
| EM E136 | SiO | C | 40.0 | 20.0 | 99.0 | 698 | 72 |
| EM E165 | SiO | C | 50.0 | 10.0 | 99.0 | 630 | 68 |

TABLE E23

| | Active material (F) | | | | Result | |
|---|---|---|---|---|---|---|
| | Material (A) | Electronic conductive additive (B) | Amount of (B) support wt. % (B)/(F) | Amount of (E) mixture wt. % (E)/(F) | Amount of (D) mixture wt. % (D)/((F) + (D)) | Initial capacity mAh | Capacity retention ratio % |
| EM E137 | SiO | C | 0.5 | 59.5 | 67.0 | 681 | 52 |
| EM E91 | SiO | C | 0.5 | 59.5 | 70.0 | 726 | 63 |
| EM E138 | SiO | C | 0.5 | 59.5 | 80.0 | 734 | 62 |
| EM E98 | SiO | C | 0.5 | 59.5 | 90.0 | 745 | 61 |
| EM E105 | SiO | C | 0.5 | 59.5 | 95.0 | 721 | 63 |
| EM E112 | SiO | C | 0.5 | 59.5 | 99.0 | 692 | 65 |
| EM E139 | SiO | C | 0.5 | 59.5 | 99.5 | 682 | 51 |

TABLE E24

| | Active material (F) | | | | Result | |
|---|---|---|---|---|---|---|
| | Material (A) | Electronic conductive additive (B) | Amount of (B) support wt. % (B)/(F) | Amount of (E) mixture wt. % (E)/(F) | Amount of (D) mixture wt. % (D)/((F) + (D)) | Initial capacity mAh | Capacity retention ratio % |
| EM E140 | SiO | C | 20.0 | 40.0 | 67.0 | 740 | 58 |
| EM E94 | SiO | C | 20.0 | 40.0 | 70.0 | 741 | 74 |
| EM E141 | SiO | C | 20.0 | 40.0 | 80.0 | 747 | 79 |
| EM E101 | SiO | C | 20.0 | 40.0 | 90.0 | 736 | 82 |
| EM E108 | SiO | C | 20.0 | 40.0 | 95.0 | 732 | 82 |

TABLE E24-continued

| | Active material (F) | | | | Result | |
|---|---|---|---|---|---|---|
| | | Electronic | | | | |
| | Material (A) | conductive additive (B) | Amount of (B) support wt. % (B)/(F) | Amount of (E) mixture wt. % (E)/(F) | Amount of (D) mixture wt. % (D)/((F) + (D)) | Initial capacity mAh | Capacity retention ratio % |
| EM E115 | SiO | C | 20.0 | 40.0 | 99.0 | 719 | 83 |
| EM E142 | SiO | C | 20.0 | 40.0 | 99.5 | 672 | 79 |

TABLE E25

| | Active material (F) | | | | Result | |
|---|---|---|---|---|---|---|
| | | Electronic | | | | |
| | Material (A) | conductive additive (B) | Amount of (B) support wt. % (B)/(F) | Amount of (E) mixture wt. % (E)/(F) | Amount of (D) mixture wt. % (D)/(F) + (D)) | Initial capacity mAh | Capacity retention ratio % |
| EM E143 | SiO | C | 40.0 | 20.0 | 67.0 | 692 | 51 |
| EM E97  | SiO | C | 40.0 | 20.0 | 70.0 | 702 | 65 |
| EM E144 | SiO | C | 40.0 | 20.0 | 80.0 | 710 | 74 |
| EM E104 | SiO | C | 40.0 | 20.0 | 90.0 | 680 | 78 |
| EM E111 | SiO | C | 40.0 | 20.0 | 95.0 | 719 | 72 |
| EM E118 | SiO | C | 40.0 | 20.0 | 99.0 | 698 | 72 |
| EM E145 | SiO | C | 40.0 | 20.0 | 99.5 | 681 | 56 |

TABLE E26

| | Active material (F) | | | | Result | |
|---|---|---|---|---|---|---|
| | | Electronic | | | | |
| | Material (A) | conductive additive (B) | Amount of (B) support wt. % (B)/(F) | Amount of (E) mixture wt. % (E)/(F) | Amount of (D) mixture wt. % (D)/((F) + (D)) | Initial capacity mAh | Capacity retention ratio % |
| CE E14  | SiO | Cu | 0.1  | 59.9 | 90.0 | 660 | 41 |
| EM E146 | SiO | Cu | 0.5  | 59.5 | 90.0 | 725 | 59 |
| EM E147 | SiO | Cu | 1.0  | 59.0 | 90.0 | 723 | 69 |
| EM E148 | SiO | Cu | 10.0 | 50.0 | 90.0 | 720 | 74 |
| EM E149 | SiO | Cu | 20.0 | 40.0 | 90.0 | 716 | 75 |
| EM E150 | SiO | Cu | 30.0 | 30.0 | 90.0 | 709 | 74 |
| EM B151 | SiO | Cu | 38.0 | 22.0 | 90.0 | 694 | 72 |
| EM E152 | SiO | Cu | 40.0 | 20.0 | 90.0 | 680 | 71 |
| EM E166 | SiO | Cu | 50.0 | 10.0 | 90.0 | 632 | 57 |

TABLE E27

| Active material (C) | | | Amount | Result | |
|---|---|---|---|---|---|
| Material (A) | Electronic conductive additive (B) | Amount of (B) support wt. % (B)/(C) | of (D) mixture wt. % (D)/((C) + (D)) | Initial capacity mAh | Capacity retention ratio % |
| CE E15 | C  | —  | —  | —  | 615 | 80 |
| CE E16 | Si | C  | 0.5 | —  | 820 | 9 |

INDUSTRIAL APPLICABILITY

The present invention provides a secondary battery which has a large discharge capacity as well as satisfactory cycle performance.

What is claimed is:

1. A non-aqueous electrolyte secondary battery comprising:
   a positive electrode;
   a negative electrode; and
   a non-aqueous electrolyte,
   wherein the negative electrode contains a negative active material,
   the negative active material contains a composite particle (C),
   the composite particle (C) contains a silicon-containing particle (A) and an electron-conductive additive (B),
   the electron-conductive additive (B) covers the surface of the silicon-containing particle (A),
   the silicon-containing particle (A) comprises SiO, a microcrystalline silicon phase and an amorphous $SiO_2$ matrix phase, and
   the microcrystalline silicon phase is dispersed in the amorphous $SiO_2$ matrix phase in the silicon-containing particle (A).

2. The non-aqueous electrolyte secondary battery according to claim 1, wherein the weight of the electron-conductive additive (B) falls within the range of 0.5 wt. % to 60 wt. % of the composite particle (C).

3. The non-aqueous electrolyte secondary battery according to claim 1, the composite particles further containing carbon and the silicon-containing particle (A) and carbon are coated by the electron-conductive additive (B).

4. The non-aqueous electrolyte secondary battery according to claim 1, wherein the electron-conductive additive (B) contains a carbon material having an average interplanar spacing d(002) of 0.3354 nm or more and less than 0.34 nm.

5. The non-aqueous electrolyte secondary battery according to claim 1, wherein the silicon-containing particle (A) consists of the SiO, the microcrystalline silicon phase and the amorphous $SiO_2$ matrix phase.

6. The non-aqueous electrolyte secondary battery according to claim 5, wherein the composite particle (C) consists of the silicon-containing particle (A) and the electron-conductive additive (B).

7. The non-aqueous electrolyte secondary battery according to claim 5, wherein the composite particle (C) consists of the silicon-containing particle (A) and the electron-conductive additive (B), and the electron-conductive additive (B) is carbon.

8. The non-aqueous electrolyte secondary battery according to claim 1, wherein the electron-conductive additive (B) is carbon.

9. A non-aqueous electrolyte secondary battery comprising:
a positive electrode;
a negative electrode; and
a non-aqueous electrolyte,
wherein the negative electrode contains a negative active material,
the negative active material contains a composite particle (C),
the composite particle (C) comprises a silicon-containing particle (A) covered with an electron-conductive additive (B) on a surface of the silicon-containing particle (A),
the silicon-containing particle (A) comprises $SiO_x$ (0<x<2), a microcrystalline silicon phase and an amorphous $SiO_2$ matrix phase, and
the microcrystalline silicon phase is dispersed in the amorphous $SiO_2$ matrix phase in the silicon-containing particle (A).

10. The non-aqueous electrolyte secondary battery according to claim 1, wherein in the composite particle (C), a layer of electron-conductive additive (B) covers the surface of the silicon-containing particle (A).

11. The non-aqueous electrolyte secondary battery according to claim 1, wherein at least one of half widths of the Si (111)-plane and Si (220)-plane diffraction peaks of the silicon-containing particle (A) in X-ray diffraction measurement with CuKα radiation is less than 3° (2θ).

12. The non-aqueous electrolyte secondary battery according to claim 1, wherein the negative active material further contains a carbon material (D).

13. The non-aqueous electrolyte secondary battery according to claim 9, wherein the negative active material further contains a carbon material (D).

14. The non-aqueous electrolyte secondary battery according to claim 1, wherein the silicon-containing particle (A) comprises equimolar amounts of Si and O.

15. The non-aqueous electrolyte secondary battery according to claim 14, wherein the silicon-containing particle (A) is made by calcinating SiO and separating SiO into the microcrystalline silicon phase and the amorphous $SiO_2$ matrix phase.

16. The non-aqueous electrolyte secondary battery according to claim 9, wherein the silicon-containing particle (A) comprises equimolar amounts of Si and O.

* * * * *